US012675727B2

(12) United States Patent
Lang et al.

(10) Patent No.: US 12,675,727 B2
(45) Date of Patent: Jul. 7, 2026

(54) METHOD AND SYSTEM FOR DETERMINING POLICIES, RULES, AND AGENT CHARACTERISTICS, FOR AUTOMATING AGENTS, AND PROTECTION

(71) Applicants: Ulrich Lang, San Diego, CA (US); Rudolf Schreiner, Falkensee (DE)

(72) Inventors: Ulrich Lang, San Diego, CA (US); Rudolf Schreiner, Falkensee (DE)

(73) Assignee: ObjectSecurity LLC, San Diego, CA (US)

( * ) Notice: Subject to any disclaimer, the term of this patent is extended or adjusted under 35 U.S.C. 154(b) by 234 days.

(21) Appl. No.: 16/998,680

(22) Filed: Aug. 20, 2020

(65) Prior Publication Data

US 2020/0410399 A1 Dec. 31, 2020

Related U.S. Application Data

(62) Division of application No. 16/255,811, filed on Jan. 23, 2019.

(Continued)

(51) Int. Cl.
*G06N 20/00* (2019.01)
*G06N 3/092* (2023.01)
(Continued)

(52) U.S. Cl.
CPC ............. *G06N 20/00* (2019.01); *G06N 3/092* (2023.01); *G06N 5/025* (2013.01); *G06N 5/04* (2013.01); *G06N 7/01* (2023.01)

(58) Field of Classification Search
None
See application file for complete search history.

(56) References Cited

U.S. PATENT DOCUMENTS 8,774,923 B2 * 7/2014 Rom .................... A61B 5/6846
607/45
8,856,863 B2 10/2014 Lang et al.
(Continued)

OTHER PUBLICATIONS

Traish, J., Tulip, J., & Moore, W. (2015). Search and recall for RTS tactical scenarios. In AISB Convention 2015 (pp. 1-6). The Society for the Study of Artificial Intelligence and the Simulation of Behaviour. (Year: 2015).*

*Primary Examiner* — Abdullah Al Kawsar
*Assistant Examiner* — Asher H. Jablon
(74) *Attorney, Agent, or Firm* — Muncy, Geissler, Olds & Lowe, P.C.

(57) ABSTRACT

A method of automatically configuring an action determination model includes determining an environment model, determining an action determination model that indicates an action option, determining whether the action determination model indicates a next action option, and if so, determining an action based on the action determination model, simulating execution of the action across the environment model, obtaining a simulated result, adjusting the action determination model. Then, until environment or an agent reach an end state, the following are repeated: determining whether the action determination model indicates the next action option, and if so, determining the action based on the action determination model, simulating the execution of the action across the environment model, obtaining the simulated result, and adjusting the action determination model.

8 Claims, 25 Drawing Sheets

Create labeled training data from "real" and "simulated" environments

Related U.S. Application Data

(60) Provisional application No. 62/750,824, filed on Oct. 26, 2018, provisional application No. 62/692,672, filed on Jun. 30, 2018, provisional application No. 62/687,742, filed on Jun. 20, 2018, provisional application No. 62/620,858, filed on Jan. 23, 2018.

(51) Int. Cl.
| | |
|---|---|
| *G06N 5/025* | (2023.01) |
| *G06N 5/04* | (2023.01) |
| *G06N 7/01* | (2023.01) |

(56) References Cited

U.S. PATENT DOCUMENTS

| | | | | |
|---|---|---|---|---|
| 9,043,861 | B2 | 5/2015 | Lang et al. | |
| 9,420,006 | B2 | 8/2016 | Lang et al. | |
| 9,563,771 | B2 | 2/2017 | Lang et al. | |
| 9,692,792 | B2 | 6/2017 | Lang et al. | |
| 10,254,759 | B1 * | 4/2019 | Faust | G05B 13/027 |
| 10,885,432 | B1 * | 1/2021 | Dulac-Arnold | G06N 3/08 |
| 2014/0366085 | A1 | 12/2014 | Lang et al. | |
| 2015/0269383 | A1 | 9/2015 | Lang et al. | |
| 2017/0304707 | A1 * | 10/2017 | Morton | G09B 5/12 |
| 2020/0302292 | A1 * | 9/2020 | Tseng | G06N 3/08 |
| 2021/0174249 | A1 * | 6/2021 | Hernandez Herranz | G06N 3/088 |

* cited by examiner

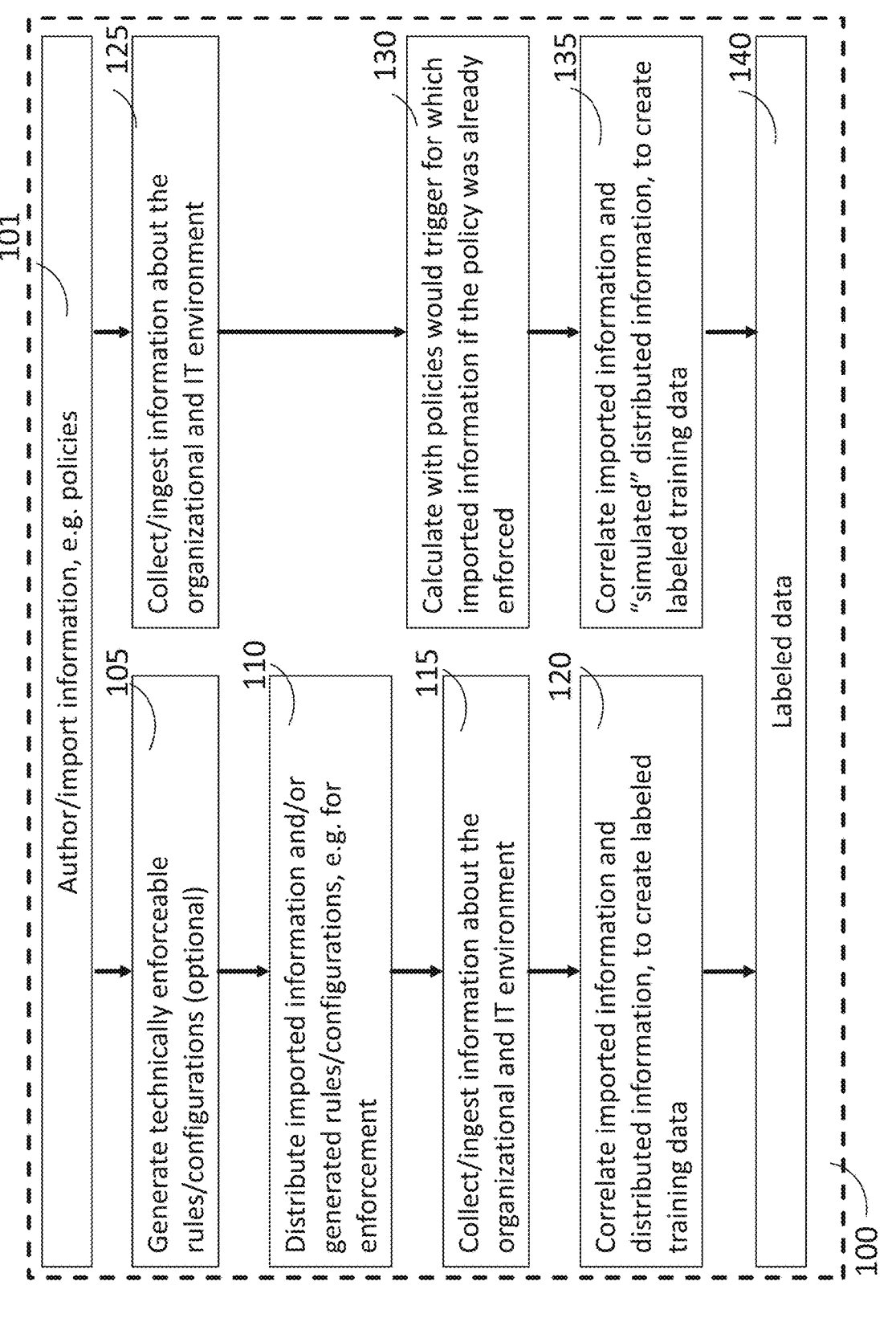
Fig. 1 – Create labeled training data from "real" and "simulated" environments

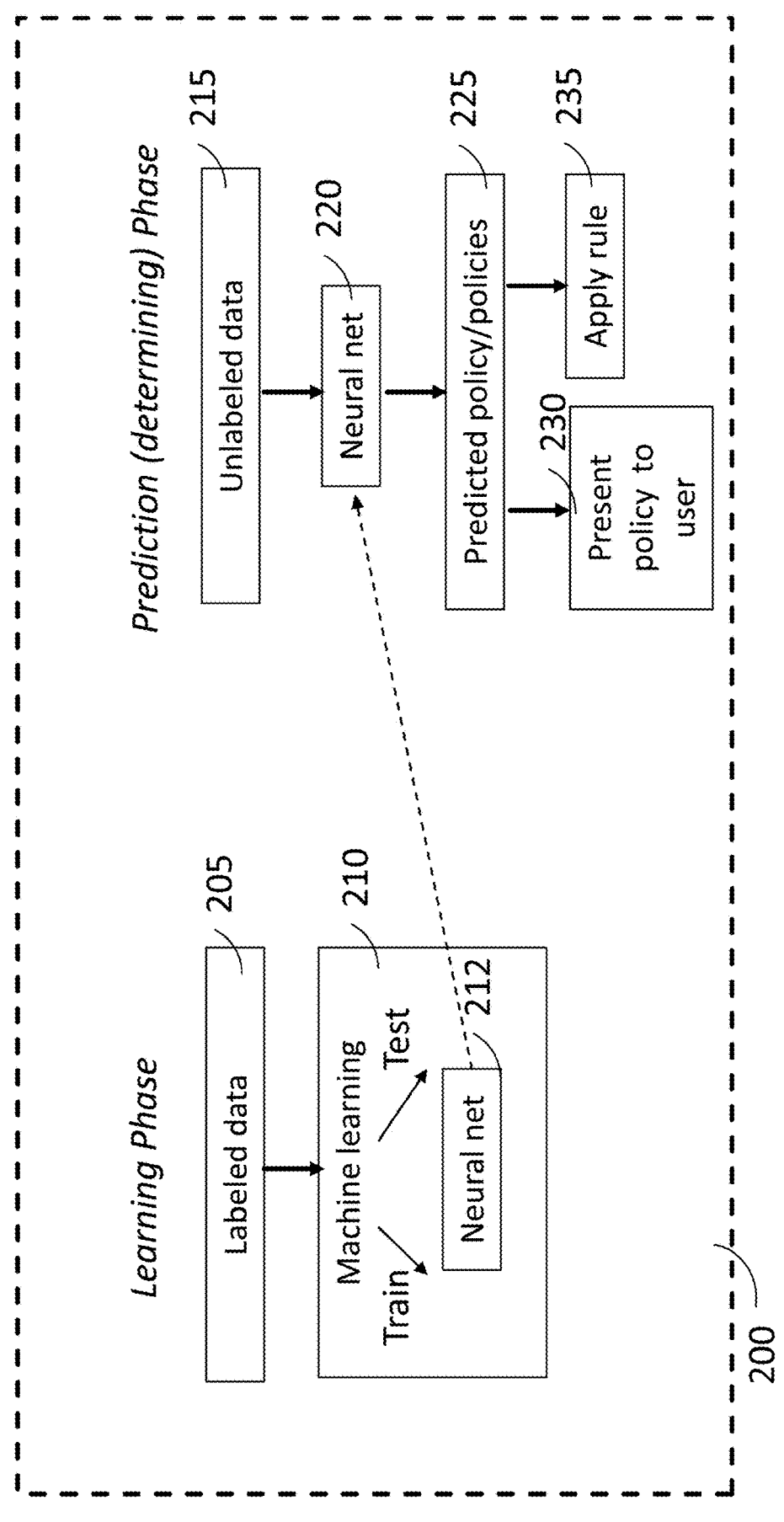
Fig. 2 – Machine learning and prediction

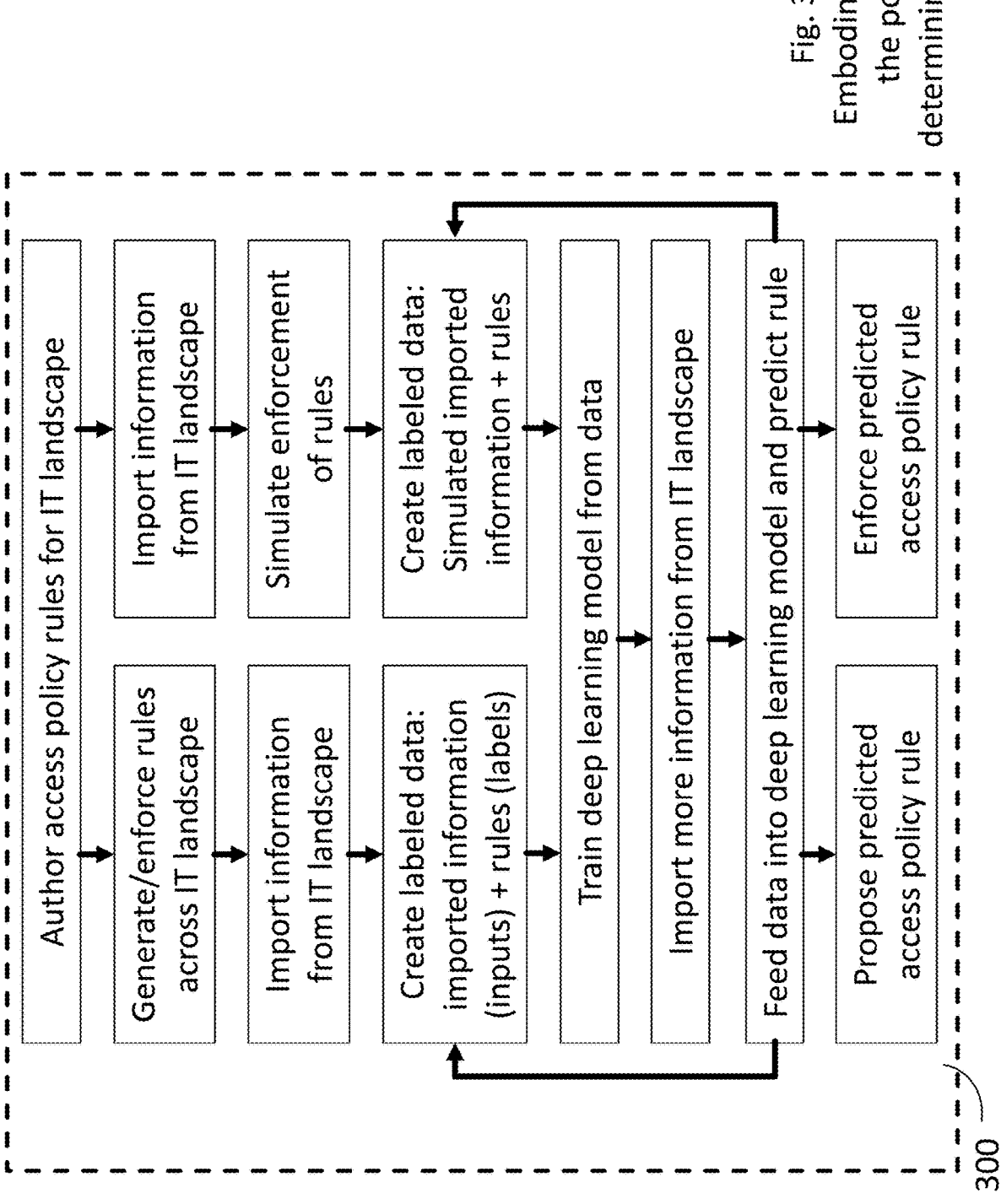
Fig. 3 –
Embodiment of
the policy
determining entity

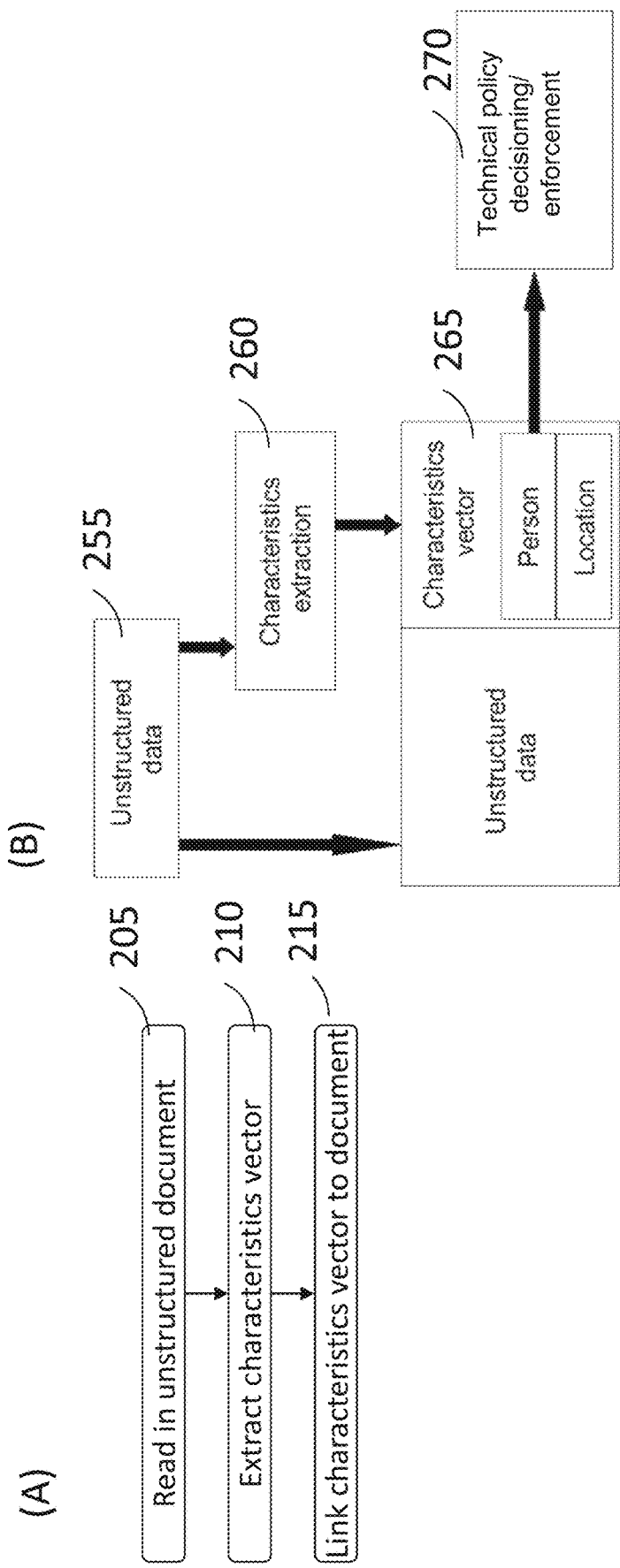
Fig. 4 - Extraction of technical security policy metadata using machine learning

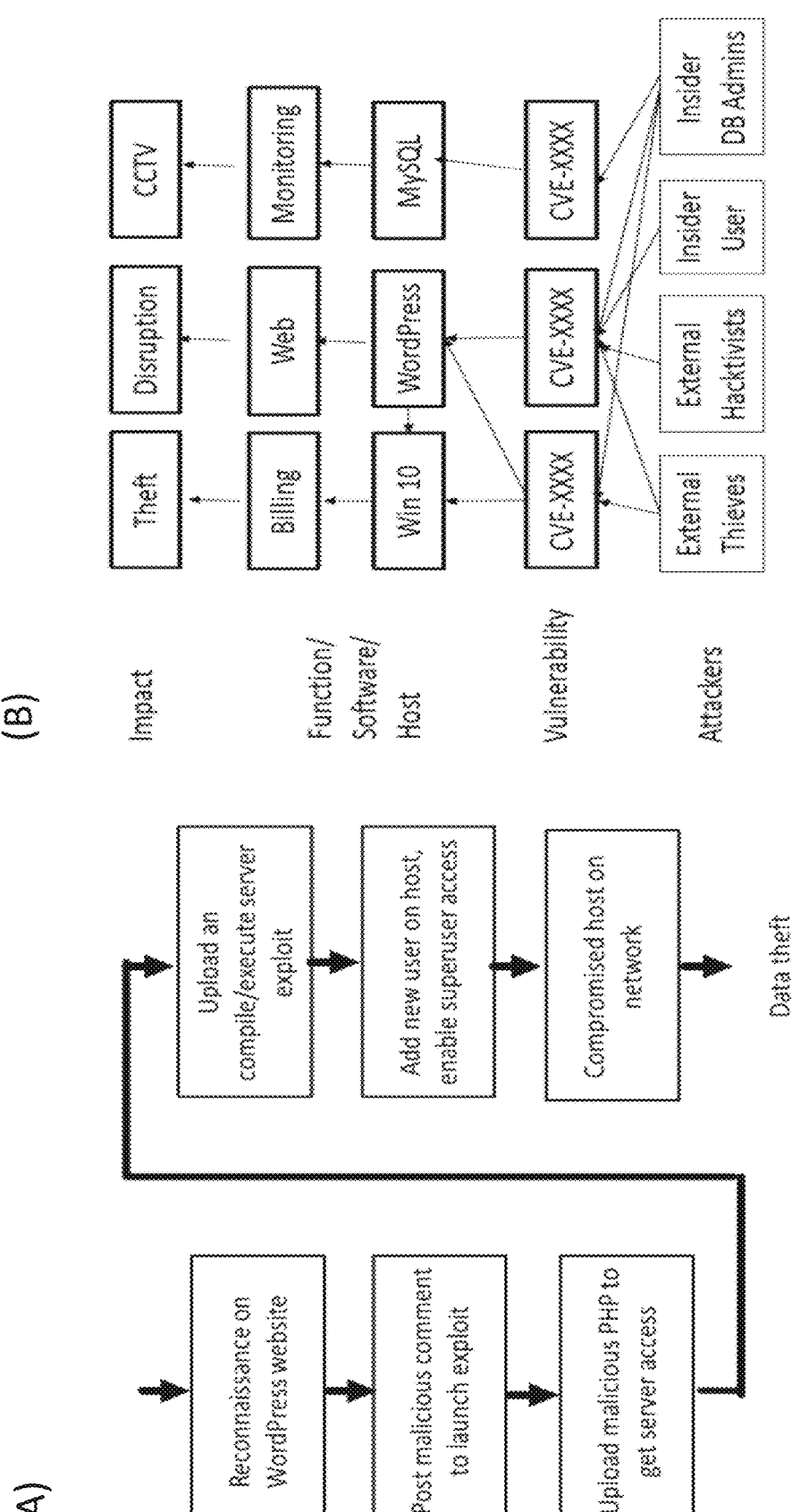
Fig. 5 – Example attack tree/graph illustrations

> ⊕ platform/resource/com.openpmf.attack_tree_analysis
>   ◈ ATAModel
>     ⊞ NamedElement
>     ⊞ ATAModel -> NamedElement
>     ⊞ Asset -> NamedElement
>     ⊞ Descriptor
>     ⊞ AccessMode -> NamedElement
>     ⊞ AttackTreeNode -> NamedElement
>     ⊞ ControlPackage -> NamedElement
>     ⊞ ControlMechanism -> NamedElement
>     ⊞ ControlFunctionality -> NamedElement
>     ⊞ ControlModel -> NamedElement
>     ⊞ Objective -> NamedElement
>     ⊞ Inventory -> NamedElement
>     ⊞ ThreatAgent -> NamedElement
>     ⊞ User -> NamedElement
>     ⊞ Role -> NamedElement
>     ⊞ ExploitCondition -> NamedElement
>     ⊞ Assumption -> NamedElement
>     ⊞ AttackModel -> NamedElement
>     ⊞ Protection -> NamedElement
>     ⊞ ExternalVerifier
>     ⊞ Descriptor
>     ⊞ System Fig. 6 – attack tree analysis metamodel example

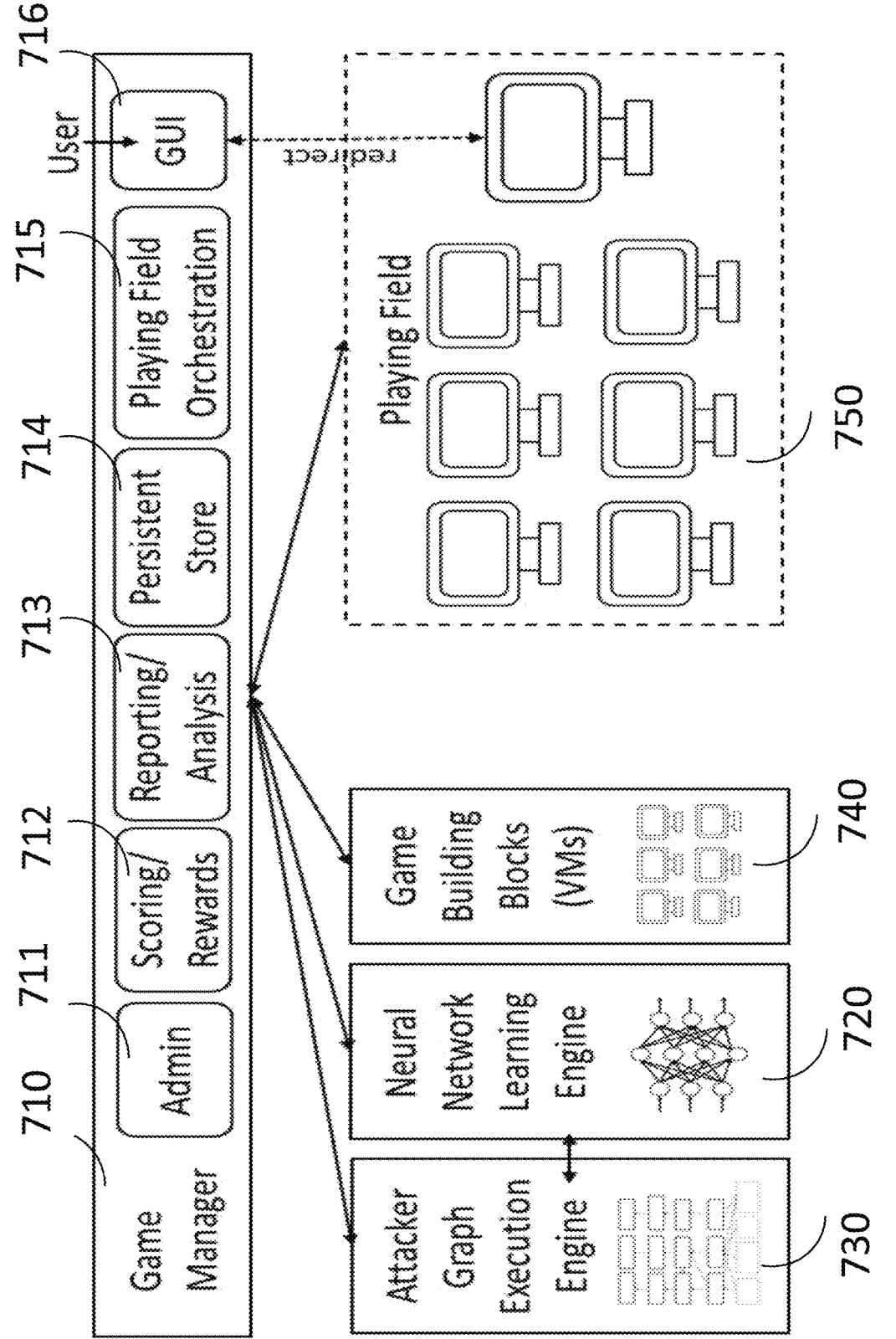
Fig. 7 – Example embodiment of a training game environment

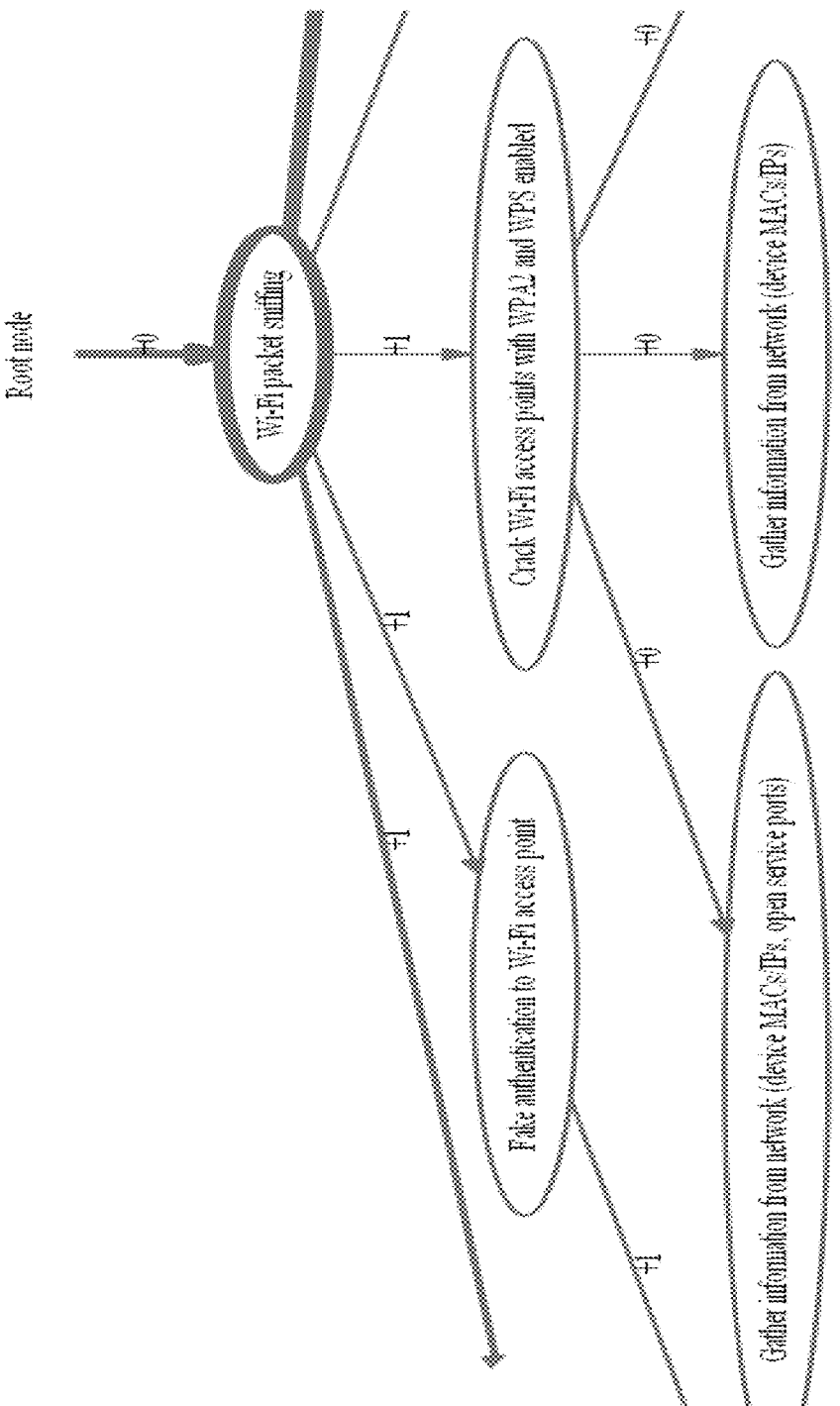
Fig. 8 – Attack tree example (excerpt) of an embodiment of the invention

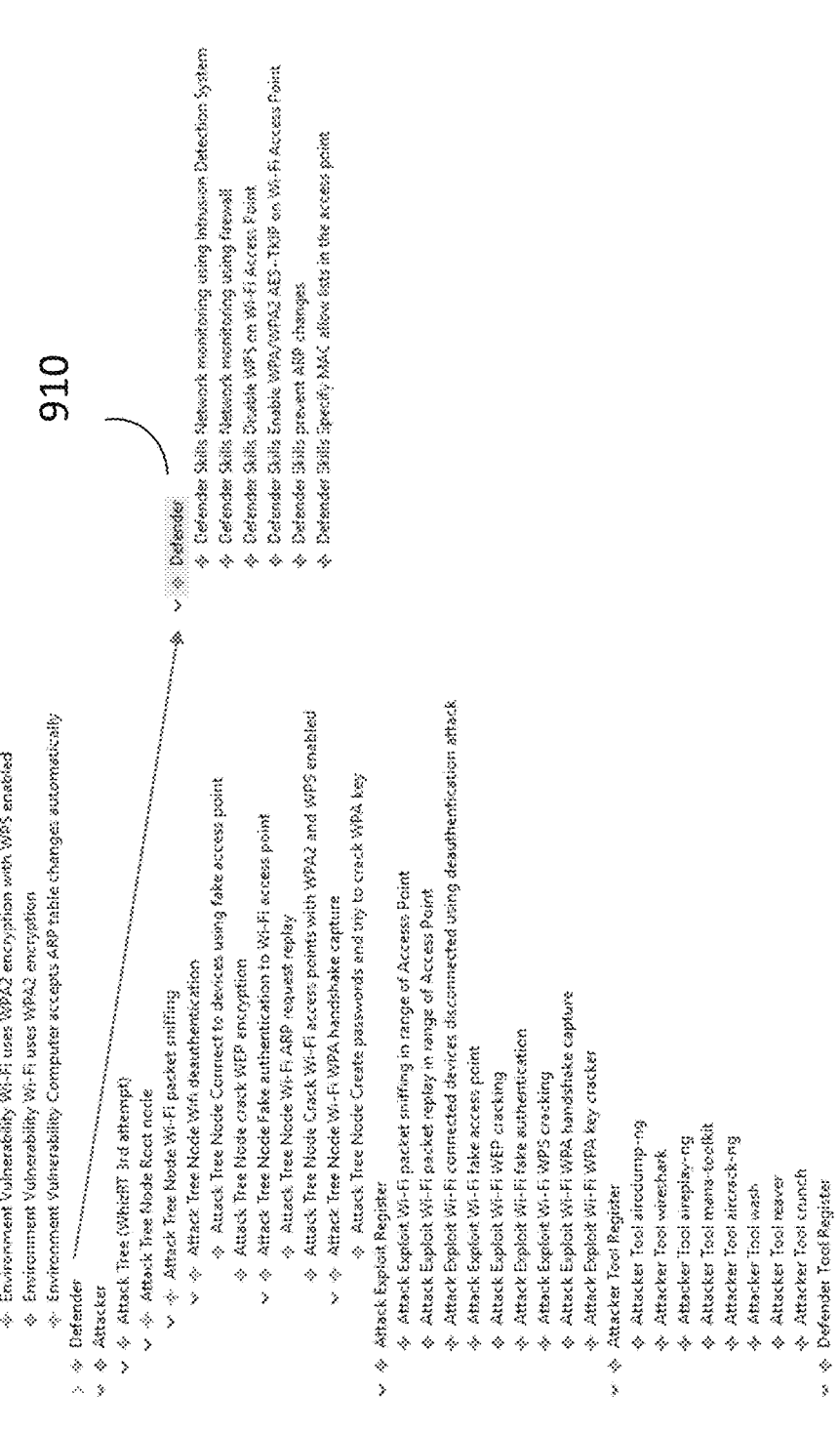
Fig. 9 – example model

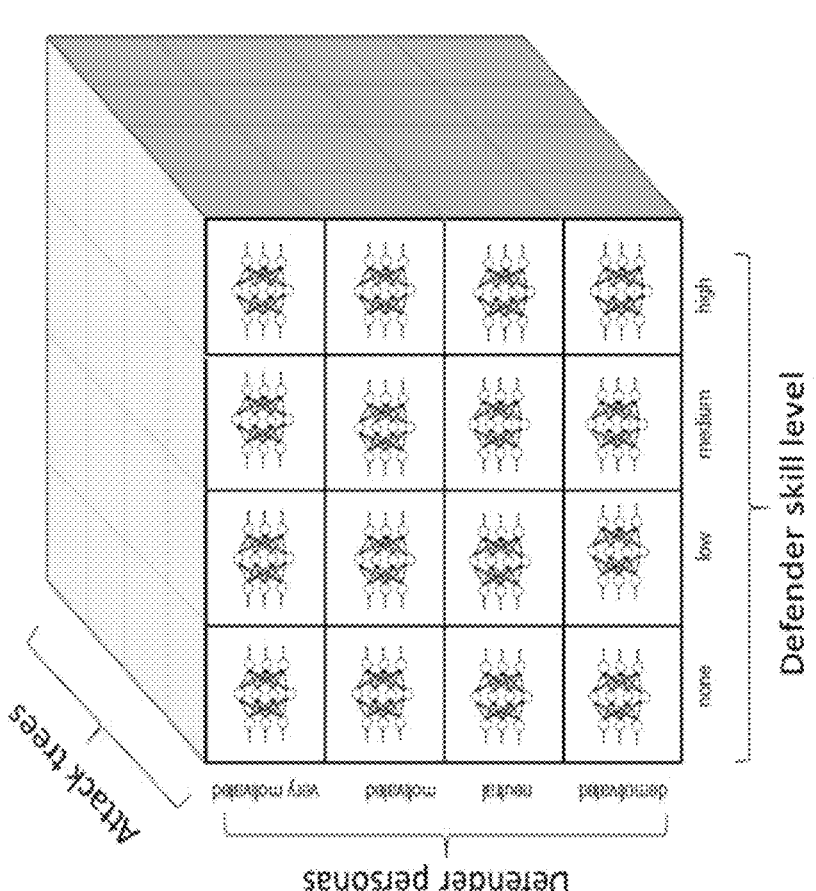
Attack trees
Defender skill level
high  medium  low  none
Defender personas
very motivated  motivated  mild  demotivated
Fig. 10 – "Complex defender classification entity" embodiment

Figure 11:
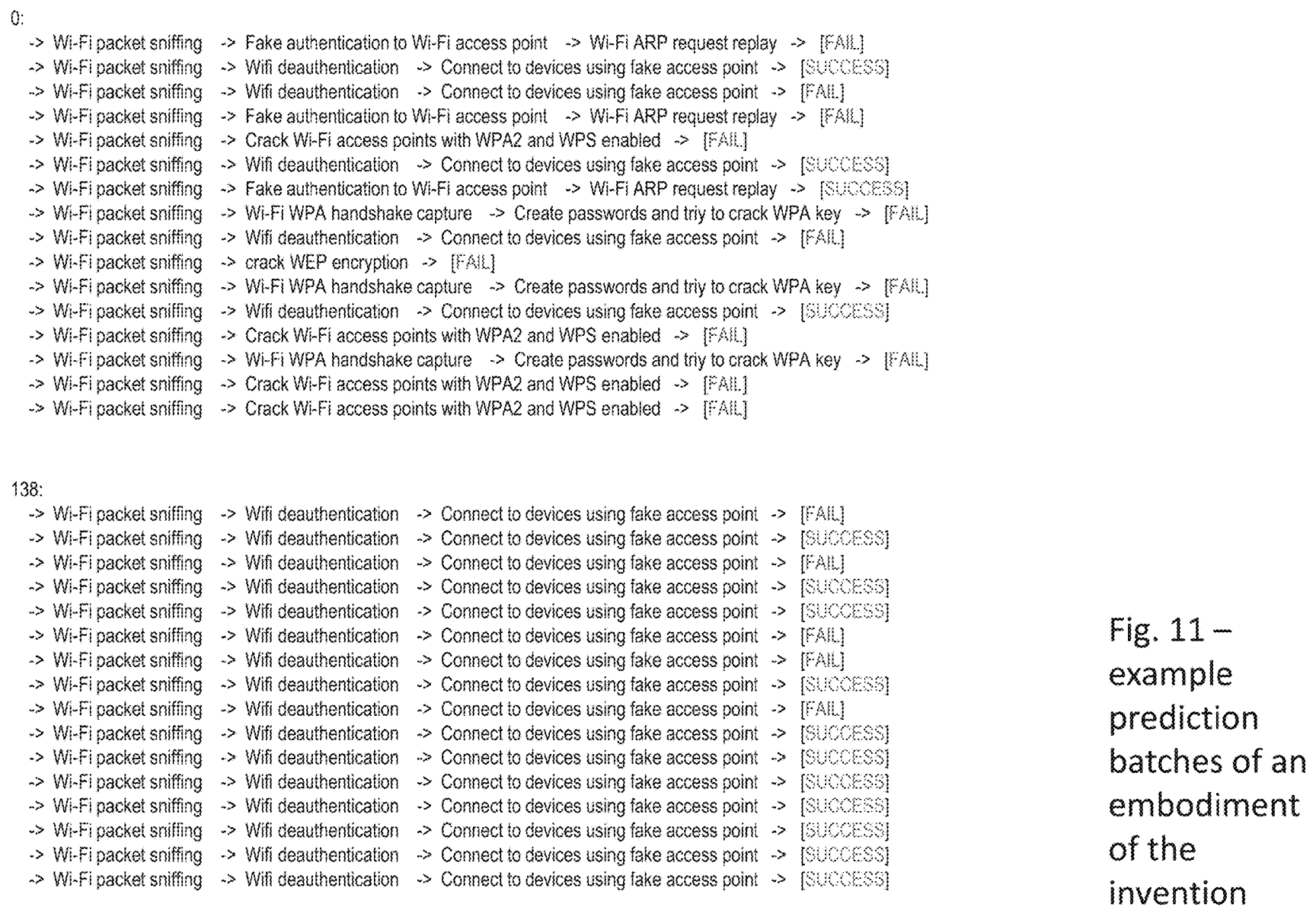

0:

-> Wi-Fi packet sniffing  -> Fake authentication to Wi-Fi access point  -> Wi-Fi ARP request replay  -> [FAIL]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [FAIL]
-> Wi-Fi packet sniffing  -> Fake authentication to Wi-Fi access point  -> Wi-Fi ARP request replay  -> [FAIL]
-> Wi-Fi packet sniffing  -> Crack Wi-Fi access points with WPA2 and WPS enabled  -> [FAIL]
-> Wi-Fi packet sniffing  -> Wifi deauthentication  -> Connect to devices using fake access point  -> [SUCCESS]
-> Wi-Fi packet sniffing  -> Fake authentication to Wi-Fi access point  -> Wi-Fi ARP request replay  -> [SUCCESS]
-> Wi-Fi packet sniffing  -> Wi-Fi WPA handshake capture  -> Create passwords and try to crack WPA key  -> [FAIL]
-> Wi-Fi packet sniffing  -> Wifi deauthentication  -> Connect to devices using fake access point  -> [FAIL]
-> Wi-Fi packet sniffing  -> crack WEP encryption  -> [FAIL]
-> Wi-Fi packet sniffing  -> Wi-Fi WPA handshake capture  -> Create passwords and try to crack WPA key  -> [FAIL]
-> Wi-Fi packet sniffing  -> Wifi deauthentication  -> Connect to devices using fake access point  -> [SUCCESS]
-> Wi-Fi packet sniffing  -> Crack Wi-Fi access points with WPA2 and WPS enabled  -> [FAIL]
-> Wi-Fi packet sniffing  -> Wi-Fi WPA handshake capture  -> Create passwords and try to crack WPA key  -> [FAIL]
-> Wi-Fi packet sniffing  -> Crack Wi-Fi access points with WPA2 and WPS enabled  -> [FAIL]
-> Wi-Fi packet sniffing  -> Crack Wi-Fi access points with WPA2 and WPS enabled  -> [FAIL]

138:

-> Wi-Fi packet sniffing  -> Wifi deauthentication  -> Connect to devices using fake access point  -> [FAIL]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [FAIL]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [FAIL]
-> Wi-Fi packet sniffing  -> Wifi deauthentication  -> Connect to devices using fake access point  -> [FAIL]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [FAIL]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [SUCCESS]
-> Wi-Fi packet sniffing  -> Wifi deauthentication  -> Connect to devices using fake access point  -> [SUCCESS]

Fig. 11 – example prediction batches of an embodiment of the invention

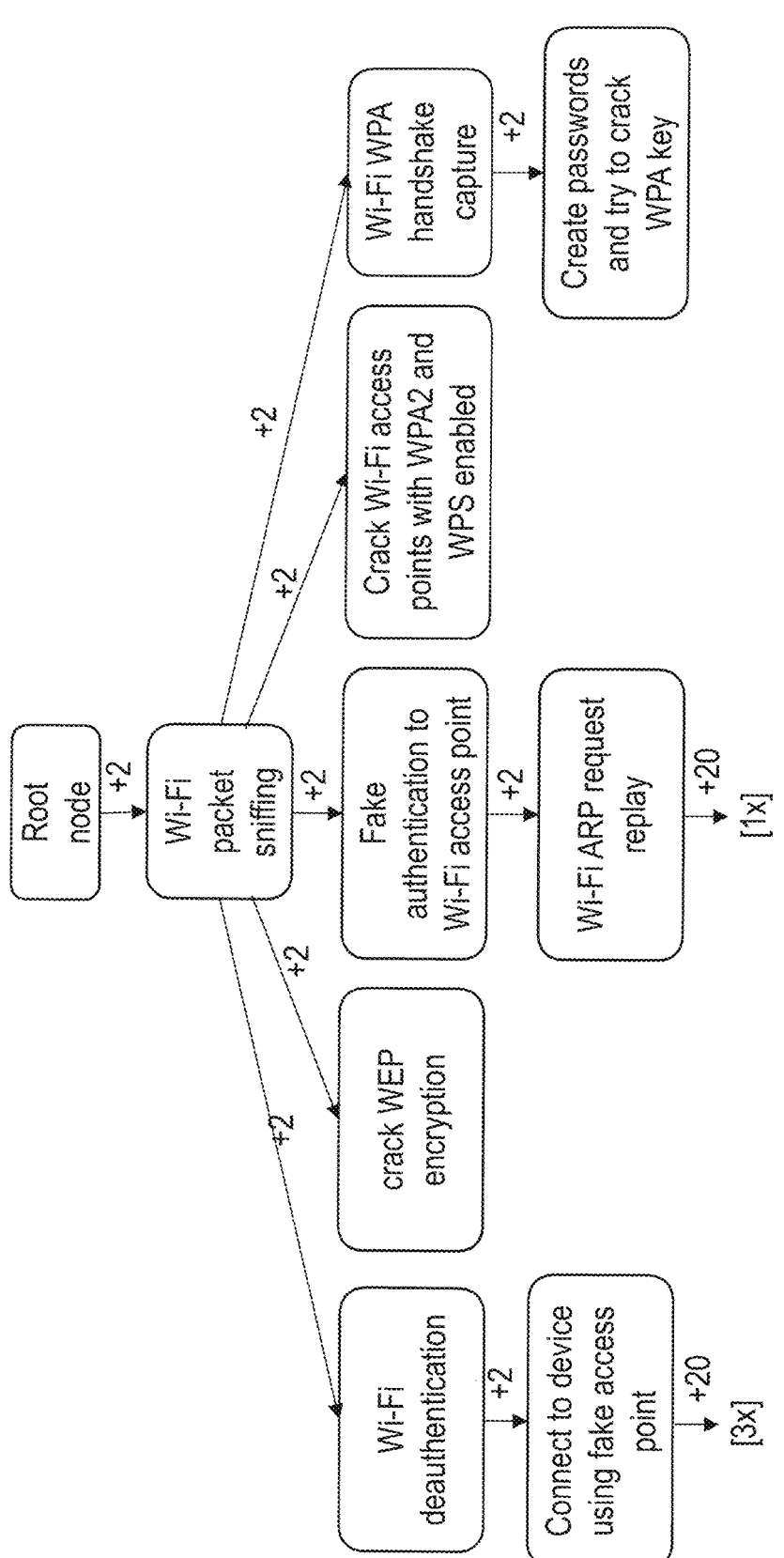
Fig. 12-A – visualization of machine learning progress (deep reinforcement embodiment)

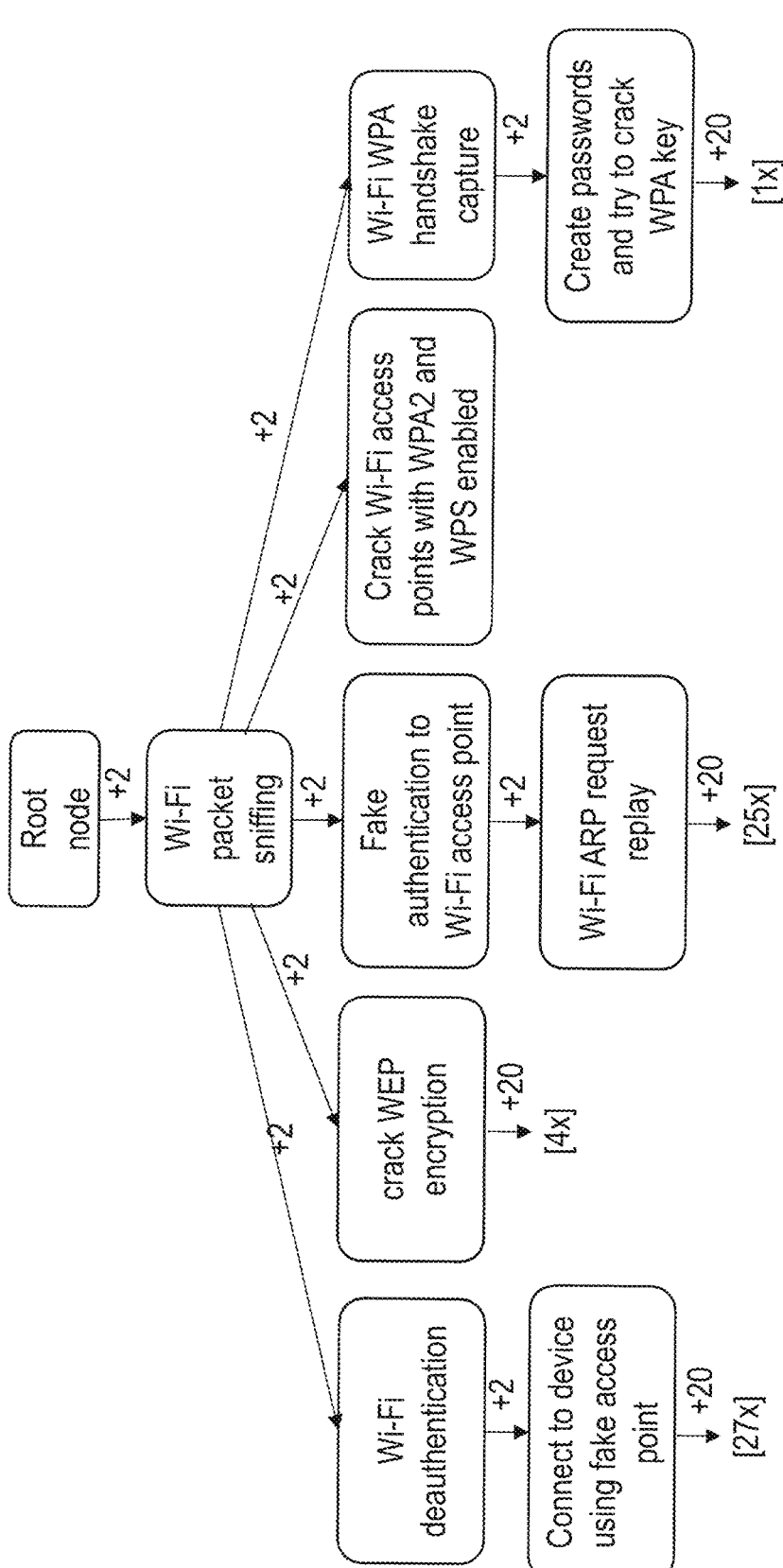
Fig. 12-B – visualization of machine learning progress (deep reinforcement embodiment)

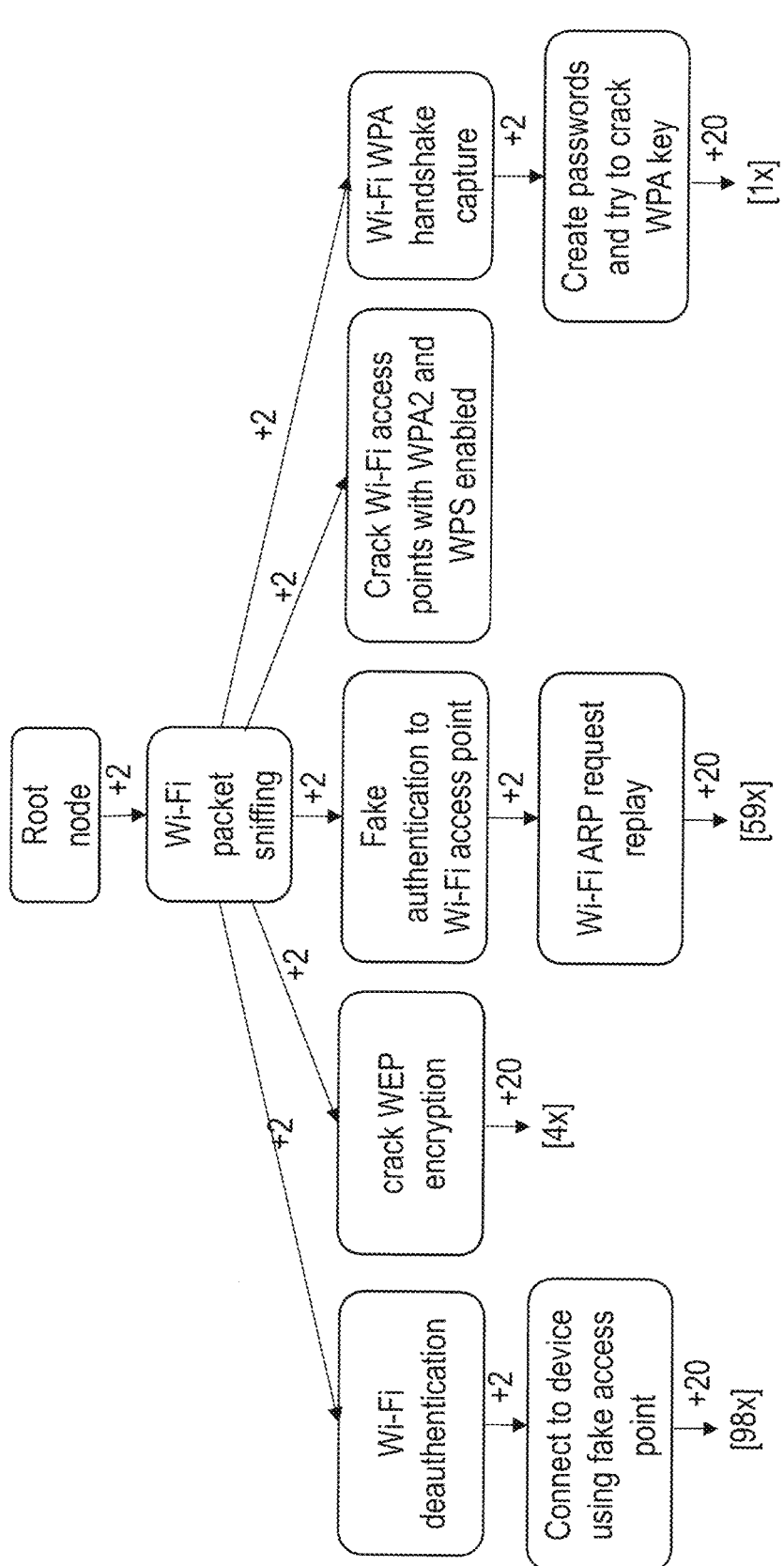
Fig. 12-C – visualization of machine learning progress (deep reinforcement embodiment)

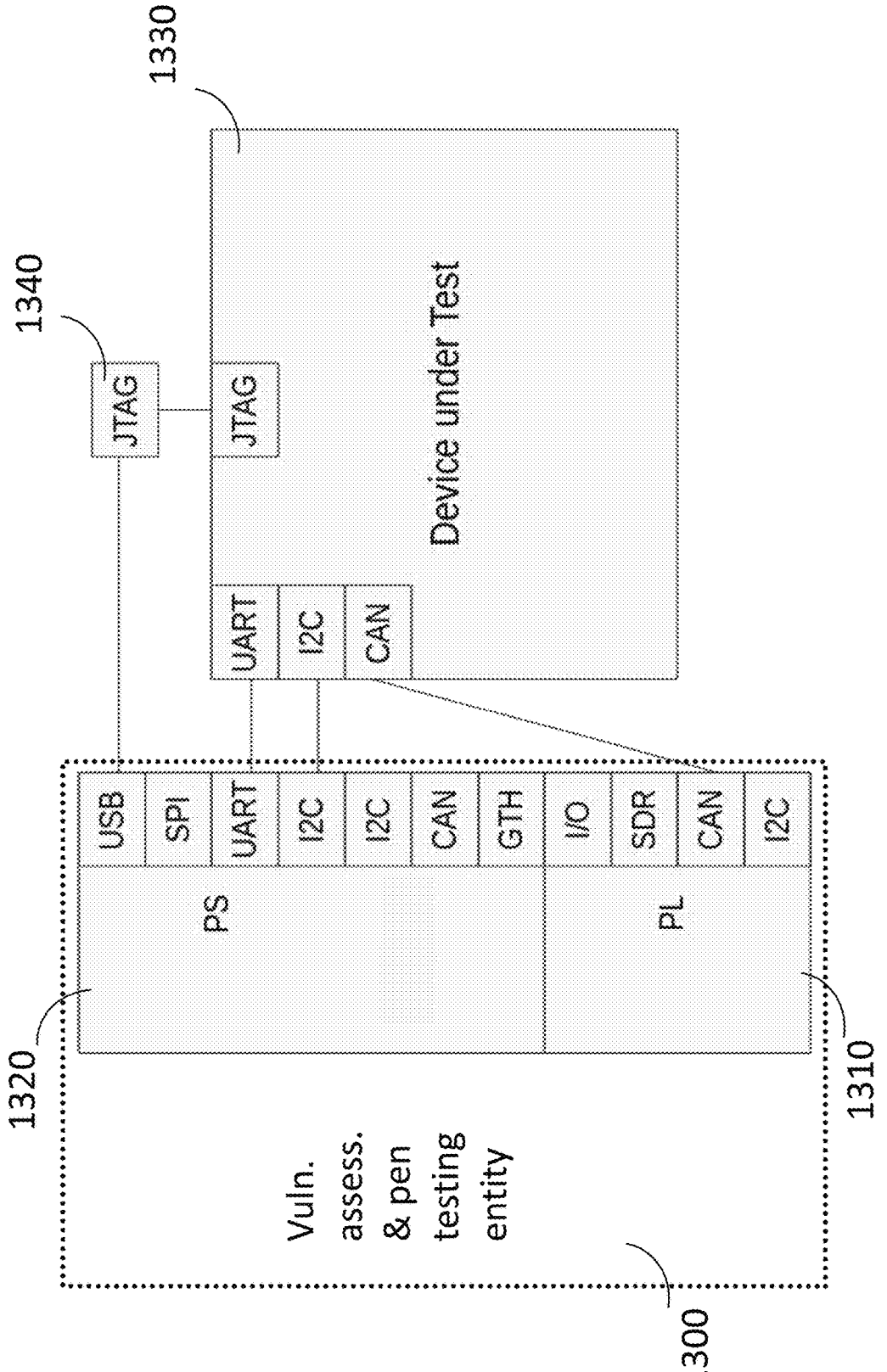
Fig. 13 – Example vulnerability assessment and penetration testing entity

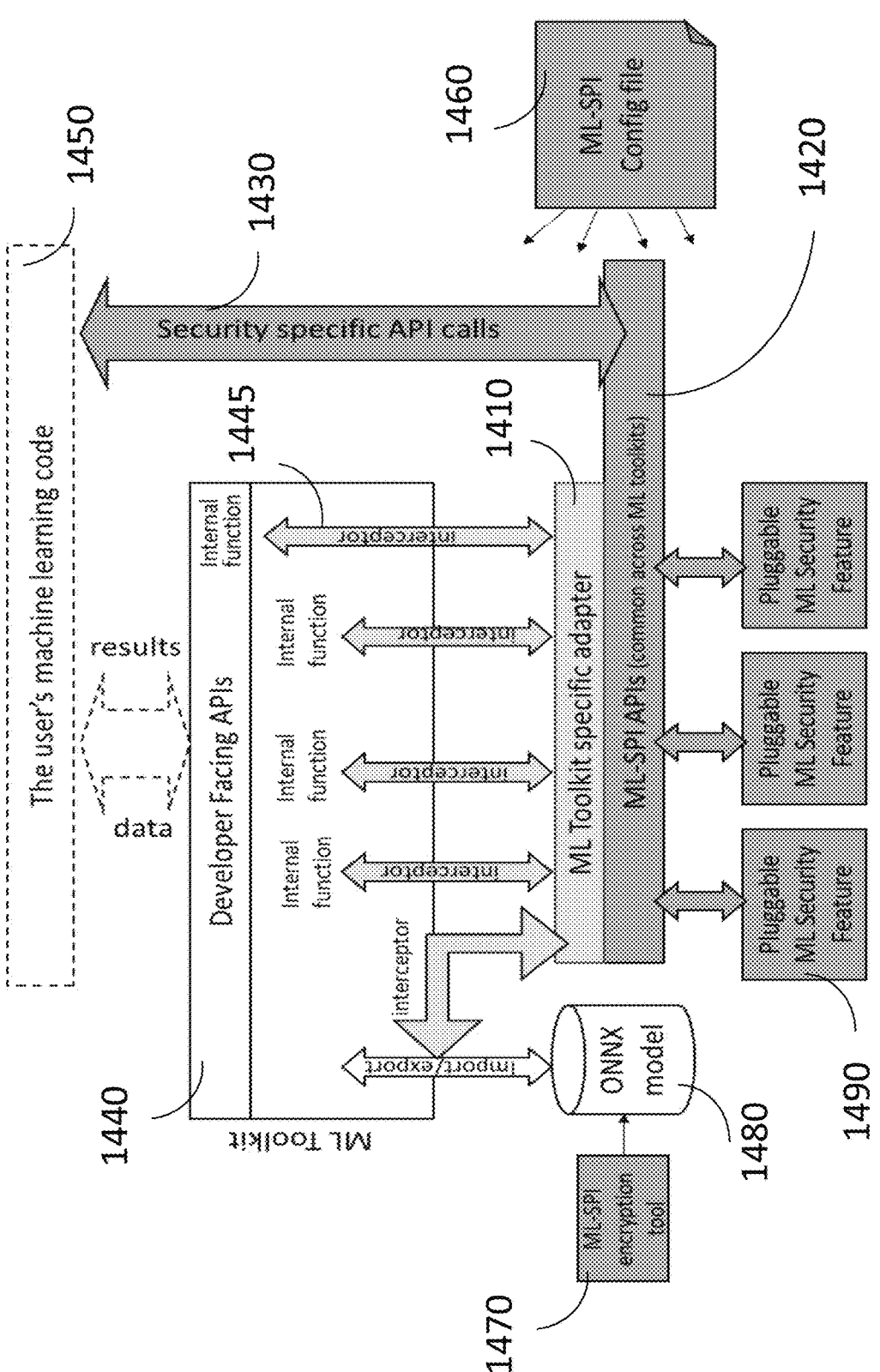
Fig. 14 – Example ML-SPI entity

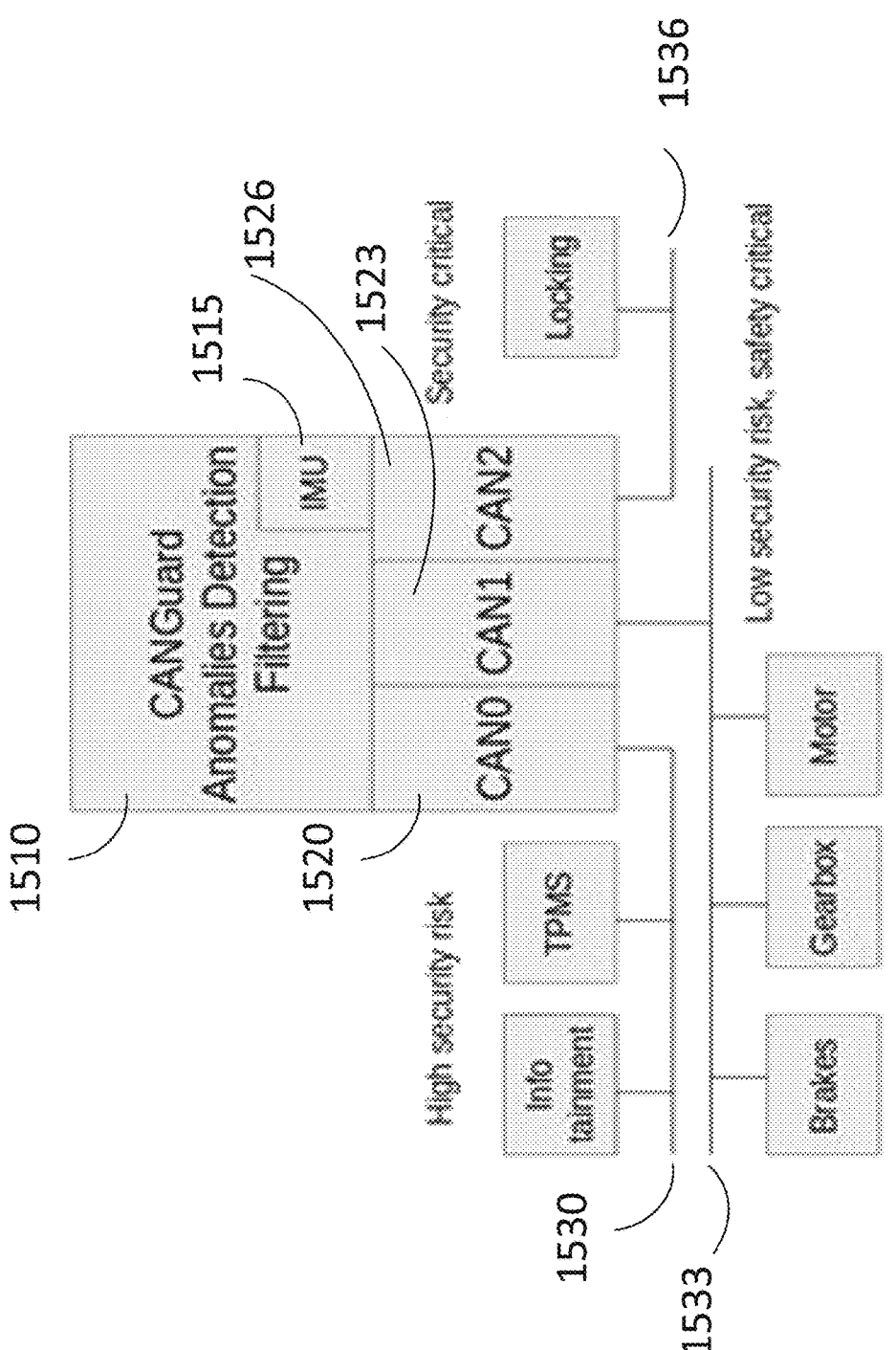
Fig. 15 — Example CANGuard entity

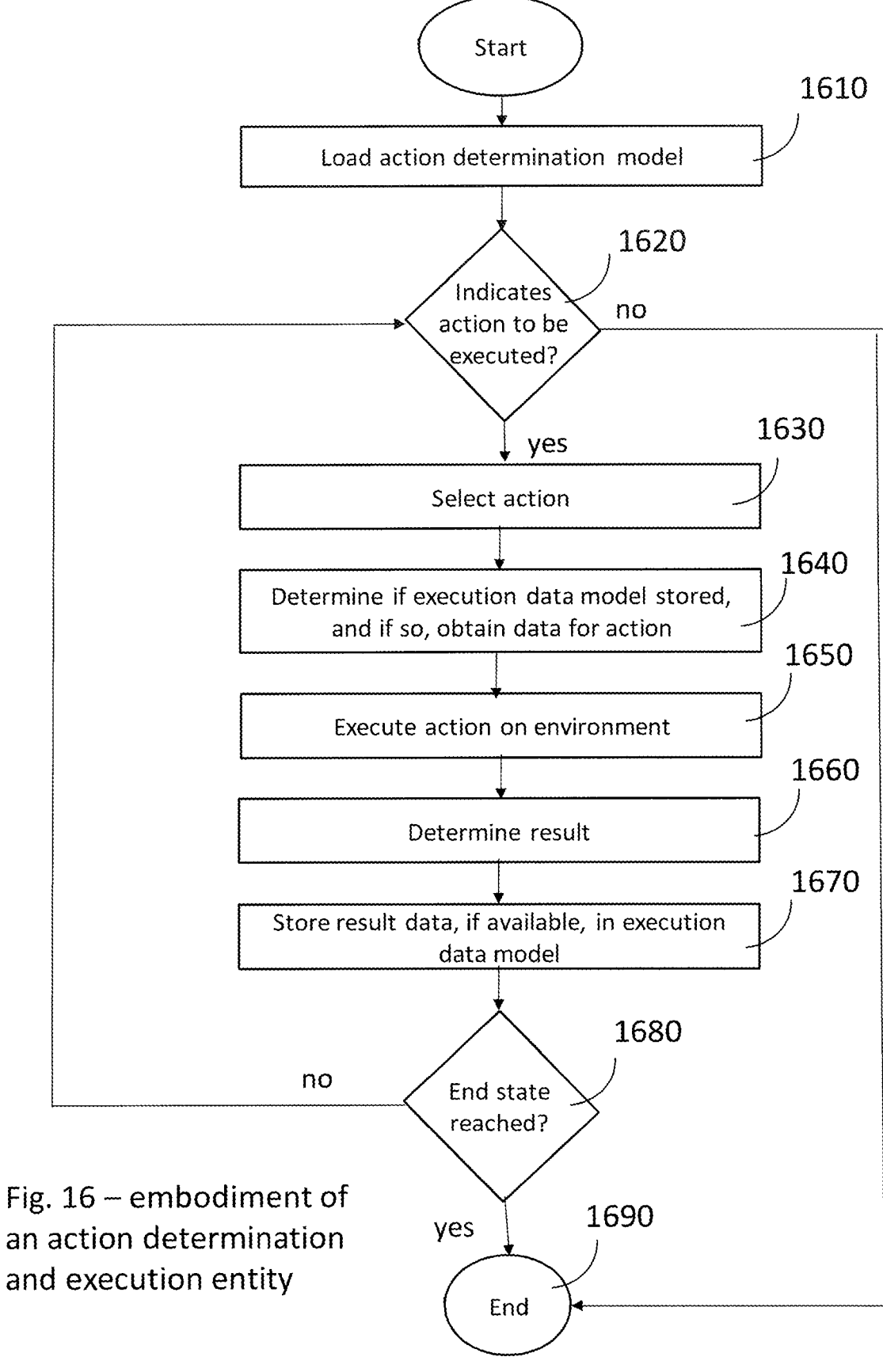
Fig. 16 – embodiment of
an action determination
and execution entity

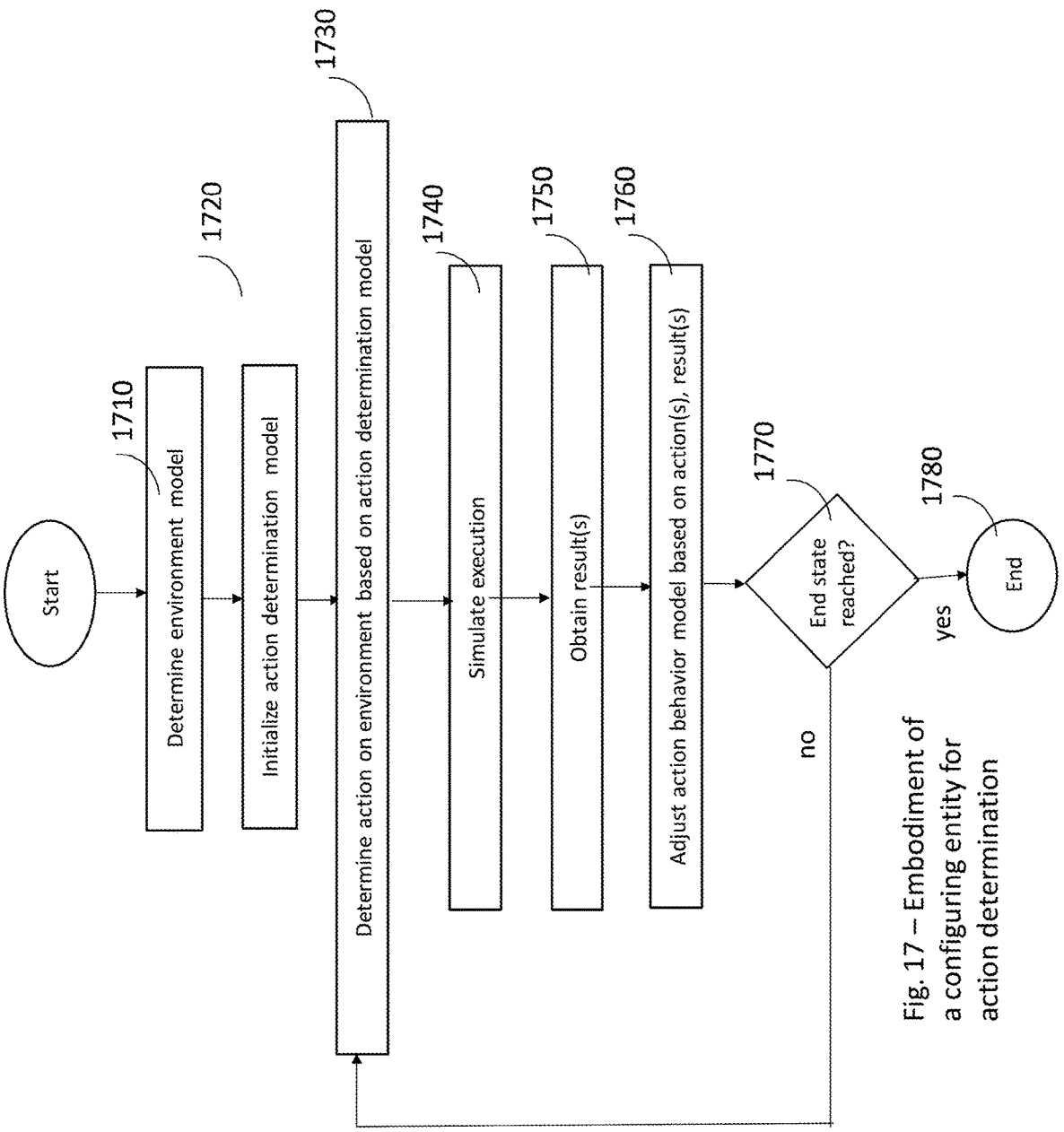
Fig. 17 – Embodiment of
a configuring entity for
action determination

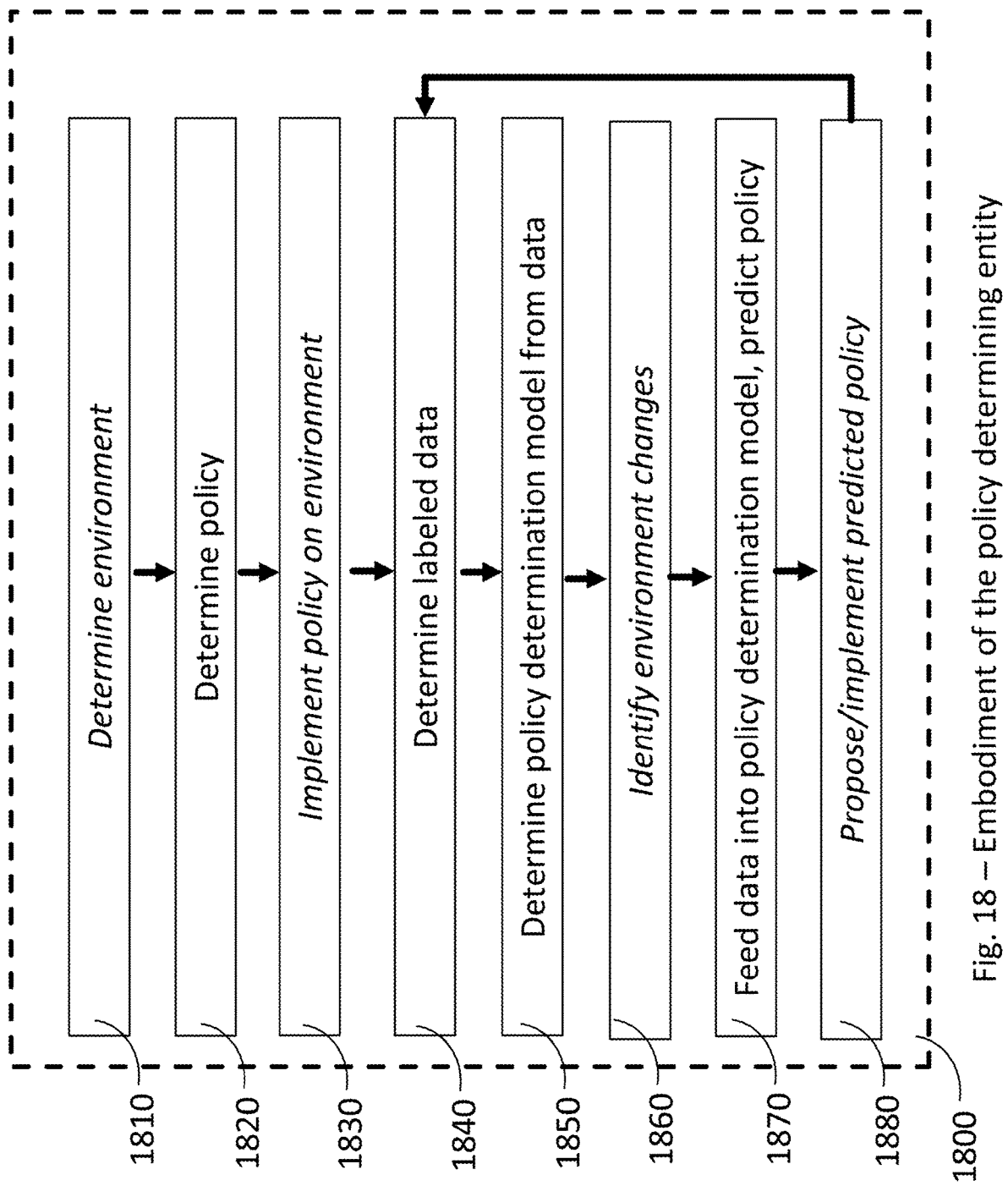
Fig. 18 – Embodiment of the policy determining entity

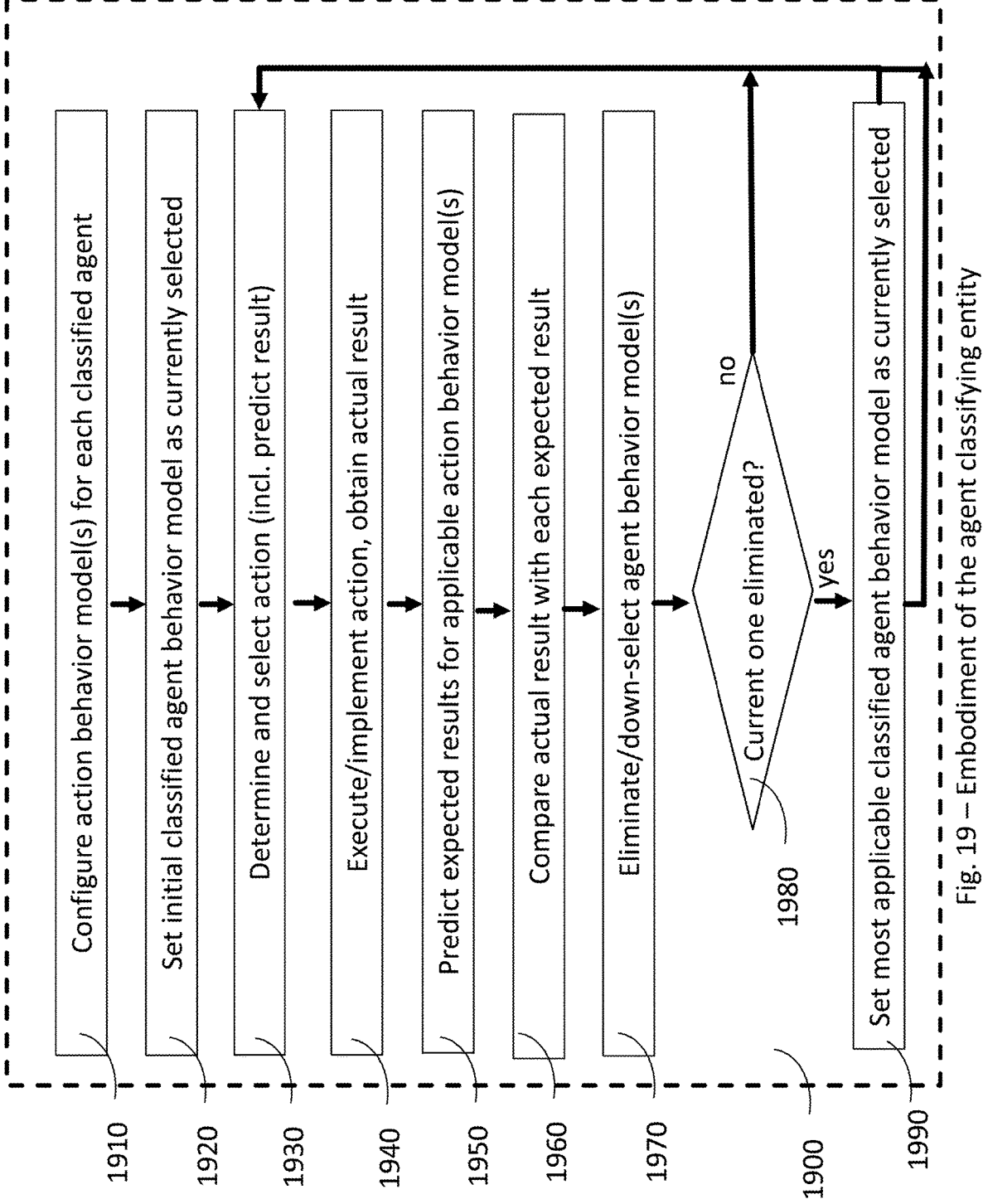
Fig. 19 – Embodiment of the agent classifying entity

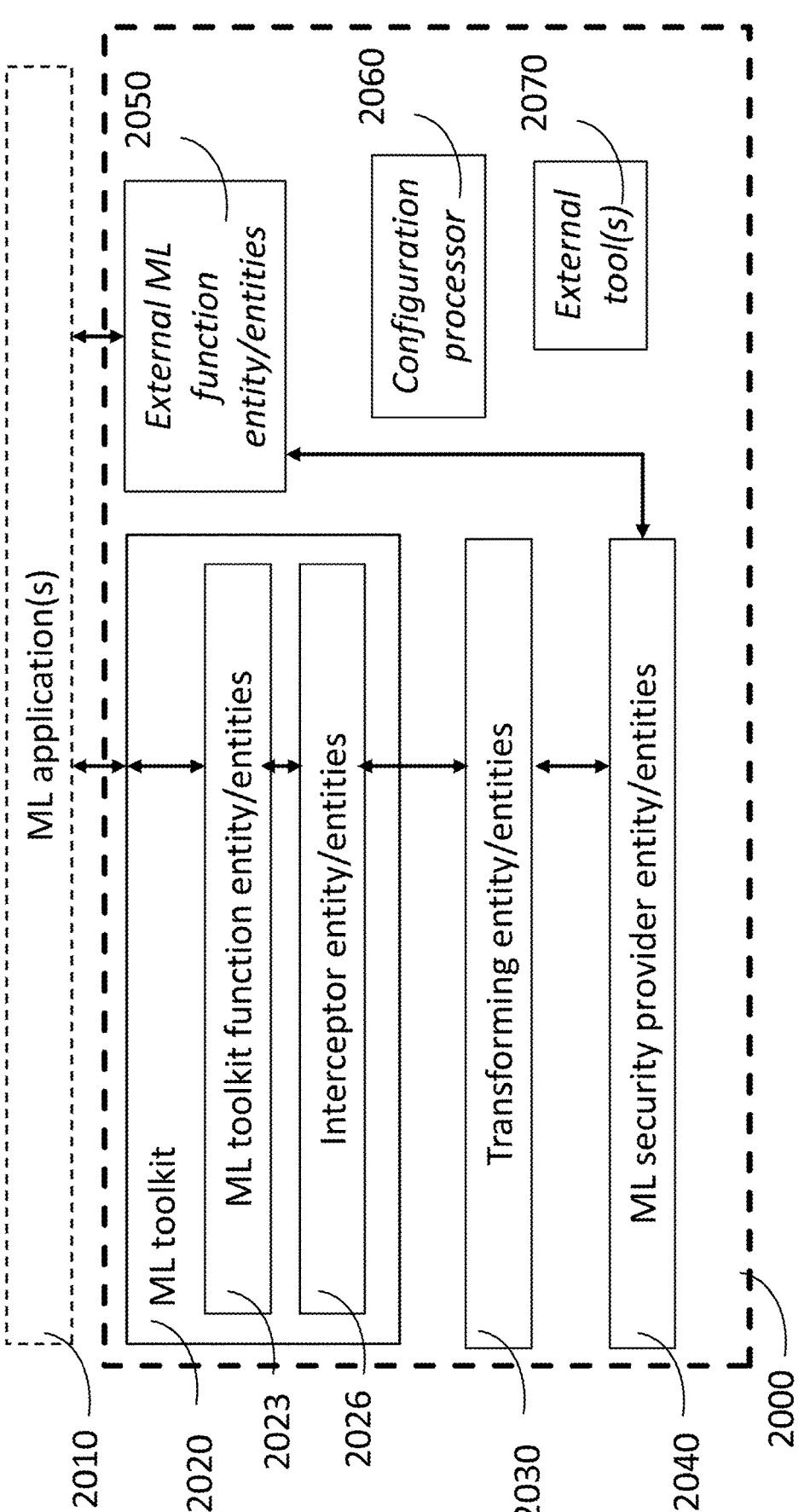
Fig. 20 – Embodiment of a secured machine learning (ML) entity

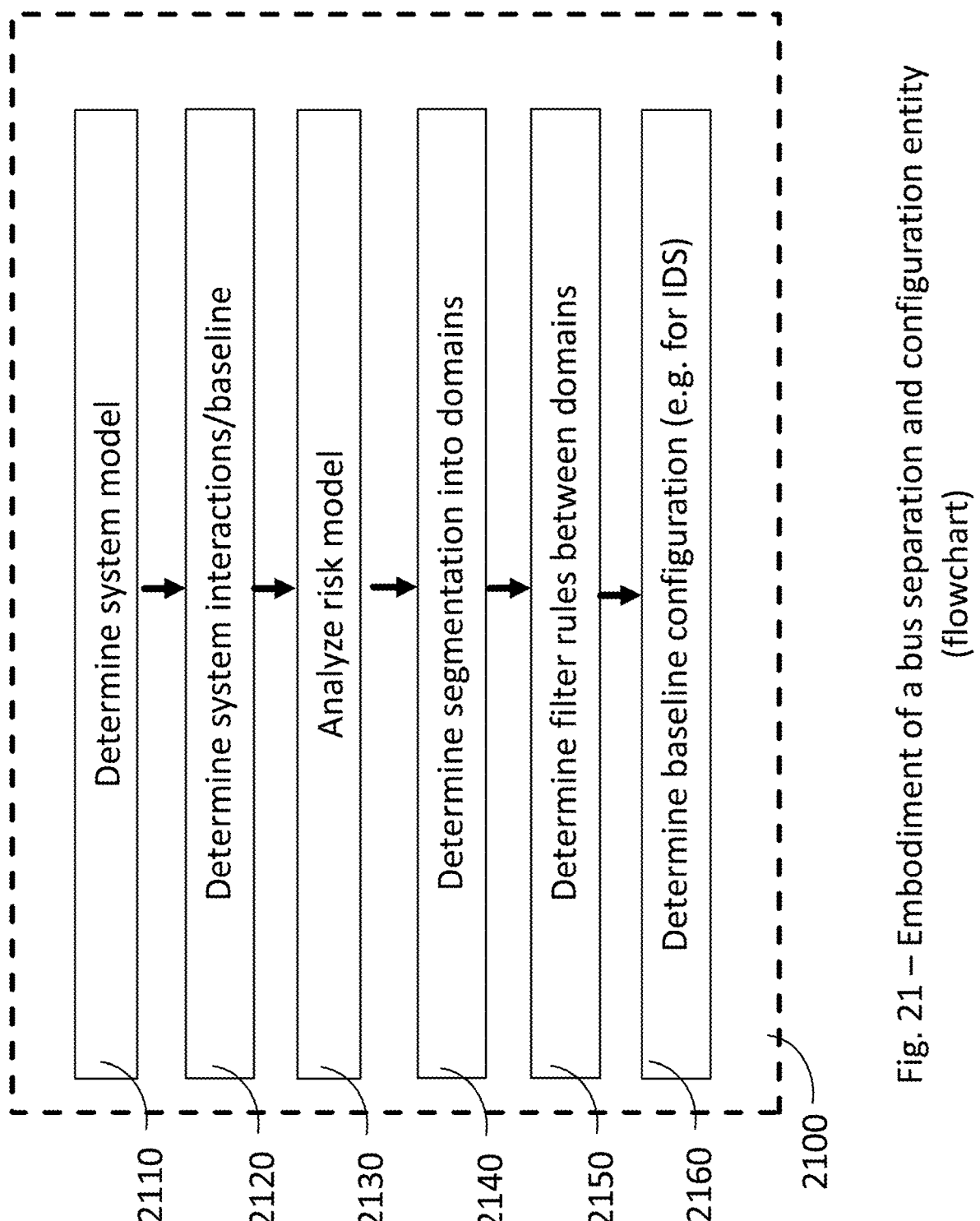
Fig. 21 – Embodiment of a bus separation and configuration entity (flowchart)

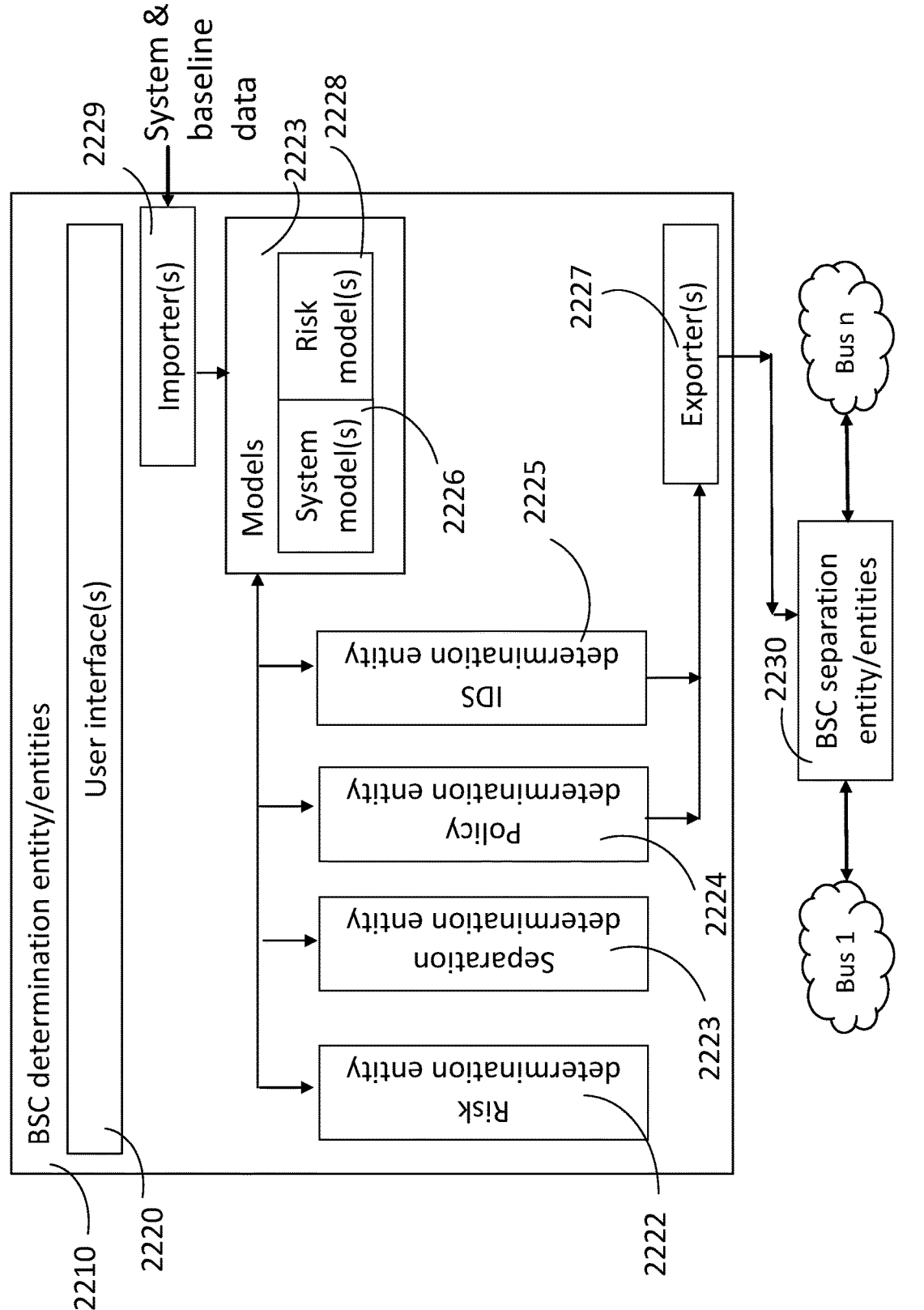
Fig. 22 – Embodiment of a bus separation and configuration (BSC) entity

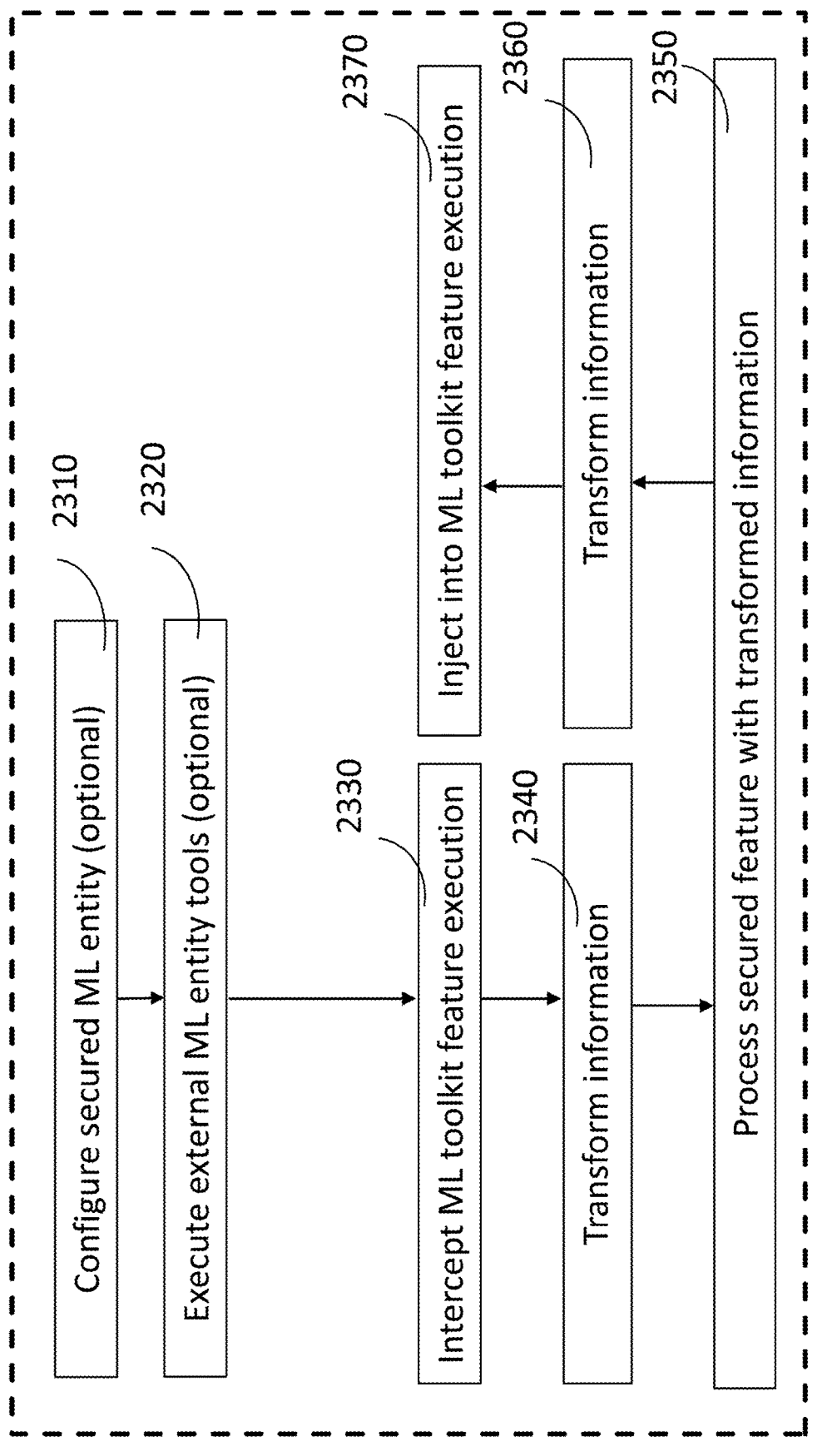
Fig. 23 – Embodiment of a secured machine learning (ML) entity (flowchart)

METHOD AND SYSTEM FOR DETERMINING POLICIES, RULES, AND AGENT CHARACTERISTICS, FOR AUTOMATING AGENTS, AND PROTECTION

This application is a Divisional of U.S. application Ser. No. 16/255,811 filed on Jan. 23, 2019, which claims priority to U.S. Provisional Application No. 62/620,858 entitled "Method and system for simulated intelligent cybersecurity red team", 62/687,742 entitled "Method and System for AI-driven cybersecurity red team automation, vulnerability assessment, deep reinforcement learning, and protecting AI-systems", 62/692,672 entitled "Method and system for determining policies", 62/750,824 entitled "Classifying agent characteristics using an automated second agent's perception", which were filed on Jan. 23, 2018, Jun. 20, 2018, Jun. 30, 2018, and Oct. 26, 2018, respectively, and which are all incorporated herein by reference.

This invention was made with Government support under HQ0147-18-C-7418 awarded by the Missile Defense Agency. The Government has certain rights in the invention.

BACKGROUND OF THE INVENTION

1. Field of the Invention

The present invention relates to assisted policy management and automation of supporting activities, assisted policy management and determining policies, agent automation, classifying agent characteristics, automation for vulnerability assessment and penetration testing, protection of neural networks, and risk mitigation of communication buses.

2. Description of the Related Art

The following background section explains why there is a need for more assisted policy management and better automation of supporting activities, which is not provided by conventional methods and systems:

Policy management faces numerous challenges. For example, conventional management of security policies (and other policies such as QoS, SLAs etc.) for computing systems is often hard for many reasons: Policies need to be authored, managed, updated, tested, analyzed, documented, enforced, monitored etc. Some exemplary challenges stem from the fact that policies are often too numerous, complex, overlapping and non-intuitive—especially technically enforceable policies. Features of such advanced policies are that they involve policy rules that are numerous, complex, feature-rich (e.g. privacy), fine-grained, contextual/dynamic etc. in particular, security policies need to capture increasingly more complex security requirements that are meaningful to business, and are often driven by compliance/accreditation requirements. Also, security policies need to increasingly move from black-listing to white-listing to increase protection). "Blacklisting" and other approaches that focus on detecting and blocking/mitigating unwelcomed contents and access cannot implement the required security policies. On the other hand, "whitelisting" and other approaches that focus on only allowing appropriate contents and access are often unmanageable using today's manual policy implementation approaches. Additionally, policies need to be enforced consistently in many places (for example across many interconnected computing devices), which adds further complexity. IT environments are increasingly complex, with today's agile (i.e. dynamically changing), complex, interconnected Systems of Systems (SoS).

Examples include Internet of Things (IoT), Machine-to-Machine (M2M), Service Oriented Architectures (SOA), Cloud computing. Related to that, it is challenging for security to ensure policies remain correctly implemented in the face of organizational and IT changes.

Many approaches have been utilized in the attempt to make policy authoring easier, including for example: using a textual specification language similar to a programming language to allow users to consistently specify policies for potentially many systems; using a text editor with content assist and validation to make "programming" policies easier; using a graphical editor that includes for example drop-down menus, expand/collapse tree editors etc. using graphical editors that draw flowcharts, graphs etc. Despite those conventional attempts, authoring policies still remains difficult.

The related work includes numerous inventions to make policy management easier, but not easy enough to facilitate wide-spread use, esp. by non-specialists.

Therefore, additional assisted policy management is needed to further make policy management even easier.

Furthermore, manual human involvement is expensive, and skills are often scarce: policy management and its various supporting activities are time-consuming and error-prone, and require skilled humans, who are usually rare and expensive. This is the case for the policy management itself where rules have to be authored, and maintained/updated. In cybersecurity, this requires scarce talent.

It is also the case for activities such as assessment and testing, as well as training. In cybersecurity, activities such as penetration testing, vulnerability assessment and (red/blue team) cybersecurity training are currently costly and require the involvement of cybersecurity experts. For example, to train defenders (blue team), a highly skilled team of ethical hackers (red team) need to "play" against the defenders during the training. For vulnerability assessments (e.g. binary vulnerability assessments), tools are available, but often human analysts still produce better results.

Some automation approaches are available, but are mostly "point solutions", e.g. for vulnerability assessment, and are not intelligent/adaptive/contextual.

Additional automation of supporting activities is needed to reduce cost/time and to become less reliant on scarce human talent. This need is true in general, not just for supporting activities for policy management: there is a need for more automated, more intelligent, more contextual, more adaptive support for many activities, ranging from the abovementioned activities to countless applications for personal and professional automated assistants (personal assistants, shopping assistants, warehousing assistants, logistics/warehouse assistants, diagnosis assistants, repairing assistants, tourist guide assistants, cooking assistants etc.).

Conventional solutions do not support this level of integration and adaptive intelligence. Systems to automate intelligently/adaptively, and/or provide intelligent/adaptive training, advice/guidance, recommendations, actions etc. are not good enough. For example, cybersecurity defenders need to regularly train to stay current. New vulnerabilities and attacks are discovered on a daily basis. Blue team vs. red team training exercises that involve humans on both sides have been used for a long time, but are expensive (and often slow). Automating one side saves cost and time, but often results in rote learning and lack of motivation to train using such systems. Better, more intelligent, more adaptive, more automated solutions are needed.

The shortcoming applies broadly to many other areas that require systems to automate intelligently/adaptively, and/or provide intelligent/adaptive/contextual training, advice/guidance, recommendations, actions, expert knowledge etc.

SUMMARY OF THE INVENTION

According to an aspect of the present invention, a method of automatically configuring at least one action determination model for at least one agent that indicates at least one action option to be executed on at least one environment by the at least one agent includes:

determining, via a processor, at least one environment model for the at least one environment which indicates attributes and behaviors of the environment and/or its context, and/or agents;

determining, via the processor, the at least one action determination model for the at least one agent that indicates the at least one action option to be executed by the at least one agent, the indication being determined by at least one objective of the at least one agent;

determining, via the processor, whether the at least one action determination model indicates at least one next action option to be executed by the at least one agent, and if so, determining, via the processor, from the at least one action option, at least one action to be executed based on the action determination model;

simulating, via the processor, at least one execution of the at least one action across the environment model, and obtaining at least one simulated result of the simulated execution;

adjusting, via the processor, the at least one action determination model based on a difference between the at least one objective and the at least one simulated result; and repeating, via the processor, until the environment or the at least one agent reach at least one end state:

determining whether the at least one action determination model indicates the at least one next action option to be executed by the at least one agent, and if so, determining from the at least one action option, the at least one action to be executed based on the action determination model;

simulating the at least one execution of the at least one action across the environment model, and obtaining the at least one simulated result of the at least one simulated execution; an adjusting the at least one action determination model based on the differences between the at least one objective and the at least one simulated result.

U.S. Pat. No. 9,043,861 to Lang et al. ("Method and system for managing security policies", which is incorporated by reference herein for its entirety, thereafter called "MDS" or "MDS patent", or "MDS1") (and U.S. Pat. Nos. 9,420,006 and 9,692,792) teaches methods and systems that can manage meaningful policies, in a way that is manageable, and that supports IT agility, and that is repeatable/traceable/verifiable. The patent explains how a "model-driven security" (MDS) approach can be used to better manage security policies, i.e. to meet (some of) the above-mentioned requirements. Additionally, U.S. Pat. No. 9,563,771 to Lang et al. ("Automated and adaptive model-driven security system and method for operating the same") teaches systems and methods for managing implementation of policies in an information technologies (IT) system. Among many other concepts, U.S. Pat. No. 9,563,771 introduces "attribute refinement" and "mapper chains", terms used throughout this document.

Furthermore, as explained in U.S. Pat. No. 8,856,863 to Lang et al. ("Method and system for rapid accreditation/re-accreditation of agile it environments, for example service oriented architecture (soa)", which is incorporated by reference herein for its entirety, thereafter called "MDSA patent") (and US patent application publication number 20140366085 A1), conventional compliance/accreditation methods are also inadequate for today's IT landscapes, because they require too much manual effort, and also usually require a static IT landscape to be verified.

Moreover, prior art (U.S. Pat. No. 9,563,771 B2 entitled "Automated and adaptive model-driven security system and method for operating the same", called "B-MDS" throughout this specification) explains how to automatically calculate so-called "mapper chains" to translate "high-level policy" rules to machine-enforceable "low-level policy" rules. "Mapper services" are calculation functions that map an input to a corresponding output (e.g. map geolocation to country code).

Furthermore, as explained in U.S. Pat. No. 9,563,771 to Lang et al. ("Automated and adaptive model-driven security system and method for operating the same)", which is incorporated by reference herein for its entirety, thereafter called "BIG-MDS patent") (and US Patent Application 2015/0269383 A1), developing policy management systems that simplify and automate policy management require many different features and designs to be effective. In particular, it explains the need for an intelligent, adaptive user experience.

These patents introduce the concepts behind model-driven security (MDS), model-driven security accreditation (MDSA), attribute-based access control (ABAC). Some aspects of the present invention relate to MDS, MDSA, and ABAC.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 illustrates example steps involved in creating labeled training data from "real" and "simulated" environments according to the present invention;

FIG. 2 illustrates example steps involved in machine learning and prediction using labeled data according to the present invention;

FIG. 3 illustrates example steps of the steps shown in FIG. 1 and FIG. 2 according to the present invention;

FIG. 4 illustrates example steps for extracting technical security policy metadata using machine learning according to the present invention;

FIG. 5 illustrates two examples of attack trees according to the present invention;

FIG. 6 illustrates an attack tree analysis metamodel example according to the present invention;

FIG. 7 illustrates a diagram of a training game environment according to the present invention;

FIG. 8 is a diagram that shows an excerpt of an attack tree according to the present invention;

FIG. 9 is a diagram that illustrates an example model for a training game environment according to the present invention;

FIG. 10 illustrates how defender classification is determined across multiple dimensions according to the present invention;

FIG. 11 illustrates console output excerpts of exemplary machine learning prediction batches according to the present invention;

FIGS. 12A-12C illustrate the progress of machine learning training over time as illustrated by the thickness of each node, indicating more likely predictions, according to the present invention;

FIG. 13. illustrates an example vulnerability assessment and penetration testing entity according to the present invention;

FIG. 14 illustrates an example machine learning security plugin interface (ML-SPI) entity according to the present invention;

FIG. 15 illustrates an example risk-reducing communication bus entity, in this example for CAN bus, according to the present invention;

FIG. 16 is a flow chart of an action determination and execution entity according to the present invention;

FIG. 17 is a flow chart of a configuring entity for action determination according to the present invention;

FIG. 18 is a flow chart of the policy determining entity according to the present invention;

FIG. 19 is a flow chart of the agent classifying entity according to the present invention;

FIG. 20 is a diagram of a secured machine learning (ML) entity according to the present invention;

FIG. 21 is a flow chart of a bus separation and configuration entity according to the present invention;

FIG. 22 is a diagram of a bus separation and configuration entity according to the present invention; and FIG. 23 is a diagram of a secured machine learning (ML) entity according to the present invention.

DETAILED DESCRIPTION

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A method and system is illustrated related to assisted policy management and automation of supporting activities, assisted policy management and determining policies, agent automation, classifying agent characteristics, automation for vulnerability assessment and penetration testing, protection of neural networks, and risk mitigation of communication buses.

Agent Automation (e.g. Agent Action Determination, Configuring Entity)

As described in the background section, automation is frequently needed to save cost, reduce reliance on skilled human users, reduce error-potential, increase responsiveness etc. (for security and other domains, such as testing).

Introduction

An agent automation feature is provided that can be trained (e.g. by a computer-implemented method executed on a processor) to automatically carry out actions (likely sequences or trees of actions) that previously needed to be manually carried out or sequenced. The present invention is generally applicable to all agents that carry out actions that can automatically (e.g. computer-implemented on a processor) be queued, sequenced, parallelized etc.

For example, conventional automated assistants will guide (e.g. computer-implemented on a processor) users through steps, e.g. cooking instructions, but will often not include sufficient sensor interfaces and adaptive intelligence to determine whether the user is carrying out the cooking steps correctly, when the step is done etc. Furthermore, conventional automated assistants do not sufficiently seamlessly integrate with actuators either, allowing them to automatically carry out actions. For example, a cooking assistant could intelligently control the cooking temperature of a meal automatically while observing the appearance of the meal and the user's actions, and guide the user to do things, as well as control the cooker's temperature.

Other examples for automated agents (e.g. assistants, trainers, players, guides etc.): a repair task that involves diagnosing a problem (e.g. by guiding the user through a series of steps observed by the assistant e.g. using image object recognition), ordering (or picking up) repair parts/materials from a store, guiding the user through repair steps while observing progress, and adapting dynamically based on repair progress. In yet another example, a cybersecurity vulnerability assessment system guides a (potentially unskilled) user through a series of steps to connect the system to a Device under Test (DuT), e.g. by asking to take photos and analyzing them (e.g. using machine learning approaches such as image object recognition and/or text extraction) for device kind, where plugs are, where screws are etc., or observing in real-time using video feeds (e.g. captured via smart glasses worn by the user); then instructing the user which tools to take and where to unplug/unscrew/open the device, potentially again observing user actions and progress in real-time, and providing adaptive guidance etc. For example, a step executed by the agent entity could involve capturing a photo of a circuit board (e.g. using a device camera operated by the user, e.g. smart glasses), then using text extraction machine learning approaches known to those skilled in the art (and for example implemented in Google Vision API, see cloud- .google.com/vision) to determine location and content of symbols/text from the circuit board photo. This information then allows the (e.g. computer-implemented on a processor) agent entity to determine the next steps, e.g. which connectors are available, and where, may determine the next instructions to the user, e.g. where to plug in a connector; or e.g. determining CPU brand/model and thus selecting a particular automated testing tool for the particular processor architecture. The agent entity can therefore for example execute (e.g. on a processor) any combination of automated steps (e.g. based on particular inputs or already-discovered information, e.g. read by a processor from a memory or storage) and manual steps (e.g. guiding the user to carry out an action, such as taking a photo, entering something on a device, utilizing some tool etc., providing inputs into the agent entity etc.) The described examples of automated and/or manual actions sequenced by an agent entity could for example be used to guide a user intelligently through diagnosing, testing, assessing, repairing, assembling, disassembling, operating etc. a particular device.

In the present invention, agent action implementations can include a mechanism to store information used for different kinds of use cases, for example software programs, trained neural nets, etc. In an example, this information is made available to a user, for example via a cloud service, and can for example be accessed using a feature on a device (e.g. like an app store) that e.g. implements the present invention. For example, the information configures the present invention for a particular use case. Information may be obtained, purchased or rented/leased for a particular task, and users may be charged for using the information within the present information. For example, a user of the present invention that is for example implemented using networked "smart glasses" with a camera and display etc. (e.g. Google Glass, Microsoft HoloLens) wishes to carry out a particular task for which configuration information ("app") is available, finds/selects the app, pays (e.g. via an online mechanism) and downloads the app, then carries out the task, which involves for example being guided by the present invention, which carries out one or more actions, that may be automated, may provide user guidance e.g. via audio, may collect information e.g. via video etc. If the app is rented for example for single use or the use period expired, the configuration gets deleted. In an example, the present invention automatically determines e.g. by observing an environment, that a particular use case is applicable and semi-automates or automates the process described above.

Agent Action Determination and Execution

FIG. 16 shows a flowchart of an example of the present invention that partly or fully automates at least one agent for at least one environment. In an example of the present invention, an environment can pertain to Information Technology (IT) environments, for example assets (systems, applications, networks, information buses etc.), as well as behaviors (such a network traffic, state changes, sensor/actuator changes etc.) In IT environments, the agent's actions can include for example inputs, data processing, and outputs related to an IT environment, for example configuring/re-configuring, generating, reading/ingesting, writing, transmitting, configuring etc. An environment can for example pertain to organizations, for example processes, workflows, logistics chains, supply chains etc. In organizational environments, the agent's actions can include for example identification of the need for workflow/process changes, and instructions to change workflows/processes. An environment can for example pertain to people (e.g. instructions for human users), for example users guided by the present invention's actions to complete a task—involving inputs (e.g. audio/visual/sensor, textual etc.) and outputs (e.g. guidance, assistance, recommendations, alarms, notifications etc.). Actions can for example pertain to any combination of these and other environments, and any combination of automated and manual (involving humans) actions. The invention is a system, and therefore all action inputs and outputs have a technical manifestation (e.g. ingested data from video feed, outputted audio guidance), even if the environment it pertains to may not be technical (e.g. human user).

In the case of organizations and humans, the present invention processes inputs and outputs to from humans using a computer, incl. processor, memory, storage, and potentially inputs, such as video/photo/audio/sensors (e.g. thermometer) etc., and outputs, such as audio/video/photo/textual/graphical etc. instructions, and/or actuators (e.g. temperature control). More broadly, this specification collectively refers to these examples (and others) as the "environment" of the present invention, i.e. the policies pertain to an "environment" (e.g. IT environments, organizational environment, people etc.).

The present invention includes an agent action determination and action execution entity, e.g. executed by a processor, as follows:

loading (1610), by a processor, from a data storage or a memory, at least one action determination model that indicates (1620) at least one action option to be executed by the at least one agent, the indication being determined by the agent's at least one objective. Objectives can for example include any of (potentially successful) attacking, defending, preventing, assessing, testing, evaluating, alarming, monitoring, providing a service, maintaining, updating, analyzing, deceiving, action execution, action sequence execution etc.

The action determination model can for example be one or more of a trained neural network, rule engine, model transformation, model execution, statistical model, stochastic model, probabilistic model, artificial reasoning model, reinforcement learning model, inference model, program, fuzzy logic, decision tree etc. An action determination model defines, for example, at least one next action to select in at least one given context, actions being for example to execute logic to collect an input, execute a program etc.

At least one next action can for example be relative to the at least one current action to select (whereby relative is for example determined by trees, graphs, relationships), or independently of the at least one current action etc.

An action determination model can for example determine one or more of attacker action, attack action, exploit action, defender action, defending action, detection action, mitigation action, prevention action, alarm/alert action, monitoring action, evaluator action, tester action, penetration testing action, vulnerability assessment action, recommendations for human users, configuration action for machines, policy (e.g. security) based action, rule-based action, configuration action, user input action, user output action, data ingestion action, repair action, assembly/disassembly action, preparing action, use action, disposal action, maintenance action, directing action, informational action, entertaining action, diagnosing action, transaction action, purchasing action, selling action, decision action, training action, education action, buying action, notification action, deception action, distraction action, timing action, delay action, support action, redirect action, a transfer action etc.

determining, by a processor, whether the at least one action determination model indicates at least one next action option to be executed by the at least one agent, and if so, determining (1630), by a processor, from the at least one action option, an action to be executed based on the action determination model.

Such determination can for example be partly or fully based on the success likelihood of the at least one action, the success likelihood being based on the action determination model, and/or on agent characteristics, and/or on aspects of the at least one environment.

determining (1640), by a processor, whether an execution data model has already been stored, and if so, obtain data from the execution data model data pertaining to the at least one determined action on the at least one environment, if that at least one action requires at least one precondition.

Precondition can for example include one or more of required data, required environment state, required agent state, state of one or more previous actions, such as success, failure, unknown, error.

executing (1650), by a processor, the at least one action on the at least one environment.

Executing can for example comprise executing logic on at least one IT system. Executing can comprise for example instructing organizations to carry out, modify etc. process/ workflow steps, warehouse/logistics aspects (e.g. item stocking, placement). Executing can for example comprise instructing human users to carry out activities, e.g. plug a cable into a device, provide data input into a system etc. Note that executing can also include gathering inputs, e.g. from IT systems (e.g. network traffic), organizations (e.g. process information), and people (e.g. progress of activity).

determining (1660), by a processor, the at least one result of the at least one action. A result of the at least one action can for example include one or more of environment effects, agent effects, console output, data returned by the action, data returned by the environment, data returned by the agent, data provided by an organization, user, sensor inputs etc.

Result/results of the at least one action can for example be determined by any combination of for example delayed, blocking-based, non-blocking-based, parallelized, phased, staggered, triggered, dependent on other results or actions.

A result of an at least one action can include for example environment effects, agent effects, console output, data returned by the action, data returned by the environment, context data, metadata, data returned by the agent.

storing (1670) data pertaining to the at least one result, if available, in an execution data model;

determining whether an end state is reached (1680), and if not, repeating, until the environment or agent reach at least one end state: determining, by a processor, whether the at least one action determination model indicates at least one next action option to be executed by the at least one agent, and if so, determining, by a processor, from the at least one action option, an action to be executed based on the action determination model; determining, by a processor, whether an execution data model has already been stored, and if so, obtain data from the execution data model data pertaining to the at least one determined action on the at least one environment, if that at least one action requires at least one precondition.

End state (1690) can for example include for example success or failure (or other states such as unknown, error etc.) of the at least one agent's objectives.

Configuring of Agent Action Determination

The present invention also includes an Artificial Intelligence (AI) entity, which can be implemented using any combinations of AI techniques, incl. explicitly programmed, neural networks, machine learning, game AI, rule engines, fuzzy logic, etc.

The AI based entity can for example be configured using neural network(s), and can for example learn (e.g. using machine learning approaches) relevant characteristics (incl. the abovementioned ones) that influence attacker agent behavior (and defender scoring).

Numerous neural network configurations can be implemented in the present invention, including for example learning successful attack tree steps and branches, and which attack actions work against which defender actions. To train the neural networks, various techniques known to those skilled in the art of machine learning are used, incl. (deep) reinforcement learning: A simulation that includes one or more environments (e.g. simulated IT assets, vulnerabilities etc.), one or more automated attacker agent entities, and one or more simulated defender agent entities is executed (repeatedly) to train a neural network using reinforcement learning. Such a simulation is a fully automated "computer game" executed (repeatedly) by the reinforcement learning feature, where the reinforcement learning system instructs the next action to the simulation, and receives observations (e.g. wins or loses, or there is a draw, unknown, finish, or error result), a reward etc. A common deep reinforcement learning technique includes adding to a "batch" each iteration of the game play, where the attacker agent steps through an attack sequence based on the neural net's predictions (which could be partly parallelized) and returns an observation. Each batch is then filtered (usually based on a reward threshold) and used to optimize the neural net. After a number of batches, the neural net's accuracy predicts the correct sequencing for the simulated training game (and the particular simulated defender characteristics).

FIG. 17 illustrates an example process for automatically configuring at least one action determination model for at least one agent that indicates at least one action option to be executed on at least one environment by at least one agent, comprising;

determining (1710), by a processor, e.g. by loading from a memory or storage or by detecting, at least one environment model for the at least one environment which indicates attributes and behaviors of the environment and/or its context, and/or agents;

initializing (1720), by a processor, e.g. by generating or by loading from a memory or storage, at least one action determination model for the at least one actor behavior model determining (1730), by a processor, based on the at least one actor determination model, which defines actions and expected results, at least one action to be carried out on the environment by the agent;

simulating (1740), on a processor, the at least one execution of the at least one action across the environment model. Simulating can comprise one or more of simulating the effects of executing logic on at least one IT system, simulating the invention's inputs and outputs related to organizations and/or people etc.

obtaining (1750), by a processor, the simulated result of the at least one simulated execution adjusting (1760), by a processor, the at least one action determination model based on the differences between the at least one expected result and the at least one simulated result. Adjusting can for example involve any of machine learning, reinforcement learning, deep reinforcement learning etc.

until an end state (1780) is reached (for example the differences between the at least one expected result and the at least one simulated are below a threshold), repeating (1770), by a processor: determining, based on the at least one actor determination model, at least one action to be carried out on the environment by the agent; simulating the at least one execution of the at least one action across the environment model, and obtaining the simulated result of the at least one simulated execution; adjusting the at least one actor determination model based on the differences between the at least one expected result and the at least one simulated result.

The various examples and details presented for the present invention described in FIG. 16 can also apply to the process described in FIG. 17, incl. examples of environments, action determination models, results, actions etc.

FIG. 11 illustrates example predictions of the invention during training using deep reinforcement learning: in the first batch (batch 0), there are many incorrect predictions (leading to failed simulated attack attempts), while in a later batch (batch 138) the neural net has been trained to always predict the branch that is most likely to be successful. FIGS. 12A-12C illustrate how an attack tree neural net learns through reinforcement learning which attack tree branch is more successful against a simulated defender in the particular environment (thicker lines means more visits, which means more reinforced).

In summary, the AI entity can for example comprise of several machine learning models (e.g. neural networks) to learn different relevant behaviors and information. It is queried from an agent action determination and execution entity (e.g. the attack/behavior tree execution entity) to assist making decisions, for example: when the execution entity reaches a particular tree node (attack step) it provides the node as an input into the neural network, which returns the success probability for each sub path. The execution entity then uses a random number calculation so that each path is chosen with its respective probability.

In an example, the success probabilities for each action in the attack tree during simulation/training can be hand-specified by humans (esp. cybersecurity professionals). In an example, success probabilities can be determined using existing information sources such as experimental results). In an example, success probabilities can be determined using Generative Adversarial Network (GAN) machine learning approaches known to those skilled in the art.

The simulated environment can for example include cause-and-effect logic, e.g. dependencies (e.g. between exploits, vulnerabilities, assets etc.), as well as timing, phasing, duration, simultaneity (e.g. for long-running actions), as well as environment behaviors (e.g. user behaviors) to simulate corresponding real-world cause-and-effects and/or timings and/or behaviors. In the present invention, the environment simulation can for example include asset models, vulnerability models exploit models, attacker and defender tool models etc. In the present invention, pre-conditions and/or post-conditions for actions can for example not taken into account for determining actions, or, for example, pre-conditions and/or post-conditions for actions can be taken into account for determining actions.

In the present invention, action sequences can for example be defined by a tree/graph structure. The action sequences can for example be defined by pre-/post-conditions of actions (e.g. post-conditions of an action may become pre-conditions for the next action). The system can for example construct a tree/graph from individual actions based on pre-/post-conditions. In the present invention, the system can for example deconstruct a tree/graph into individual actions based on pre-/post-conditions. The result of an action can for example indicate that pre-condition(s) are not met to execute the action.

In the present invention, agent automation can for example comprise first configuring agent action determination (e.g. training a neural net using a simulation and reinforcement learning) and then determining (e.g. operational) actions based on the action determination (e.g. trained neural net). The agent automation can for example further comprise re-configuring/updating agent action determination during (e.g. operational) action determination and execution (e.g. ongoing neural net training during operational use, e.g. using reinforcement learning). A potential effect of the latter approach is that agent automation would be able to continue to learn and adapt during operational use of an agent automation system.

In the present invention, agent automation can for example determine (e.g. predict) the next action. For example, it can determine a sequence of next actions. A potential benefit is to be able to determine the most appropriate next action at each point in time based on a sequence of past and possible future actions. In the present invention, it may for example determine actions or sequences of actions across iterations (e.g. game runs). A potential benefit is to be able to determine evolution across iterations: for example, the present invention can be directed at a cybersecurity training exercise could be able to determine that a human defender who learns a defensive measure during a training exercise is most likely to learn a particular other/additional defensive measure during their next training exercise.

In the present invention, agent action implementations can for example be "pluggable", allowing computer-implemented actions (e.g. exploits) to be added to the agent automation system. Such plug-ins may for example self-describe their features to the automation system. The agent automation system may for example include authoring support for features, incl. behavior trees/graphs, simulation features etc. Self-describing plug-ins can for example feed data about themselves into such an authoring system to reduce human authoring effort (for example for game levels, attack trees etc.).

Agent Automation Embodiment for Training

The present invention comprises an action (e.g. attack) execution and sequencing entity that can parse an attack model (e.g. by a processor, incl. loading from memory or storage) and executes (e.g. by a processor) each step, and then select a sub-branch (i.e. child node) based on numerous factors, incl. for example: (1) success/failure of the attack step execution in that step; (2) characteristics such as overall success likelihood of the entire sub-branch; (3) characteristics of the attacker and the next attack steps, e.g. difficulty of the attack vs. attacker skill level; (4) predictions based on by A feature; (5) probabilistic randomness; (6) viability of a child node (e.g. has not previously failed) etc.

The attack action execution entity can for example technically execute (e.g. by a processor) attack steps against systems on the network or against applications by executing scripts (e.g. by a processor, and e.g. loaded from a memory or storage). For example, using Metasploit, a hacker toolkit, which supports advanced scripting, or by executing scripts.

The attack action execution entity also obtains the result of each action execution step, for example by parsing (e.g. by a processor) a script output (e.g. errors, unsuccessful attempts etc.). In many cases, success/failure is evident to the attack execution entity from the output of the attack execution step (e.g. successful unauthorized login). In the present invention, the attack action execution entity can for example test (e.g. on a processor) the success of the action directly (e.g. for a password exploit, log in to confirm it works, and jump to the next step—deciding whether an attack is complete, aborting and starting a new attack, or picking the next step). In another example of the present invention, the attack agent entity may for example not know the success of an action execution step until it executes another action to check for success/failure.

In the present invention, the attack action execution entity can for example store (e.g. by a processor, on a memory or storage) relevant information obtained from the execution result for future use by subsequent execution steps. Example implementations of storage for storing such information includes storing on a memory or storage in a common taxonomy, metamodel, ontology, database, graph structure, or in raw form. For example, if a network scanner software tool returns IP addresses and open ports of all hosts on the current subnet, this information needs to be stored so that subsequent steps can (for example) execute exploits on particular open ports on particular IP addresses. In an example, the information to be stored may be provided by a human (e.g. user), e.g. by inputting data into the agent action determining entity.

In the present invention, the attack action execution entity can for example keep track (e.g. by storing/loading, by a processor, position information on a memory or storage) of where the attacker agent entity currently is in the attack tree. This can for example enable the attack action execution entity to determine (e.g. by a processor) the correct exploit for a selected (by an AI entity's prediction, see below for more information) child node. Furthermore, it can for example allow the attacker agent entity to recover after execution steps failed, for example by first attempting to select (e.g. by a processor) from all viable siblings, relative to the current position, in descending prediction probability, and then moving up to the parent and trying siblings until either an alternative is found, or the attacker has no further options.

In another aspect of the present invention, the AI entity (described further below) can for example predict actions (e.g. exploits) directly, rather than children of a tree/graph etc.

An example of the present invention concerns the automation of at least one intelligent, adaptive "red team" cybersecurity attacker.

Background information: Cybersecurity defenders need to regularly train to stay current. New vulnerabilities and attacks are discovered on a daily basis. Blue team vs. red team training exercises that involve humans on both sides have been used for a long time, but are expensive (and often slow). Automating one side saves cost and time, but often results in rote learning and lack of motivation to train using such systems.

The present invention for example relate to an intelligent simulated cybersecurity red team system, and in particular to an overall training gaming concept that includes a capable, dynamic, and adaptive red team non-player character. The goal is for example to make cybersecurity Blue Team training games better (more dynamic, motivating, and effective training) and faster/cheaper (simulated instead of human Red Team).

Example objectives for the present invention related to intelligent simulated cybersecurity training may include:

Reduce cost by automating human red teams

Increase game dynamicity and intelligence over existing static approaches

Increase performance (responsiveness) over existing approaches (e.g. wait time between steps)

Support "playing fields" (e.g. virtualized) that resembles operational users' actual IT environment Provide users with defender tools similar to the ones they are familiar with:

Support/implement the most common attack vectors:

Support quantitative training game feedback, scores/rewards and training to players:

Flexibility

In the present invention, such a system can be quite straightforward, for example with only one human player playing against one non-player character (NPC)—or it can for example involve multiple players/NPCs. In the present invention, the playing field can for example comprise a virtual machine with defender tools, connected to numerous virtual machines on a network with vulnerabilities (playing field), and there is an attacker virtual machine (that at least initially includes the neural network). In another aspect of the present invention, the playing field can for example consist of actual "bare metal" hosts and physical networks.

In the present invention, there may for example be no strict rules that make the game logical (like chess rules, for example). Instead defenders may for example just have access to defender tools and try to identify vulnerabilities (and fix them) and try to detect attacker actions (and mitigate them). There may for example be no clear back-and-forth "taking turns" because there is no taking turns in the real cybersecurity world either. However, the automated agent may for example give the human player a chance and adapt to the skill level of the player, in order to keep the human player engaged and motivated.

In an example, the present invention comprises a novel, automated (e.g. computer-implemented) and intelligent/adaptive red team attacker entity (aka. agent entity), virtualized playing field with lifecycle automation, adaptive scoring and more. This non-player character is able to intelligently choose its actions through an attack behavior tree and execute attack steps across a "playing field". The playing field is an actual networked IT environment hosted within a virtual machine environment. Using techniques known to those skilled in the art (e.g. machine learning, rule engines, decision trees, fuzzy logic etc.), the automated (or semi-automated) attacker can adapt its choices of steps over time based on success/failure/unknown/error etc. results of actions, the defender's behaviors etc. For example, if the defender detects or thwarts a particular attack action, the machine learning algorithms can learn that this attack was unsuccessful, and the attacker algorithm can attempt to select a different path to a successful attack next time. In an example, the adaptive attacker algorithm will attempt to only carry out attacks that match the skill level of the net defender learned via neural networks over time.

The agent entity, which in an example of the present invention may be the adaptive attacker behavior tree/graph feature, makes the (automated/semi-automated) attacker intelligent, adaptive, and dynamic. In the present invention it can for example use attack tree/graph modeling and artificial intelligence: Attack trees are known to those skilled in the art and are used to describe how cyber-attacks can be carried out. Attack graphs are similar but not limited to a tree structure. Many attacks require several steps to succeed, and attack trees structure those steps into trees, with each branch describing a potentially successful attack.

FIG. 5A illustrates an example of a common web server compromise. While the example only outlines one attack path through an attack graph, it serves as a good example of the kinds of steps the automated attacker needs to be able execute. FIG. 5B shows another (mock) example to illustrate a simplified attack graph (realistic attacks are usually quite complex and involve numerous steps, and may not follow a strict tree structure, but rather a graph structure).

In an example, the present invention may capture a model of the attacker behavior using behavior trees common in computer game development and known to those skilled in the art. Behavior trees resemble attack trees/graphs, together with the scripts for each step that need to be run to execute the attack step on the "playing field", and a mechanism for storing information between attacks steps. In an example, the attacker may know the IT environments of the playing field, and uses this information to automatically exclude any paths for which there are no exploitable vulnerabilities.

The agent entity may for example also include characteristics of the attacker that would impact attacker behavior. For example, a thief will be more likely to operate stealthy, while a hacktivist will aim for disruption. Other exemplary characteristics include the skill level of the attacker, and some randomness.

The attack tree can for example be modeled using a metamodel approach, such as Eclipse Modeling Framework (EMF). An example attack tree in EMF is shown in FIG. 6. In other aspect of the present invention, ontologies, in-memory graphs, database structure, graph databases, programs, and other information modeling approaches may be used.

In an example, the attacker agent entity may not only learn how to hack as such, but rather learn about the defender player, for example which attack steps the defender is more likely to detect (i.e., what works and what doesn't for which player), which skill level the player has, what motivates the player etc. For example, the defender player can be characterized using surveys, parsing/monitoring behaviors (e.g. console commands), the effect of defender actions on the playing field, the effect of defender actions on the attacker etc. Furthermore, it should adapt its strategy based on which kinds of attack steps the player has previously (repeatedly?) correctly detected and thwarted; also, the attacker should adapt the level of difficulty by learning from defender actions.

The present invention can include a (e.g. computer-implemented) game manager entity, which is for example responsible for:

Starting and terminating the "playing field" (virtual machines), the player machine, and the attacker machine.

Collecting information about player scores and behaviors

Storing attack information across game runs, esp. learned information (incl. neural network trained data)

In the present invention, an example of the game manager comprises of pre-installed/configured virtual machines (VMs) with various applications (e.g. web server, database, file server etc.), which form building blocks for each gaming level. Players start by logging into a user portal on the game manager machine, select levels, view scores etc., and then get redirected to the defender VM. The game manager machine is always on and keeps a log of all machines together with meta-information, such as which vulnerabilities are present in each system. The network configuration between the machines can for example be simplistic, either one flat virtual network or two flat networks with a firewall in between. VM configurations (e.g. in VirtualBox) may include the necessary network setup, so that no separate network configuration is needed (for flat networks). All VMs can for example be cloned before use, so that each new instance is run from a clean image. All machines can for example be automatically run the playing field applications when booted. This way, the user (e.g. game administrator) can execute the playing field on a machine using a command line script. All machines can for example listen to a protected (encrypted) shutdown message and upon receiving this message, send all data that should be made persistent to the manager, and shut down (using "save VM state" if further debriefing is part of the training). In the present invention, VMs can for example minimally communicate with the manager system in order to not "pollute" the network traffic, and players will have to agree to not hack the game itself. In another aspect of the present invention, this communication may for example occur on a separate network so that the playing field network is not impacted. Before the player machine shuts down, it may redirect the player back to the management server to see for example scores/rewards, results, advice, debrief etc.

In the present invention, the game manager can for example comprise a "variable reward system" where some attacks are easier to detect than others, and players receive badges as prizes based on completed games, learning success etc. For example, there can be a "hall of fame" so players can compare each other. There can for example also be a survey at the beginning and/or at the end to determine the player's characteristics (motivations, skill level etc.), allowing the present invention to adjust the rewards system accordingly (esp. to prevent "over-justification"). For example, the highest score may be given if the player detects the vulnerability and fixes it, or detects the attacker and thwarts the attack. A medium score may be given if the player detects the attack but does not thwart it. A low score may be given if the attacker does not prevent, detect or thwart any attack. In an example, a low score will not be presented as "you lose!" but rather keeps the player motivated by triggering a tutorial or links to online information about the vulnerabilities, attacks, and countermeasures. In an example, (human) players can read up and re-play through the exact same game level again as an "exercise run", to ensure the learned knowledge is retained. In the present invention, the game manager can for example furthermore collect information and provide it to game supervisors for further analysis. For example, collect timestamped action log entries on each system (including commands executed by players) and correlate those into a game flow (table based in the Base Period). This allows (e.g. human) supervisors to measure learning progress, effectiveness, as well as system performance.

FIG. 7 illustrates an example of a (e.g. computer-implemented) training game environment: A game manager entity 710 includes: an admin console 711 which allows administrators to administer the various parts of the system; a scoring/rewards feature 712 which tracks scores and rewards for players, incl. hall of fame, badges/prizes etc.; a reporting/analysis feature 713, which collects information about each game run, allowing game operators to analyze player and system performance, and to obtain reports; a persistent store 714, which stores (e.g. in a database) information that needs to be kept over time, such as player characteristics, player history etc.; a playing field orchestration feature 715, which orchestrates the playing field, for example spin up, snapshot, monitor and shutdown playing field virtual machines; a user GUI 716, which provides mission information, login credentials into the defender playing field machine(s), pre/post briefing, hints/cheats, tutorials etc. A neural network learning engine 720 includes two main parts: firstly, it trains one or more neural networks using the abovementioned simulation; secondly, the trained neural network(s) are used to predict/select nodes through the attacker graph/tree, which is executed by the attacker graph execution engine 730. The present invention can for example also track scoring/rewards, defender characteristics, information for reports etc. The attacker graph execution engine 730 tracks the attacker's actions through the attacker graph/tree, executes exploits across the playing field, collects/parses results, in some cases determines success/failure etc., stores parsed/analyzed result information for use in subsequent steps (e.g. in a database structure, taxonomy, metamodel, ontology etc.) etc. The training game environment also includes game building blocks 740, which can be virtual machines (e.g. with saved clean snapshots that are spun up to form the playing field 750).

It is clear that other examples of the present invention include can other configurations and features, such as: (1) team training (vs individual training) with multiple human and/or automated participants, (2) incorporating other steps in the cybersecurity lifecycle, such as hardening up-front into the training, patching up afterwards into the training, cyber operations, mission operations, IT operations, potentially involving other stakeholders, e.g. compliance; (3) (semi-) automatically configuring the playing field and/or simulated IT environment based on detected/imported information, e.g. traffic, config files etc. (4) automated net defenders (analogously to the automation of the attackers described in this specification) to have a fully automated game which could be trained using unsupervised learning, e.g. using multiple AI-based agents competing against each other. This can for example be used for multi-agent reinforcement learning or Generative Adversarial Networks (GANs)—a technique known to those skilled in the art—to have attackers and defenders learn new techniques against each other without (or limited) human involvement; (5) multiple attacker entities; (6) user/administrator facing editors for game levels, attack trees, exploits etc.

In an example of the present invention directed at cybersecurity, the described attacker(s) and defender(s) are swapped: defenders are automated agents, while attackers are human players/trainees. The present invention may for example be useful to train for example ethical hackers (red teams). In the present invention, some attackers/defenders may be humans and some attackers/defenders may be automated, depending in the use case (e.g. training objective).

In the present invention, the actor can for example be an attacker which steps through an attack tree/graph (an excerpt is depicted in FIG. 8) and—for example using (deep) reinforcement learning—a neural network or other learning capability that is trained over time. There are:

an environment, which in the present invention can for example be an IT environment, which can for example be the "playing field" for a cybersecurity training game. In some cases, the environment can be simulated with the goal of training a neural network. In other cases, it can be a virtualized environment or real environment that can be used for training purposes. The environment can for example include "assets" (i.e. IT assets) with associated vulnerabilities.

a defender: The defender can also be simulated, for example either simplistically by characterizing its skills, or by having a defender trained neural net and/or defender decision tree. The simulated defender is for example designed to mimic a human defender. The environment can for example include defender tools, such as intrusion detection system etc. Defender skills are for example associated with defender tools in that the defender skill can only manifest if there is a defender tool. Also, a defender is for example associated with the vulnerability or exploit it protects from or detects.

an attacker, which can for example be a human user as well (e.g. ethical hacker). Or it can for example be simulated, for example using attack trees, trained neural nets etc. The (attacker) system can for example include attacker tools, such as *Kali* or Metasploit. Attacker exploits are for example associated with attacker tools. For example, Wi-Fi packet sniffing (exploit) is associated with the airodump-ng tool. Exploits can for example be associated with vulnerabilities and assets on which they work. An attack tree (which can be a graph and which can include contained and non-contained nodes) is for example made of attack tree nodes which are connected in attack steps. Nodes may for example include references to the exploit to be executed in a step, the vulnerability that must be present in the environment, the success probability etc.

Exploits can identify for example command line commands and scripts that are executed to run an exploit. When an exploit is run, the output is for example captured by the system and stored for subsequent steps. It may also be parsed and analyzed by the system to determine success/failure of the exploit. If needed, another script can for example be executed to either passively or actively confirm success/failure.

In an example, the system processes the exploit command output and stores it in a suitable structure (metamodel, ontology, JSON, . . . ). In another example, it stores the raw output, but keeps track of what has been captured so it can be used later.

In an example, each subsequent step that needs certain data as a pre-condition parses that stored "state" data and finds the information it needs to run the exploit.

For example, if the first node is "wi-fi packet sniffing" and the output is a number of SSIDs with MAC and channel and encryption (WEP/WPA etc.), then a subsequent step "deauthentication attack" needs to have access to the MAC and channel from the previous step—which is available from the stored state data. Similarly, if "WEP cracking" needs to check if any of the networks are WEP encrypted, it needs to find that information in stored state cache.

In an example, the environment simulation model is captured as illustrated (highly simplified) in FIG. 9, defining assets, vulnerabilities, defenders, attacker, attack exploits, attack tools, and defender tools. In an example of the present invention, different defenders 910 are simulated by associating particular skills with the defender. Note that FIG. 9 only shows the model elements, but does not show the particular properties defined for each model element. For example, each defender skill defines success probabilities (i.e. the amount of impact the skill has on the corresponding attacker exploit), which exploit is affected, which vulnerability is related etc. Such properties and references to other model elements allow the system to produce a high-fidelity simulation of a cyber security training game.

In an example of the present invention where the simulation is fully automated, a neural network is trained by running through many iterations of attack tree executions using conventional reinforcement learning (or similar) machine learning techniques. For example, the environment could be implemented as a game with OpenAI Gym compatible APIs. The actions are the selection of a particular child node in an attack tree relative to the current node (i.e. stepping to the child node). The rewards are whether the exploit at that node succeeded or not, or is unknown. Defender and environment are triggered by the attacker (e.g. simulated) action execution, or could run as autonomous threads. Using actions and rewards, a neural network is trained using well-known methods. After some/many iterations, the attacker neural net will have been trained to select the most likely to win path through the attack tree.

Assisted Policy Determination (e.g. Policy Determining Entity)

As described in the background section, automation remains challenging. One challenge revolves around (in general terms) authoring agent behavior (incl. for example actions, policies, rules etc.).

In an example, a policy determining entity is directed at policy management, which remains challenging using conventional approaches, including determining security policies, which typically requires highly skilled operators and resources (esp. time).

In an example, a policy determining entity analyzes information about an environment, and determines possible assistance/guidance, such as recommended security policies, or automated actions, that could be applied to the environment. In the present invention, an environment can for example comprise information technology (IT) systems (systems, applications, networks, network traffic etc.). In an example, a policy determining entity can analyze information about organizations (e.g. processes, workflows, logistics etc.). In an example, a policy determining entity can analyze information about people (e.g. user needs, user actions etc.).

It can pertain to any kind of assistance (e.g. guidance, actions, recommendations etc.) or policy (e.g. policies, rule engine rules, behavior rules, actions, decision rules etc.). Policy could be any logic defining behavior, incl. action sequences, behaviors, etc. In the present invention, it can for example pertain to security policies. In the present invention, it can for example pertain to access control policies. In the present invention, it can for example pertain to interconnected devices, systems or applications and information flow control policies (esp. access control rules) between those.

FIG. 18 is a flow chart of an example of the policy determining entity 1800, with exemplary order of steps (steps could be reordered, and some steps could be omitted). The policy determining entity first determines information about the environment (1810). This step is optional, or may be implicit (e.g. environment is encoded/reflected in the policies). The definition of environment and related examples have already presented above. For example, the environment could be information about an IT landscape, organization, or human users.

The policy determining entity can then for example determine a policy (1820), which could be authored by e.g. a human user, administrator, subject matter expert etc., and could pertain to anything that specifies e.g. actions, events, behaviors, rules, etc. For example, for a policy determining entity for security policy management, the policy could include security policies (e.g. access control rules). In an example for a policy determining entity for agent automation, the policy could include behavior/decision/action trees/graphs, rule engine rules etc. (e.g. attack trees with exploits).

In the policy determining entity of the present invention, one objective can for example be to determine additional applicable policies semi-automatically/automatically from existing policies (and, in an example, an environment).

The policy determining entity may then implement 1830 the policy on the environment. This step is optional. This may for example be achieved by implementing and executing the policy across an actual environment (e.g. enforcing access control policies, executing exploits). In the present invention, this may for example be achieved by implementing and executing the policy across a simulated environment (e.g. simulating enforcing access control policies, simulating executing simulated exploits).

In an example, if steps 1810 and 1830 were carried out, then, based on the results of the implementation (e.g. simulated or real), the policy determining entity determines labeled data 1840. Otherwise the policy determining entity determines labeled data 1840 by for example analyzing the policy, which works best if sufficient information about the environment is "encoded" within the policy. For example, if the policy includes access control rules allow/deny between hosts communicating across a network, information about the environment is (usually) encoded within each rule (e.g. source IP, source port, destination IP, destination port).

As described above, labeled data includes input features that are for example inputs into a neural network, and output labels, which are for example outputs from a neural network. For example, in a security policy related embodiment of the policy determining entity, labeled data could include numerous information flows with "secret" or "unclassified" characteristics associated with each endpoint of a communication (e.g. between hosts), and labels could include "allow" or "deny" results of these access rules. Note that in the above network communications example, these characteristics need to be encoded either in the environment 1810 or in the policy 1820, or be available from another source.

The policy determination entity may then determine a policy determination model 1850 from the labeled data determined in 1840. The policy determination model can for example be a neural network, and determining this policy determination model may involve training the neural network using the labeled data 1840 using machine learning approaches known to those skilled in the art of machine learning. Many other implementation alternatives are possible, incl. fuzzy logic, rule engines, hand-written software/scripts etc.

The policy determination entity may then identify environment changes 1860. This step is optional. In some cases, additional policies can be identified for the original environment 1810, i.e. new policies should be predicted for some parts of the existing environment, e.g. additional access rules between existing hosts based on the policy determination model—while in other cases, additional policies can be identified after identified environment changes (e.g. hosts get added to the environment), for which access rules can be determined based on the policy determination model.

To generate (i.e. predict) additional (or changed) policies, the policy determination entity may feed inputs about environment changes or additional characteristics of the existing environment into the policy determination model, which generates 1870 a predicted policy.

This predicted policy can then 1880 for example be implemented across the environment, or can be used otherwise, e.g. presented as a proposal to a user for approval.

While this step is optional, it often causes the tangible effect of the policy determination entity.

The new policy and the associated data (that was used as inputs into the policy determination model) may be added to the determined labeled data 1840, and the process iterates through steps 1850, 1860, 1870, and 1880 (some steps are optional).

A (e.g. first) step of the invention involves creating data, e.g. labeled training data, for policies. FIG. 1 shows two examples (left and right) of an entity, for example a policy determining entity (100), where the invention uses Artificial Intelligence (AI) approaches (e.g. machine learning executed by a processor) and carries out the following steps:

The following describes an example for creating labeled training data from a "real" environment (i.e. where policies are actually enforced):

In step 101, The user authors/enters—or the invention imports—policies, such as access control policy rules (example: XACML, OpenPMF PDL, firewall rules etc.) into a policy determining entity (which could for example be part of a policy management system such as ObjectSecurity OpenPMF).

In step 105, the policy determining entity generates, by a processor, technically enforceable rules/configurations (or uses the authored/imported policies directly) and in step 110 distributes those to at least one policy implementation entity, where they are enforced. For example, firewall rules on all devices (e.g. iptables) are configured to only allow certain network information flows and disallow others—or, for example, middleware security configurations, VM configurations, OS configurations, network configurations, or custom entities (e.g. OpenPMF runtime agents).

In step 115, the policy determining entity or the policy implementation entity (which could be for example collocated with a policy decision entity), e.g. executed on a processor of the to-be-protected system or e.g. on a processor of a system connected on the network) collects (e.g. by a processor, from a memory, or storage, or network) information about the IT systems and associated entities such as users, data, statuses, applications, behaviors/events, sensor inputs etc. In OpenPMF, for example, importers allow importing captures from numerous layers, such as e.g. network (e.g. tcpdump), middleware (e.g. DDS, web), directories and databases (e.g. LDAP/LDIF, SQL etc.)—just to name a few examples.

In step 120, the policy determining entity correlates, by a processor, the imported information with the enforced policy and/or rules/configurations. The goal is to produce labeled training data (a term well-understood by those skilled in the art of machine learning) e.g. used for training a neural net. For example, if a particular network traffic packet triggers an access rule, a record is created that includes at least a pair consisting of the traffic packet (the source for input features into machine learning) and the rule that triggered (the label that should be predicted).

The output 140 (e.g. produced by the processor and stored e.g. on a memory or storage) is a set of labeled data that can be used for example for machine learning. As a simple example, assume that there are five hosts with an associated characteristic:

Host A has IP 192.168.1.101 has characteristic "secret"
Host B has 192.168.1.102 has characteristic "secret"
Host D has 192.168.1.104 has characteristic "unclassified"
Host E has 192.168.1.105 has characteristic "unclassified"

Further assume that the rules are host-to-host IP "whitelists" (=allow rules). A set of labeled data could for example include:

Input: Host A (secret), Host B (secret)→output: "If source=192.168.1.101 and destination=192.168.1.102 then allow Input: Host B (secret), Host D (unclassified)→output: "If source=192.168.1.103 and destination=192.168.1.104 then deny Input: Host D (unclassified), Host E (unclassified)→output: "If source=192.168.1.104 and destination=192.168.1.105 then allow Note that in this example, the input hostnames and output IPs could be managed in a table with numerical identifiers, making the neural net architecture more manageable.

Such labeled data (in sufficient quantity) can be used (e.g. by a processor) to train a neural network using machine learning approaches known to those skilled in the art of machine learning. It is expected that a trained neural net would be able to correctly predict that "secret-to-unclassified" communications are more likely to be "deny" than "allow".

For example, assume that two hosts are added to the environment:

Host C has 192.168.1.103 has characteristic "secret"
Host F has 192.168.1.106 has characteristic "unclassified"

Once trained (e.g. on a processor that executes machine learning approaches) with sufficiently large data, a trained neural net would be able to predict that the most probable output would be:

"If source=192.168.1.103 and destination=192.168.1.106 then deny"

While the presented example is deliberately trivial to aid the reader's understanding, it is evident that this prediction could be arbitrarily rich and complex, depending on the amount and richness of inputs and outputs supported.

The following describes an example for creating labeled training data from a "simulated" environment (i.e. where policies are not actually enforced):

Step 101 is the same as above.

In step 125, the policy determining entity (which could be for example collocated with a policy implementation entity) collects (e.g. by a processor, e.g. from a memory, storage or network) information about the IT systems and associated entities such as users, data, applications, etc. In OpenPMF, for example, importers allow importing captures from numerous layers, such as e.g. network (e.g. tcpdump), middleware (e.g. DDS, web), directories and databases (e.g. LDAP/LDIF, SQL etc.)—just to name a few examples.

In step 130, the policy determining entity calculates, by a processor, which policy rules would trigger for which imported information if the policy was already enforced. For example, a combinatorial algorithm could be run over the policy with some or all combinations of the imported traffic; or, for example, the ingested data could be replayed to apply the policy (akin to a simulation).

In step 135, the invention correlates, by a processor, the imported information with the "simulated" enforced rules/configurations. The goal is to produce labeled training data e.g. used for training a neural net. For example, if a particular network traffic packet triggers an access rule, a record is created that includes at least a pair of the traffic packet and the rule that triggered.

Step 140 is the same as above

As shown in FIG. 2, a policy determining entity (200) may for example use the generated records as labeled training data 205 for machine learning 210, a technique known to those skilled in the art. Machine learning often involves training a neural net (e.g. a deep neural net) 212 with parts of the labeled data 205, and then testing the network using the remaining parts of the labeled data 210, and iterating/improving (e.g. using random forest techniques) until the neural net's predictions are sufficiently accurate.

In machine learning terms, features of the imported information that triggered a rule (this could be called a "trigger event") form the inputs of the training data, while the policy rules (incl. for example a vector of comparison values) form the labels.

In an example, only a relevant subset of the imported information may be used as features. Determining those features is called "feature engineering" and is known to those skilled in the art of machine learning. Similarly, determining the specific labels is well-understood by those skilled in the art of machine learning.

While the invention is agnostic to the specific features and labels used to train the machine learning model (e.g. the weights of a deep learning neural network), it is known to those skilled in the art of machine learning that the correct determination of those variables is key to getting good prediction results. A common exemplary way to determine good features and labels is through experimentation, and (e.g. successive) selection of the best results. For example, if there are hosts with IP addresses, and policies allow information flows between IP addresses, and the hosts have the known characteristics of either being approved for processing "secret" or "unclassified" information, and the determination of whether an information flow is allowed is determined by those characteristics (e.g. "secret" is only allowed to communicate with "secret"), then these characteristics are relevant feature inputs into the neural net.

After sufficient experimentation using techniques known to those skilled in the art of machine learning (incl. deep learning), the neural network is trained to predict rules for provided (potentially previously unseen) input data, e.g. rules for particular network traffic.

Note that the classifier can for example either be based on classes or on regression, depending on whether the values of a rule are (for example) binary or numeric.

In an example, the policy determining entity may synthetically create additional data from this data, akin to "few-shot learning" approaches in image object recognition, a field known to those skilled in the art of machine learning. For example, if a policy rule exists to allow IP-to-IP network communications between two hosts of particular characteristics (e.g. approved to process personal health information, PHI), the policy determining entity—once confirmed to be a correct assumption by human machine learning experts—may create further rules between other PHI-approved systems. Or if a particular user has access to a certain resource, the policy determining entity—again once confirmed to be a correct assumption by human machine learning experts—may create further rules that allow similar users access to that resource (e.g. both users are part of the same user group), or access to similar resources for the particular user.

Note that policies can for example contain arbitrary nestings of policies and rules.

In an example, the policy determining entity may for example synthetically create data (e.g. training data, policies, rules, action sequences etc.), using Generative Adversarial Networks (GANs), a machine learning approach known to those skilled in the art where two neural networks contesting with each other in a zero-sum game framework and one network generates candidates (generative) while the other evaluates them (discriminative). The discriminator can for example be trained with labeled training data set consisting of already-authored rules and their associated information inputs (e.g. the environment conditions for which the rule applies). Labeled training data (sets of feature inputs and their applicable policies), can for example be created using a simulation, or the data is otherwise augmented (e.g. algorithmically, statistically, using approaches akin to few-shot learning etc.) until its size is sufficient to train the discriminator neural net. The generator generates many data sets of random feature inputs and their applicable policies, and uses machine learning approaches that are part of GAN approaches to produce data sets that the discriminator predicts to be correct data sets. GAN approaches often work by selecting the most successful data sets (as determined by the discriminator) and using them to train the generator network.

During the prediction (determining) phase, the policy determining entity (200) can for example collect (e.g. by a processor, e.g. from a memory, storage, or network) more unlabeled data (215), i.e. information about the IT systems and associated entities such as users, data, applications, and behaviors/events, etc. It uses those as inputs into the neural network (220), which is based on the neural net (212), which returns one or more potentially applicable predicted policies (225) and/or rules that could be applied to the particular information. For example, more of the abovementioned network traffic is collected. A new device appears and communicates with another device—the predictive system determines a potential rule that could be applied to allow or block the traffic The invention can for example present (in step 230) the user with the potential new rule (e.g. in the policy management entity's user interface) for approval. If approved, the rule may be applied. In an example, the invention may (in step 235) automatically apply the new rule.

In an example, the present invention uses the user feedback (e.g. approve/disapprove the generated policy) to train the neural net to better predict in future—for example using reinforcement learning or online machine learning, AI techniques known to those skilled in the art.

FIG. 3 illustrates an example of the policy determining entity 300. To make technical policies more manageable, the present invention may use machine learning ("ML") (deep learning) to predict technical security policy rules as conditions in IT landscapes (e.g. interconnected IoT) change—e.g. "events" such as devices/data get identified, discovered, added, removed, modified. As shown in FIG. 3, a user initially authors access policy rules, which are enforced, and information about the resulting IT landscape is captured (or the information is captured and the enforcement is simulated), to create labeled training data used to train the ML model to predict security policy rules for particular "events". The system then periodically ingests more information about new "events" into the trained ML network. The ML model predicts rule(s) for the event(s) and either proposes/recommends them to the user as options or enforces them directly.

The following example further illustrates the policy determining entity: In a hospital, assume that a medical device sensor device (e.g. blood pressure sensor) sends a specific traffic pattern, while a medical device actuator (e.g. infusion pump) sends another specific traffic pattern. There are also monitor devices (e.g. blood pressure monitors).

In the example, there are many such devices, and traffic is intended between blood pressure monitors and blood pressure sensors.

In the example, the system gathers network and application traffic. The user allows (whitelists) numerous connections between sensors and monitors, and between monitors and actuators. Assume that no direct traffic between sensors and actuators should be allowed, but only via the monitors.

As an example, in OpenPMF, which includes advanced "security policy automation" using "model-driven security" (see other patents by the inventors of the present invention), a wildcard rule is authored that is filled in (during "model-driven security" refinement) with all sensors and monitors, and with all monitors and actuators.

A policy implementation entity may for example enforce those rules on the interconnected device landscape. The effect is that the abovementioned traffic is now whitelisted and everything else is blocked.

Any allow/block rules triggered are used (with the trigger event, e.g. network communications received) as training data and the predictive system is (re-trained) using this data.

Now a new device is added to the device landscape. Its traffic pattern is a sensor, and it is attempting to communicate with an actuator. The actual device information (IP addresses) is new, i.e. there is no existing rule to apply to this device.

The traffic pattern (e.g. package) is inputted into the predictive system, which outputs a potential rule—in this case a "deny rule" (based on the characteristics of the new device, i.e. that it is characterized as sensor).

This rule is for example automatically applied (and for example a warning is produced for an administrator to check that the rule is correct), or it is provided as a recommendation.

The present invention is not limited to security policies or rules, but can be broadly used for any policies determining many decisions, processes, behaviors, actions, assessments, tests etc. For example, it can be used for determining action policies (e.g. sequences of actions) for any kind of semi-automated/automated assistants or automated actor (as presented elsewhere in this specification).

The present invention is also not limited to policies pertaining to IT systems, but may for example also pertain to organizations (e.g. processes, workflows, logistics chains, supply chains etc.) and people (e.g. instructions for human users). In the case of organizations and humans, the present invention may process inputs and outputs using a processor, memory, storage—including potential inputs such as video/photo/audio/sensors (e.g. thermometer) etc., and outputs, such as audio/video/photo/textual/graphical etc. instructions, and/or actuators (e.g. temperature control). More broadly, this specification collectively refers to these examples (and others) as the "environment" of the present invention, i.e. the policies pertain to an "environment" (e.g. IT environments, organizational environment, people etc.)

Metadata Characteristics Extraction from Data (e.g. Metadata Extraction Entity)

Policy management for unstructured information, for example, but not limited to texts, images, audio or video streams, remains challenging using conventional approaches, because attribute values required as building blocks for policies are not readily available in such unstructured information. As a simplistic example, assume in a hospital environment there are "attending physicians", "patients", and "patient records". Further assume that patient records are unstructured information (e.g. multiple unstructured text documents, x-ray images etc.). In this example, the policy building blocks (attribute values) for "attending physicians", "patients", and "patient records" are mentioned in unstructured data, for example in patient files, but not readily obtainable by a policy implementation entity. It is therefore not possible (using conventional approaches) to enforce an access rule such as "attending physicians should only access the patient records of their patients" even if the information is actually available in the unstructured data, because the textual information from the patient file cannot directly be reused as an attribute for access control (or for selecting and/or executing actions).

The invention includes an entity, for example a metadata extraction entity, that extracts attributes (for example as type, value tuples) from data (e.g. unstructured data), which in the present invention can for example be used for the calculation of access control decisions, together with attributes from other sources. The extraction can be done at different points in time: For example, it can be done when the policy decision (or action selection/execution etc.) based on the extracted attributes is to be made, (but it could be done at any prior point in time). The extracted attributes may be attached to unstructured data as metadata, for example to the data from which the metadata was extracted.

The metadata extraction entity may for example extract metadata from (potentially unstructured) information (e.g. video streams, audio streams, text, images) using various techniques, including machine learning techniques, known to those skilled in the art (e.g. deep learning incl. image object recognition and natural language processing, video/audio processing, sensor processing etc.) for use in policies (e.g. security policies, incl. access control decisions, or agent automation policies), allowing easy protection of unstructured data (e.g. intelligence reports, patient files, legal documents etc.).

As shown in FIG. 4 (A), unstructured data (e.g. unstructured documents) is read into the metadata extraction entity (step 405). From this data, the metadata extraction entity extracts a characteristics vector (step 410), which involves determining characteristic metadata vectors of unstructured info using machine learning techniques known to those skilled in the art (e.g. the abovementioned). Metadata vectors could for example be structured in triples as shown in the following examples:

Example metadata 1: [<Informer: X>, <Suspect: S>, <Crime: C> . . . ]

In this example, from a crime report, the metadata extraction entity extracts the informer (e.g. name), from which the information was obtained, the suspect e.g. name, and the type of the crime (e.g. identifier). In an example, the extracted attributes are for example used to enforce a policy, for example that only the officer in charge of the informer is allowed to access the record, or that a notification shall be sent to the officer in charge if another officer is trying to access records mentioning the subject S etc.

Example metadata 2: [<Military Unit: U>, <Rank: R>, <Battle Theatre: T>]

In this example, the attributes are for example used to enforce policies restricting access to military information about a specific theater to subjects based on their rank and unit.

Example metadata 3: [<Attending Physician: AP>, <Patient: P>, <Patient Record: PR>]

In this example, the extracted attributes are for example used to restrict access to patient records, e.g. only the attending physician mentioned in the textual patient record can access the record.

Note that many other metadata vector structures and formats could be used, and the present invention is by no means limited to the presented triples structure. In addition, for each type, the number of values is not limited.

Each characteristics vector is linked (step 415) to/from the unstructured document(s) from which the characteristics vector was populated, allowing identification of the document from the vector and vice-versa.

In an example as shown in FIG. 4 (B), after the unstructured data (455) has been analyzed and the characteristics vector has been extracted (460) and has been linked (465) with the corresponding unstructured data (for example with the characteristics vector containing "Person" and "Location"), the characteristics vector can for example be used as policy attribute values for technical policy decisioning/enforcement (470). Examples of such policies include technical attribute-based access control policies. Note that the extracted metadata can be used for other purposes beyond policy decisioning/enforcement, for example for selecting and/or executing any kind of action that requires the metadata e.g. for selection and/or execution.

Agent Classifying Entity

The agent automation was described above.

In an agent classifying entity, agents have particular characteristics, e.g. skill level, motivation, objectives, or persona. For example, attackers and/or defenders in a cybersecurity training system could have such characteristics. In an example, at least one agent is a human user. In an example, at least one is automated.

In an agent classifying entity, a purpose of the agent classification entity is to determine characteristics (incl. the abovementioned examples) automatically over time. One of the benefits of the invention is that it is for example able to classify the (e.g. human) defender within one/few runs through the agent automation (e.g. attack tree) (vs. thousands of iterations usually required for machine learning), and without the need to track behaviors (e.g. human defender behaviors)—which are often hard to track correctly: for example, because a human agent (e.g. cyber defender) is free to behave in whatever way they want, and there will often not be a deterministic sequencing of actions, and actions may be quite reactive; and because humans for example often "click around" seemingly randomly in user interfaces (e.g. intrusion detection systems, IDS) or try out different commands at the command line.

The present invention therefore mainly tracks and detects the impact/effect of behaviors in a generic way. User behavior can for example be further captured by asking the user, e.g. if they detect an incident, they have to provide the information in a form with a parseable structure, so the system knows the user has e.g. detected an incident.

FIG. 19 shows a flow chart of an example of the agent classifying entity (1900). Some embodiments do not include all steps, and some embodiments follow a different order of steps.

In step 1910, the agent classifying entity configures action behavior model(s) for each classified agent. This is for example achieved by configuring the agent action determination method and system described above (AI based entity)—for example, by simulating multiple instances of an environment with particular classified agents per instance (having differing characteristics), and training a separate neural network using reinforcement learning for each of those environments. This can for example be achieved by a similar process, but a single neural network that incorporates the same capabilities as the sum of the separate neural networks as in the preceding sentence. In an example (related to "Example 3" below), the action behavior model(s) is a weighted tree/graph.

In step 1920, the agent classifying entity selects an initial classified agent behavior model, for example by reading classified agent identifier (or characteristics etc.) from a user profile, history etc., by randomly selecting a classified agent behavior model, by selecting the most broadly applicable classified agent behavior model, by observing the classified agent's behavior, by obtaining information from the classified agent (e.g. user survey) etc. This model is now selected as the currently selected model.

In step 1930, the agent classifying entity determines an action based on the initial classified agent behavior model, for example using the agent action determination entity (described above), and selects the action. Note that in this step, the expected result is either implicitly known (e.g. model always returns the most likely successful action option) or explicitly provided as an output (e.g. model returns the expected result).

In step 1940, the agent classifying entity executes/implements the action for an environment, which could for example be simulated or real-world, and could for example be using an agent action determination entity (described above), or a policy implementation entity (described above). Executing includes for example executing actions (examples have been provided above, e.g. executing cybersecurity attack steps). Implementing includes for example enforcing a policy (examples have been provided above, e.g. access control rules). As part of step 1940, the agent classifying entity obtains the "actual result" returned from this step—for example, success/fail/unknown/error status of a cyber attack exploit action carried out.

In step 1950, the agent classifying entity predicts "expected results" for (e.g. all) applicable action behavior model(s). The process is the same as in step 1930, but carried out for the applicable models.

In step 1960, the agent classifying entity compares the actual result with each expected result.

In step 1970, the agent classifying entity eliminates (or down-selects) agent behavior model(s) based on whether the expected result matches with the actual result, thus indicating that the classified entity's characteristics match with the (e.g. simulated or real) classified entity for which the agent behavior model has been configured. For example, if the expected result is that an attack exploit should be successful against a particular defender a neural net was trained against (e.g. a beginner skill level), but it failed, then this particular neural net is eliminated (and—importantly—it can be concluded that the classified agent does not match a beginner skill level).

In step 1980, the agent classifying entity checks whether the currently selected model is or is not eliminated. If yes, then the agent classification entity sets (in step 1990 of an embodiment) the most applicable classified agent behavior model as the currently selected, and, if there is a reason for executing further actions, returns to step 1930. The most applicable model can be determined based on numerous factors, incl. objectives, the environment, classified agent characteristics etc. It can for example be determined by selecting e.g. the nearest neighbor (on a one-, two- or n-dimensional scale of characteristics), picking the easiest alternative (e.g. least skilled if skill level is a characteristics) etc.

The classifying agent (e.g. attacker) can classify other agents (e.g. human cyber defenders) by how their actions impact the classifying agent (i.e. a cyber attacker's perception of the defender's impact on the attacker). In other words, the invention includes a classifying agent which determines characteristics of other classified agents based on those other classified agents' actions' impact on the classifying agent. Analogously, the invention can for example include a (cybersecurity) defender classification entity which determines defender characteristics based on the defender's actions' impact on the attacker. Similarly, the invention can for example include a (cybersecurity) attacker classification entity which determines attacker characteristics based on the attacker's actions' impact on the defender.

In an example, the automated attacker may have full control and visibility over the attacker decision tree (vs. the human defender's often muddied decision-making).

The following describes three embodiments of the defender classification entity, which classify defenders without the need for large labeled datasets. While the embodiments are described in specific terms and a use case (cyber security attackers/defenders, attack trees and neural nets), the described approaches are widely applicable for many other use cases (e.g. classifying tested devices based on success/failure of test steps, classifying human users based on success/fail of actions guided by an automated assistant etc.):

"Example 1: 1-dimensional (skill)": A defender agent classifying entity trains and stores different neural networks (or attack trees, see below) (i.e. agent behavior models) for different defender (i.e. classified agent) categories (e.g. skilled, unskilled, motivated, unmotivated). Each neural net is trained for a specific classified agent (e.g. defender skill level and motivation). The system then uses the trained neural networks (i.e. agent behavior models) in parallel, and uses filtering (elimination, down-selection etc.) to pick one neural net (i.e. agent behavior models) over others based on success/fail of past actions. This approach is based on the concept that the trained network for a particular defender characteristic will yield significantly better success than ones for different characteristic. The approach is furthermore based on the premise that numerous iterations (e.g. game runs) are likely required to determine these values conclusively. This is because several data points (of "case 1" and "case 2", see below) are needed before the defender classification entity can pick the correct neural net. Numerous other rules could be added to make this work with further specifics.

The defender classification entity (i.e. classifying agent) may for example drop all categories of defenders (i.e. classified agents) where the attacker (i.e. classifying agent) predicts success at a particular node but fails ("case 1"). This would be an indication that the particular learned attack tree (i.e. action behavior model) is not a fit for the defender (i.e. classified agent).

It may for example also drop all categories of defenders where the attacker predicts failure but succeeds ("case 2"). This would be an indication that the learned attack tree is not a fit for the defender.

If several categories remain, the defender classification entity assumes for example that the "least skilled" one is the current "winner" (i.e. most applicable). This ensures that the defender classification entity does not select a "winner" merely because it succeeds (this could for example misclassify a novice as an expert this way).

The defender classification entity starts with the root of the attack tree, where all neural nets are still "in the race". As soon as "case 1" or "case 2" above occur, it drops those neural nets (and the associated category) from the list and assumes the most applicable (e.g. least skilled in some examples) one as the winner. As the attacker steps through the tree, there is a high probability that the defender classification entity will be able to narrow down the list to a few or ideally a single category which describes the defender.

Multiple characteristics dimensions (e.g. skill and motivation) may for example be mapped to a one-dimensional list, thus simplifying the selection of the most applicable classified agent behavior model. This is possible in cases where multiple dimensions coherently impact selecting the most applicable classified agent behavior model. For example, skill and motivation can be roughly listed on a scale from "easy opponent" to "hard opponent". For example, if each have two levels (high, low), the scale could be: "low skill+low motivation", "low skill+high motivation", "high skill+low motivation", and "high skill+high motivation".

"Example 2: n dimensions": The approach is similar, but now the defender classification entity puts trained attacker neural networks into a multi-dimensional structure so that multiple classified agent characteristics can be classified. In an example, it may also include a dimension for each attack tree used for different game levels and/or attacker skill levels (=attack tree configurations). The system may for example contain the data structure shown in FIG. 10: each cube inside the cube represents a trained neural network and the axes have assigned values for skill level (e.g. high/medium/low/none) and persona (e.g. demotivated, neutral, motivated, highly motivated). The attack trees could simply be an identifier of the attack tree.

The approach is based on the concept that an attack tree neural net that is trained to be optimal for a particular defender persona and defender skill level would be significantly more successful against the defender than other neural nets. The approach is furthermore based on the premise that numerous game runs are likely required to determine these values conclusively. This is because several data points are needed before defender classification entity can pick the correct neural net.

The attacker neural net training phase comprises the following steps:
 (1) For each (n-dimensional) cube that holds a neural net in the diagram above, a simulation (an evolution of the proof of concept simulation described above) is configured with the attack tree identified by the attack tree axis, as well as the defender persona and defender skill level.
 (2) The attacker neural net is trained and stored in a library, and its associated identifier is stored in the correct position in the cube (e.g. in the spot where the attack tree, persona and skill values match with the ones used for training).
 (3) This is repeated until all slots in the cube are filled with trained neural nets For elimination/down-selection during each iteration (e.g. game run/action), an example of the classification entity carries out the following example steps (in the example for classifying defenders by an attacker that includes an attack tree):
 (A) Pre-conditions:
  It is assumed that there are initial values for each first-time defender users for skill level and persona. For the first-time user, these could be self-declared in the pre-mission survey (or sign-up process). It is not that important whether these initial values are actually accurate, but the more accurate they are, the quicker the algorithm will be able to determine the actual values (for example, one could start by picking medium values for both skill and persona).
  It is assumed that the attack tree is known, for example obtained from the game level the defender player is about to play (B) Refinement during each game run:

The currently selected neuralnet S is used to attack the playing field.

A child attack tree node (initially the tree root) is selected by the selected neural net S (reinforcement action).

At the same time, all non-selected neural nets NS in the same attack tree "slice" of the cube also select a child attack tree node, but only capture the action selection without actually executing it.

1. The cursor in the attack tree is moved to the selected neural net's S chosen attack tree node A 2. A's exploit is executed 1. If successful, a) the selected neural net S stays selected b) at the same time, all non-selected neural nets NS that would have not selected this node A are assumed to be suboptimal and are marked unsuitable non-selected UNS c) If node A is an attack tree leaf, then the attacker has won. It goes to step 3 below 2. If unsuccessful, a) the selected neural net S is unselected and marked as unsuitable non-selected UNS b) the algorithm picks the nearest neighbor that c) at the same time, all non-selected neural nets NS that would have selected this node A are assumed to be suboptimal and are marked unsuitable non-selected UNS d) if the game is not over (attacker not detected), i. the algorithm marks the node A as unsuccessful.

ii. it moves the cursor back to the parent node in the attack tree.

iii. It also (e.g. randomly) picks the nearest neighbor to the (now UNS) previously selected neural net that is not UNS and makes it the new selected neural net S. This way the algorithm can refine the values even during a game run.

iv. The new selected neural net S selects a child node. Since it has not been unselected it should not select any unselected nodes. If it does, the algorithm returns to 2a)

v. If all child nodes have been marked unsuccessful, the algorithm moves to the parent in the attack tree (in the hope that another branch works out better) and moves to 2) d) iv)

If all branches in the tree are marked unsuccessful, then the attacker failed. Move to step 4 below vi. Otherwise, return to the top (B)

3. Game over (attacker wins):

The algorithm analyzes previous game runs with that user and if it wins too often (above a threshold), it determines that the skill level and/or persona are lower than what is currently selected. It moves diagonally to the next neighboring lower values in the cube and sets the neural net as the selected neural net S, which will be stored in the profile for the next game round 4. Game over (attacker loses because no attack tree branches successful):

The algorithm determines that the defender for example hardened or mitigated some exploits, and that the skill level and persona are therefore higher than the currently selected ones. It moves diagonally to the next neighboring higher values in the cube and sets the neural net as the selected neural net S, which will be stored in the profile for the next game round (C) Post condition: After several game runs (potentially from different game levels aka attack trees), the system is expected to have approximated the defender user's skill level and persona.

In an example, user engagement may be part of the reinforcement learning neural net's reward system, measured in e.g. responsiveness, actions per time period etc.

Note that the "cube" above could have additional or different dimensions to the n-dimensional cube—not just skill, persona, and attack tree as axes.

"Example 3: weighted tree/graph": The defender classification entity captures in the system's attack tree how often each node is visited, which directly correlates to the trained neural network, because the neural net will pick "reinforced" branches more frequently.

The system may drop the first couple (e.g. 10 or so) training runs because they will be quite random, and then keep the rest of the numbers for each attack tree node. The system then scales them to a percentage, which essentially indicates for each step the probability that the step is successful (for the particular classified agent, e.g. defender).

The system then correlates these numbers with the numbers actually observed by the attacker, and follows the algorithm above.

Concluding the description of the three examples, "Example 3" differs from "Example 1" and "Example 2" in that multiple instances of the attack tree are used and analyzed (vs. multiple instances of neural nets).

The present invention may include more than one classifying agent (e.g. attacker) and/or more than one classified agent (e.g. defender).

Note that there may be more than one environment, which in an embodiment are structured as game levels.

Note that there may be a correlation between which attack tree or defender tree are selected for each game level.

The present invention includes embodiments where attackers and defenders are flipped with respect to the example descriptions in this specification: For example, the attacker and defender are flipped (i.e. the defender is simulated and the attacker is a human user), so that the defender has trained neural nets organized by attacker characteristics, so that it can determine attacker characteristics by how successful each trained model on the "cube" is against a particular attacker. Such embodiments are able to detect the attacker skill level and persona over time, which has many applications, e.g. for future intrusion detection systems Furthermore, in other aspects of the invention, the system has for example both an attack tree based neural net attacker and a defender tree based neural net defender. Both interact with the environment as actors. In an example, the present invention uses Generative Adversarial Networks (GANs). In an example, the present invention uses multi-agent reinforcement learning. These machine learning techniques are known to those skilled in the art of machine learning. For example, one side's neural net weights are fixed while the other side is trained. Then the other side's neural net weights are fixed while the one side is trained. Over time both sides learn from each other and become more successful and refined, thus creating a self-learning system.

The agent classifying entity can for example be used to classify different agents on the environment, for example different (potentially embedded) devices that an agent automation entity should test (e.g. incl. penetration testing cyber-attacks and vulnerability tests)—an example is described below (VAPT entity).

Protection of Neural Networks (e.g. "ML-SPI Entity")

In an example, the present invention uses neural networks and machine learning (ML).

Background: ML systems are susceptible to attacks in many ways. For example, deep learning models are susceptible to misclassifying "adversarial examples", which are inputs that have been manipulated computationally in ways that are imperceptible to a human observer. The attack is geared towards image data and certain media types (video, audio), but is (for now) harder to carry out on media such as plain text documents. Some of the attacks require "white-box" access to the model's data (unit weights), while others do not ("black-box").

The present invention includes an entity, for example a ML-SPI entity, which is a flexible solution to securing ML systems, by providing a consistent ML security plugin interface layer and a library of ML security plugins.

The invention supports ML—e.g. deep learning—so that ML can for example be used without the need to reveal neither training data nor the neural net weights in the clear. It for example extends existing deep learning toolkits (e.g. TensorFlow, Caffe2, Sci-kit learn etc.) through a Machine Learning Security Plugin Interface (ML-SPI) entity that partly integrates into existing machine learning (e.g. deep learning) toolkits.

Some of the objectives of ML-SPI may include: (1) prevent (meaningful) usage of the ML system by unauthorized users/processes/systems; prevent access to the plaintext ML model (unit weights); prevent third party (malicious) access to ML system inputs/outputs (during classification); support replacing underlying ML security features, to be able to keep up with rapid evolution around ML; support security also for model training, not just for model use (classification); be flexible, allowing both being integrated with new ML toolkits, and allowing the integration of new ML security features; scalable.

FIG. 20 illustrates an example of a secure machine learning (ML) entity (2000), which provides ML features to user-provided ML application(s) (2010).

In an example, an ML application is provided by users (e.g. developers) and invokes functions on at least one ML toolkit (2020). In an example, the ML toolkit is based on existing systems (e.g. software), such as TensorFlow, Caffe2 etc. In an example, an ML application (2010) communicates commands and data to an ML toolkit function entity (or entities) (2023), for example via Application Programming Interfaces (APIs). In an example, these commands are identical to the unsecured versions of such ML toolkits, allowing developers for example to port existing ML application(s) easily (ideally transparently) from the unsecured existing ML toolkits to the present invention's secure ML entity.

The ML toolkit comprises interceptor entity/entities (2026), which are configured to intercept communications from/to the ML toolkit function entity/entities (2023) of the ML toolkit (2020).

Interceptor entity/entities (2026) communicate the intercepted communications to/from transforming entity/entities (2030).

One or more transforming entity/entities (2030) translate the intercepted communications into communications that can be processed by ML security provider entity/entities (2040).

The one or more transforming entity/entities (2030) translate communications transmitted by the ML security provider entity/entities (2040) into communications that can be communicated to the ML toolkit function entity/entities (2023), and provides them to the ML toolkit (2020) via the Interceptor entity/entities (2026).

One or more ML security provider entity/entities (2040) provide secure functions that secure, replace, augment, modify etc. certain ML toolkit function entities—for example, replacing neural net activation functions implemented in ML toolkit function entities with alternatives that support homomorphic encryption (HE) (e.g. lower polynomial alternatives).

The secure ML entity (2000) provides external ML function entity/entities (2050), which ML application(s) (2010) can use to directly communicate with ML security provider entity/entities (2040). This allows the secure ML entity to, for example, provide additional security functions that have no interceptable pendant in the ML toolkit (2020). In an example, external ML function entity/entities (2050) provide features such as access control policy decision points, encryption/decryption, logging etc.

The secure ML entity (2000) includes a configuration processor (2060), which configures at least one configurable feature of the secure ML entity, for example, cryptographic configurations, enabled/disabled feature configurations etc.

The secure ML entity (2000) includes external tools (2070) used to carry out actions related to the secure ML entity, for example, encrypting/decrypting a model file or training/test data etc.

FIG. 23 illustrates a flowchart of an example of the secure ML entity. Note that not all steps need to be present (or carried out in the following order) in examples of the secure ML entity.

The secure ML entity configures itself (2310), for example based on a configuration file provided by a user (e.g. developer), for example when the ML entity starts up.

The secure ML entity executes external tools (2320), for example triggered by a user (e.g. developer)—for example, to encrypt a neural net model.

The secure ML entity intercepts (2330) the execution of at least one feature of an ML toolkit, for example an API function of an ML toolkit into which the secure ML entity is integrated.

The secure ML entity transforms (2340) information provided into the toolkit feature into a form that can be processed (and e.g. executed) by a secured feature. In an example, transforming includes can include processing, formatting, converting etc. data into a form that, for example is common across multiple ML toolkits or ML toolkit features, can for example include passing on the original data etc.

The secure ML entity processes (2350) at least one secured feature with the transformed information, for example a low-polynomial activation function for homomorphic encryption etc.

The secure ML entity transforms (2360) information returned from the secured feature into a form that can be processed (and e.g. executed) by an ML toolkit feature, e.g. the same toolkit features whose execution was intercepted in 2330.

The secure ML entity injects (2370) the transformed information (from 2360) into an ML toolkit feature, e.g. by execution the ML toolkit function with the transformed information.

The ML-SPI includes a Security Plugin Interface (SPI) for ML toolkits to allow the flexible addition and replacement of security mechanisms based on particular deployment needs (e.g. performance). This is for example needed because some ML security mechanisms have a significant performance impact on the ML system (esp. homomorphic encryption), and deployers should therefore be able to pick and choose the best set of features for their particular requirements.

The ML-SPI can for example include SPI implementations for controlling access to neural network (for use of those neural networks). Access control can for example be implemented for example at a system boundary (e.g. prevent access to the ML system), at an API boundary (prevent ML API access), and/or within the ML implementation itself. Data can for example be cryptographically authenticated and authorized before it is processed (this lowers the risk of black-box attacks).

The ML-SPI can for example include SPI implementations for protecting the ML model data itself. For example, the ML model weight configuration may be encrypted, but usable when the neural network is used by an authorized user. This lowers the risk of white-box attacks. Encryption can for example be based on homomorphic encryption approaches, or on a cryptographic scheme that ties the keys used for usage access control to the keys used to decrypt the model weights. The ML-SPI entity can include more generic security features such as isolation (containerization, virtualization etc.), process and data encryption etc.

The ML-SPI can for example include SPI implementations for processing encrypted data for example based on "homomorphic encryption", a technique known to those skilled in the art of cybersecurity, where some computations on encrypted data are supported as if it was unencrypted. The basic idea behind HE for ML is to reduce the (more complex) calculation functions in the deep learning model to (simpler) low degree polynomials, for which HE computations exist (at a slightly reduced level of accuracy and significantly reduced performance).

The ML-SPI entity may in an example align security features on a security/performance trade-off scale, and associate features with the various SPI APIs. For example, homomorphic encryption support may for example be embedded into the ML toolkit as low degree polynomial replacements of the various activation functions (e.g. Sigmoid, tanh, Softmax, ReLU, Leaky ReLU etc.). Cryptographic features to encrypt unit weights or inputs/outputs may for example be embedded in different places in the ML toolkit (incl. the underlying GPU layer, especially Nvidia's CUDA). In other words, the ML-SPI may for example not be a single API, but a collection of APIs (with adapters for specific toolkits such as TensorFlow, Caffe2, Scikit-learn etc.)—each supporting a specific group of security mechanisms.

It is important to understand that each ML toolkit (e.g. TensorFlow, Caffe2 etc.) has its own APIs and internal design, and differences in the data as well—and existing user-written ML software may need to continue to function. Therefore, ML-SPI can for example keep their user-facing API as much as possible intact, but at the same time, the ML-SPI layer can be for example independent of the particular ML toolkit used, so that ML security features can be replaced and reused across ML toolkit implementations.

An example of the ML-SPI entity can therefore include several layers (illustrated in the example in FIG. 14):

(1) An ML toolkit specific adapter layer 1410 API that is specific to each ML toolkit and essentially provides the interceptor interfaces. This layer may carry out some data reformatting, for example to turn unit weights from ML-SPI's data structure into the data structure expected by the ML toolkit. This layer therefore passes required information from the ML toolkit to the ML-SPI layer and vice-versa. This adapter API is maintained separately for each ML toolkit.

(2) The ML-SPI APIs layer 1420, which is generalized—in other words, there are identical APIs and data formats for all ML toolkits (the adapter layer takes care of the ML toolkit specific "mappings"). The ML-SPI layer for example allows "plug & play" replaceability of ML security features.

A benefit of the abovementioned approach is that existing ML application will work transparently with added ML security (e.g. encryption), and ML security features can be replaced/reused.

In an example implementation, internal implementations of specific developer-facing Python API functions—are modified to add encryption features to various ML toolkits. For example, in TensorFlow, the following Python APIs are modified in order to support transparent encryption/decryption: tensorflow.train.Saver.save( . . . ), tensorflow.train.Saver.restore( . . . ), or tensorflow.saved_model.simple_save( . . . ), tensorflow.saved_model.loader.load( . . . ), tensorflow.saved_model.builder.SavedModelBuilder. save( . . . ). As another example, in Coffee2/PyTorch, (at least) the workspace.Predictor( . . . ) function is replaced. The minimal modification to the internal implementations of those functions includes adding calls to the adapter APIs. Furthermore, the ML-SPI may for example include modifications to activation functions so that these can be replaced by lower degree polynomials that are supported by homomorphic encryption (if this feature is enabled in the ML-SPI layer).

In the ML-SPI, some of the configuration and setup of the ML security features may for example be done in an ML toolkit (or host) specific ways to pass necessary information through the adapter API layer 1410 to the encryption layer and vice-versa—this can for example include copying/modifying files, changing environmental attributes, or even adding some data stored in trusted computing module (if such functionality is provided by the platform).

In the ML-SPI entity, cryptographic material can be included in the ML input vector in various ways (e.g. input x+key y becomes x concatenated with y; or x XOR y; etc.) during training in numerous ways, so that the classifier will not return correct classification unless the input data has the correct cryptographic material attached. This could potentially prevent users without the correct cryptographic material from meaningfully using the ML model (thus providing an access control feature). Furthermore, the ML model can for example be encrypted using homomorphic encryption (HE).

FIG. 14 illustrates an example of the present invention's ML-SPI entity. The parts highlighted in dark gray are portable ML-SPI features and APIs that are independent of the specific ML toolkit they are integrated with. The light gray parts are ML toolkit specific extensions (ML Adapter APIs)—these need to be developed for each ML toolkit that should support ML-SPI.

The user's machine learning code 1450 interfaces with the ML toolkit using the normal developer facing APIs 1440, and—in some embodiments—also security specific APIs 1430. In the ML toolkit (e.g. TensorFlow), ML-SPI interceptors 1445 intercept the calls and invoke the corresponding ML toolkit specific adapter functions 1410. These then reformat the data (if needed) and call the corresponding ML-SPI API layer 1420 functions, which invoke corresponding pluggable ML security features 1490. This way, the ML toolkit specific adapter 1410 maps developer-facing APIs 1445 to the common ML-SPI APIs 1420.

Mapping the ML toolkit specific data to a consistent format may be another challenge. In an example, the ML-SPI supports format/data standards (e.g. ONNX) 1480, which minimizes the data modification extensions needed to ML toolkits and enables ML-SPI to consistently protect the ONNX model cryptographically (vs. in a ML toolkit specific way). The ML-SPI entity can for example include an external command line tool 1470 (provided with ML-SPI) to encrypt/sign the model file (for example standards-based, e.g. ONNX), and embed the matching (private) key inside the ML-SPI (for example in a separate hardware security module) so that the ML-SPI can decrypt/verify them model when it is loaded into memory. This will make it harder for an attacker to obtain the decrypted model.

Additionally, to support security specific settings that developers need to access, the present invention can include APIs 1430 (outside the ML toolkit source code, or modified/extended APIs) to be able to add ML security features.

The ML-SPI may, in an example, includes a config file 1460 that includes all security settings so developers can externally configure the ML-SPI entity.

The ML-SPI APIs 1420 specify interfaces to various pluggable ML security features 1490, for example, pluggable homomorphic encryption (HE) compatible activation functions, HE-based model encryption, pluggable (public key based) model decryption functions etc., ML access control features and input/output data decryption/encryption features. Each feature is designed to interface with the ML-SPI APIs, and may specify the data formats it requires.

Note that the ML-SPI entity is not limited for use with the other entities of the present invention, but are widely applicable to many scenarios where ML is used.

Example: Automation for Vulnerability Assessment and Penetration Testing (VAPT)

This section of the specification describes examples of the present invention that comprises several of the entities and examples described above, including for example agent automation and agent classifying.

In order to improve vulnerabilities assessment of embedded devices, the present invention includes a novel, automated and intelligent/adaptive entity, for example a vulnerability assessment and penetration testing entity (referred to as "VAPT entity"). An example of the present invention (depicted in FIG. 13), is designed for embedded devices with artificial intelligence, machine learning and automated test and assessment execution. In another aspect of the present invention, it is designed for non-embedded devices (e.g. standard IT), or for both embedded and non-embedded systems.

In contrast to standard IT systems, which are mainly using IP over cables and wireless networks for network connectivity and USB for most peripherals, embedded devices often include a high number of buses with very different characteristics regarding security, vulnerabilities and potential attack surfaces. The security properties of interfaces, bus systems and protocols vary a lot. Similarly, embedded derives include different CPUs, from small 8-bit controllers to complex 64-bit Systems on a Chip (SoC).

The assessment/testing may be for example performed by a small, portable easy to use and affordable device (vs. by a human red team). The portable device may also be connected to a backend (e.g. cloud system) which carries out some of the assessment/testing steps. This not only reduces the costs of vulnerabilities assessment per device, but allows testing a high number of devices in the first place. In another aspect of the present invention, the assessment/testing is performed on a single device not connected to other systems, for example on a desktop system.

The invention uses, for example, adaptive hardware using FPGA and Systems on a Chip (SOC) technologies, and a standard software architecture, to quickly build a broad range of testing systems—ranging from a small, inexpensive device for vulnerabilities assessment by non-experts—to laboratory systems for vulnerabilities assessment and penetration tests using complex attacks like fault injection or side channels. For the automated, intelligent orchestration and sequencing of the assessment steps, the invention may for example include decision trees and a machine learning based approach as described earlier in this specification. In another aspect of the present invention, the orchestration may for example be scripted, hard-coded, fuzzy logic based, rule engine based etc. The system may for example be able to intelligently choose its actions through an attack/assessment behavior tree and execute attack and analysis steps against the target device, the Device under Test (DuT), both in its operational environment and detached. Using for example artificial intelligence techniques (esp. artificial neural networks) and reinforcement learning, the automated virtual tester entity (similar to the attacker entity described above) can adapt its choices of attack and assessment steps over time by observing the DuT's reaction. For example, if the machine learning algorithms learn that a particular attack (or other assessment step) was unsuccessful or if a code analysis shows that a specific vulnerability cannot be found, the attacker algorithms will attempt to find a different path to a successful attack (or other assessment step) next time, in order to gather more information as base for a more complete overall vulnerabilities assessment.

The present invention may be aimed for use by a non-expert user, in order to for example safely connect the VAPT entity to the DuT; a machine learning feature that learns from DuT behaviors and responses, successes/failures etc.; an attack behavior tree feature that models attacks with their probabilistic decision logic; a technical attack execution and sequencing feature; generation of a high-fidelity vulnerabilities model Another aspect of the present invention may be aimed at expert users, and also supports detailed configuration options and advanced functionality for assessment and testing.

In an example, the present invention includes features that cover specific aspects of security of embedded systems, especially their vulnerabilities assessment: supporting the relevant embedded systems platforms, both CPUs and operating systems; supporting the relevant embedded systems interfaces, buses and protocols, ensuring safety during tests etc.

Objectives of the present invention may for example include: be flexible, and in particular to be deployable in a small and portable device to be used by cybersecurity non-experts, but also (in various embodiments) in laboratory environments for expert users; reduce the need for human red teams by automating assessment/testing; achieve quality of the assessment close to a human red team; support non-expert users; automatic assessment; provide useful output dependent on the user persona (e.g. quick overview whether a system can be used securely, or detailed vulnerabilities analysis); support in depth vulnerability assessment vs. penetration/hacking; support assessment specific to embedded systems (often with interfaces such as UART, I2C, SPI, CAN, JTAG etc.) and non-embedded systems (e.g. desktop, laptops, tablets, phones, servers, clouds etc.); compare vulnerabilities analysis with system observables (e.g. IDS logs); open, flexible, scalable, right-sized platform that it broadly applicable; be itself protected and provide security (e.g. user and administrator authentication, fine-grained access control, data protection, logging and monitoring/reporting etc.); support detecting zero-day (new) vulnerabilities etc.

In the embedded world it is much more difficult to define security requirements than in standard IT systems. For example, if an attacker acquires administrator rights on a server, then the attack can be considered successful. In embedded systems, it is not so simple, in many cases there is no administrator or even any kind of user account. A successful attack depends on the expected functionality of the device. For example, a PLC is controlling a motor. An attack has to be considered successful if the attacker is able to control the motor or to disturb this control process running on the PLC. In an example, a VAPT entity may cover assessing vulnerabilities in supervisory systems, e.g. compromised to set incorrect parameters for the embedded device.

In some operational systems, it might be too dangerous to run specific intrusive assessment tests because they might have an impact on the correct function of the system.

For example, the invention may run tests against the DuT which may lead to malfunctions/crashes of the DuT.

A VAPT entity can comprise different parts depending on the use case. For example (e.g. depicted in FIG. 13) it may include programmable hardware (for example based on FPGA technologies) to allow flexible connection to the Device under Test (DuT) (1330) (e.g. without limitation to the protocols ranges and parameters set by drivers and hardware adapters). In contrast, in standard business IT environments, it is possible to use COTS notebooks for security work, including penetration tests and vulnerabilities assessment, because the main interface to perform the tests is the standard network port of the target. In the embedded world, this is not sufficient, because embedded systems (as a whole) include a broad range of interfaces. This includes simple serial interfaces (e.g. UART, RS-232, RS-485), the ubiquitous USB and SD card buses, debugging ports (e.g. JTAG, OBDII), local buses for communication within the device (e.g. I2C, SPI/TWI) and field buses with different physical layers (e.g. CAN, RS-485, EC 61158-2, and many more). Industrial Ethernet is also gaining growing acceptance. Over these layers, penetration testing and vulnerability assessments have to deal with many upper layer protocols (like CANOpen or Profibus), for example in the Industrial Ethernet and CAN Bus worlds.

The VAPT entity can for example connect these interfaces over USB bridges to a standard PC (e.g. I2C, CAN and UART—however this often does not allow to use them outside the standards. In an example, adaptive/programmable hardware is used, which can be exactly tailored to the given task (e.g. System-on-chip, SoC, and field programmable gate array, FPGA technologies).

FIG. 13 shows an example of a VAPT entity 1300—it includes Processing System PS (1320) (e.g. a powerful embedded system with a multi core 64-bit ARM CPU, a second 32-bit ARM CPU, a large RAM and the main interfaces of embedded systems, which are directly connected to the PS, e.g. CAN, I2C, UART). It also includes a Programmable Logic (PL) 1310 (e.g. a large FPGA) that is integrated with the PS 1320, with additional high-speed interfaces (e.g. SATA, USB3, PCIe Gen2×4 root) and for example FMC expansion ports. In an example where it includes programmable hardware, the VAPT can be programmed to add standard interfaces (e.g. if the VAPT needs to support 4 UARTs or I2C buses, the VAPT can simply instantiate them), sometimes e.g. using external level shifters. In particular, the VAPT can support interfaces which are not 100% standard compliant; For example, developers can build clock generators or add digital-to-analog converters for power glitching fault injection attacks, or can add a Software Define Radio (SDR), for example using an analog device's FMCOMMS board, for measuring radio emanations. The GPIO (binary I/O) may be used for "stimulating" inputs of the DuT and implement a logic analyzer for dynamic code analysis or to intercept the communication of a CPU with a SD card (for example, on the JTAG interface). Using this platform, the invention may mount side channel and fault injection attacks potentially based on a PL (1310) (e.g. small FPGA), combined with support for multiple interfaces.

In addition to using the board for testing existing embedded systems, the present invention may use a larger FPGA PL (1310) to build "transparent copies" of complete or partial embedded systems. The CPU (e.g. ARM, AVR, SPARC or MIPS) may be implemented using free soft-core implementations in the PL (e.g. defined in Verilog or VHDL). By for example adding logic analyzer functionality directly to the internals of the CPU core, the VAPT can carry out dynamic code analysis and analysis of the penetration techniques in great detail and with high speed. For example, the present invention may execute (e.g. with powerful FPGA/SOC hardware) some analysis functionality or neural network learning/prediction directly in the PL (e.g. neural networks for correlation of observables, direct feeding of internal softcore CPU signals into neural networks for detection of attacks etc.).

In an example, VAPT's integrated testing hardware approach based on (single or multi-processor) system-on-chip SoC/MPSoC and FPGA may have benefits: First of all, it allows the flexible generation of the testing system hardware from pre-defined building blocks (e.g. with a graphical user interface, GUI, of the development tool chain—e.g. Vivado—and with TCL scripting). It allows the (relatively) quick implementation of new testing hardware, (e.g. new interfaces to support) in a hardware definition language (e.g. Verilog). It also allows advanced techniques like the transparent box and integration of analysis capabilities. All these functionalities may be clock synchronized: For example, when the VAPT uses clock glitching, it can exactly determine how this is reflected in the radio emanation of the system. The SoC/MPSoC based testing system may be integrated with other tools, for example a Software Defined Radio (SDR) broad band spectrum analyzer, a SDR narrow band spectrum analyzer, a digital storage oscilloscope and a waveform generator.

In an example, the VAPT entity is connected to more powerful or specialized processing entities (e.g. servers, GPU cluster, cloud etc.), e.g. via fiber connection, network connection, wireless connection etc., to transfer the measurements to a "backend" for further analysis. In the present invention, measurements are transferred offline for example using a memory or storage or network, such as memory devices like USB sticks.

Such high performance analysis capabilities may be implemented as part of the VAPT, for example using a high performance CPU, a GPU or a FPGA IP.

FIG. 13 shows a VAPT entity 1300 and connected DuT 1330, with the UART and I2C directly connected to the VAPT entity Processing System (PS) 1320. The CAN bus is connected over an interface in the Programmable Logic (PL) 1310, the FPGA. In the depicted example, JTAG is connected over the PS USB bus 1340.

In the present invention, unknown embedded systems may for example be connected to the testing system using a manual approach and Digital Storage Oscilloscope (DSO) to look for known/interesting ports and signals in the embedded systems. Note that blindly connecting the FPGA to ports could destroy the FPGA. Interface identification functionality may automate the abovementioned manual approach e.g. by implementing approaches similar to JTAGULATOR or by measuring and analysis bus communications, incl. e.g. approaches without electrical contacts, for example by measuring and analyzing electromagnetic emanations of signals.

The VAPT entity may include hardware acceleration support for machine learning, which can for example be used both for testing the system and for the orchestration of various testing and assessment approaches. The VAPT entity may be implemented in the Processing System CPU 1320 or the FPGA PL 1310, or using add-on chips and boards.

The VAPT entity hardware architecture 1310 may be scalable and flexible, and the software architecture 1320 may support the hardware architecture. The present invention may for example include individually tailored Linux kernels (e.g. using the Yocto and Petalinux tools) that exactly meet the concrete hardware features and need. For example, if the integrator enabled CAN, 4 UART interfaces and a logic analyzer with an AXI stream interface, then the generated kernel supports exactly these devices, which is then directly used by higher application layers. In a similar way, the VAPT entity's own hardware may be integrated for specific purposes, e.g. over GPIO, AXI DMA or AXI stream drivers. On top of this specially tailored kernel may run a standard operating system (e.g. Ubuntu Linux) with some extensions/added software.

To support vulnerability assessment and penetration testing, the PS 1320 may include tools such as Kali tools, gnuradio, JTAG software (avrdude, openocd . . . ), disassembler (radare2), decompiler (retdec), dynamic and static analysis tools (valgrind, flawfinder, clang, Cobra, ROPgadget . . . ), sniffing tools (e.g. wireshark with extensions, kayak), specific attack tools (e.g. USB Rubber Ducky, P4wnP1 or UglyUSB) and analytics/AI/ML tools (e.g. scikit learn, tensorflow), python with libraries (e.g. PyOBD, pyserial, Caring Caribou . . . ).

The VAPT entity may include a database and data model to store information, and may include a structured information model (e.g. metamodel, ontology, taxonomy etc.). The data model may capture a priori known vulnerabilities and their signatures preloaded into the VAPT entity, in addition to functional information about the system (if available). The results of the vulnerabilities assessment and penetration tests may be parsed and stored in a format that can be automatically processed, e.g. in order to generate reports, to visualize the results, to import them in other security tools or to distribute them to other VAPT entity devices, to reuse the vulnerabilities assessment results in an overall risk assessment or for security accreditation (this would allow to assess residual risks or the impact of a potential penetration on the overall system) etc.

In the VAPT entity, selecting assessment/test steps and sequencing them (e.g. based on identified characteristics of the DuT) may be implemented as described above (in this specification. While the VAPT entity is described for one use case (vulnerability assessment and penetration testing), it is broadly applicable to other use cases, such as other assessments, other tests, diagnostics, updates, repairs, updates etc.

In the VAPT entity, an agent classifying entity may for example be used to classify devices under test.

Embodiment: Risk Mitigation of Communication Buses, for Example CAN Bus

Background: Communication buses such as the vehicle control area network (CAN) bus are inherently insecure. In the case of CAN, it is practically not possible to sufficiently improve its security, for example by modifying the protocol in order to add authentication and message protection, because of the enormous number of legacy CAN devices everywhere, from e-bikes over vehicles to large scale industrial systems.

The present invention includes an entity (for example referred to as "CANGuard entity"), which for example includes a detection and warning system for anomalies in bus traffic, especially for intrusions. While the following describes examples in the context of the CAN bus, the CANGuard entity and the concepts it is based on are applicable for many other buses as well.

FIG. 21 shows a flow chart of an example of the current invention directed at bus segmentation and configuration, using a bus separation and configuration entity (referred to as "BSC entity" in this specification). In an example, the BSC entity is used for determination of filter rules for message traffic over the device, and for initial configuration of the intrusion detection system.

In an example of the BSC entity, the user (e.g. system developer) determines (e.g. initially) (in step 2110) the system model describing the devices connected to the bus structure (for example CAN, I2C, SPI etc.). Devices are for example Electronic Control Units (ECU), Programmable Logic Controllers (PLC), sensors, actuators, user interfaces or supervisory systems or any other device connected to the bus. In an example, the system model contains all essential information about the devices, for example their type, version, interfaces provided and so on—the model being for example determined manually, by using an appropriate user interfaces or modeling tool (e.g. implemented in BSC entity and provided to a user), or imported from other tools (e.g. using importers implemented in BSC entity). An importer may be automated. The model may be described in an appropriate metamodel or Domain Specific Language (DSL), for example using a standard metamodel (for example UML or SysML) or a specific DSL.

Using the BSC entity, the user determines (in step 2120), by for example using a user interface or an importer (which may be automated), the base line interactions of the system over the bus. In an example, this can include some or all communications, for example based on the request/reply or publish/subscribe paradigms or any other one to one or one to many messages exchange, with or without identifiers for senders and receivers. In an example, the base line is manually modeled, already existing models are imported, or network traffic is imported and transformed into respective models.

Using the BSC entity, the user analyzes risks (in step 2130), for example via a user interface (e.g. provided by the BSC entity). Analyzing risk can for example be based on a Model Driven Risk Analysis (MDRA, see "MDSA patent") approach, which includes for example an analysis of potential attack surfaces, attacker capabilities, potential vulnerabilities, potential damage etc. For example, in an automotive system, a sensor for physical measurements, for example a temperature sensor connected to the bus structure, has a comparatively small attack surface. On the other hand, a large entertainment/navigation device with various communication interfaces (like Bluetooth, WLAN, cellular networks, USB) has a very large attack surface and a high number of potential vulnerabilities. In an example of the BSC entity, now the risks of the devices (or processes/processors) which are connected to the bus are calculated and assessed/analyzed. This analysis can for example take security aspects into account. In an example, this analysis also takes safety aspects into account. Note that an example of the BSC entity may include a separation device, which may be considered as a device that might fail (which in many cases must not raise unacceptable safety risks).

Using the BSC entity, the user determines (in step 2140)—for example by using a user interface provided by the BSC entity—the segmentation of individual devices to the different two or more bus segments, for example based on the results of the risk analysis in step 2130. For example, in the case of an automotive system and a CAN bus, CANGuard may group devices controlling critical, especially safety critical parts of the vehicle (for example brake or power train) into one segment, and less critical parts with a high risk of compromise (e.g. entertainment and navigation systems) into another bus segment. The segments may be connected to different interfaces of the separation device/devices, for example, in the case of CAN, to CANGuard.

Using the BSC entity, the user determines (in step 2150)—for example by using a user interface provided by the BSC entity—at least one filter rule for the communication between the devices on the bus segments, for example by using a user interface (e.g. a policy authoring tool). Filter rules are for example determined based on information from the functional models determined in step 2110 and 2120. In an example of the present invention, "model driven security" (see "MDS patent") can be used e.g. to determine filter rules based on functional models. This can be determined using different kinds of policies, for example default deny, default allow, first applicable, most restrictive, least restrictive etc. In the "default deny" case, all messages may be denied if not explicitly allowed because there is an explicit communication between one or more devices on separated bus segments. In the "default allow" case, all communication may be allowed, if not explicitly forbidden, for example because it is considered too risky.

Using the BSC entity, the user determines (in step 2160)—for example by using a user interface provided by the BSC entity—the initial configuration of the intrusion detection system (IDS), based on the model(s) determined in step 2110 and 2120. A BSC entity's IDS entity (e.g. collocated with the separation entity) analyses intrusions, e.g. traffic between the bus segments and on the individual bus segments. Traffic matching the traffic described in the (baseline) models may for example be considered legitimate, while all deviations from this baseline traffic may for example be considered an anomaly, and a notification is given.

FIG. 22 illustrates an example of a bus separation and configuration (BSC) entity, comprising of at least one BSC determination entity (2210), implemented on a processor with a memory and/or storage (e.g. a computer), and at least one BSC separation entity (2230), also implemented on a processor with a memory and/or storage (e.g. CPU+ROM, FPGA, system on chip etc.).

A BSC determination entity (2210) comprises one or more user interfaces (2220), which users, e.g. developers, risk managers, security professionals etc., use to interface with the component entities that make up the BSC determination entity. The user interface (UI) (e.g. textual, graphical etc.) may be provided on a display attached to a BSC determination entity, on a display served by a BSC determination entity via other connections (e.g. via network, such as a browser UI) etc.

The BSC determination entity (2210) comprises one or more models (2223) which store information in the BSC determination entity, e.g. as a metamodel, database structure, graph structure, ontology, taxonomy etc. In an example, it comprises system model(s) (2226), which capture information about systems (e.g. buses and devices connected to buses). In an example, it comprises risk models (2228), which capture information about risks (see MDRA, described in "MDSA patent").

The BSC determination entity (2210) comprises one or more determination entities, incl. one or more of:

a risk determination entity (2222), which in an example is used by users (via the user interface(s) 2220) to determine risks for system(s) described by system model(s) (2226) based on risk model(s) (2228);

a separation determination entity (2223), which in an example is used by users (via the user interface(s) 2220) to determine separation of e.g. devices on a bus into separate buses based on the risks determined (in 2222);

a policy determination entity (2224), which in an example is used by users (via the user interface(s) 2220) to determine policies governing communications between devices separated (in 2223), (e.g. access policies, logging rules, alarm rules, monitoring rules etc.);

an IDS determination entity (2225), which in an example is used by users (via the user interface(s) 2220) to determine IDS configurations related to devices and buses (e.g. based on separations determined in 2222 and e.g. policies determined in 2223), e.g. signatures, suppress lists etc.;

information model(s) (2223), which in an example comprise system model(s) (2226) and risk model(s) (2228);

importers (2229), which in an example import (e.g. ingest, capture, read, load etc.) data into the model(s) (2223). In an embodiment, importing includes converting, normalizing, mapping source data into a form necessary to be able to be ingested into the models 2223; and exporters (2227) which in an example export determined policies and IDS configurations to at least one BSC separation entity/entities (2230).

The BSC separation entity (2230) comprises interfaces to one or more buses and comprises of: a policy implementation entity, which implements a policy/policies determined (in 2224)—such as access control rules; an intrusion detection system (IDS) entity, which detects intrusions based on IDS configurations determined (in 2225).

In the present invention, CANGuard separates the bus (e.g. CAN) for example into risk domains implemented with own bus segments, based on a risk assessment of connected devices, and provides message filtering between the domains. This reduces the risk that compromised devices are able to spoof messages with forged identifiers to sensitive devices. Example design objectives of CANGuard include to be a relatively affordable, pragmatic and easy to install solution with a low impact on the current vehicle systems (including an impact on functional safety). It is targeted at practical risk mitigation in real world environments, including risks of: (1) passive sniffing of messages in order to gain information. This could be technical information like message formats, but also, when the message formats are understood, operationally and tactically interesting information like vehicle position or fuel consumption. Limitations of the (e.g. CAN) bus may be very difficult in practice to prevent or even detect the sniffing when there is a physical connection to the bus, CANGuard may therefore reduce the risk of disclosure back to the attacker; (2) message spoofing. This could be long term and stealthy, e.g. in order to increase wear or fuel consumption of the vehicle, which could have a significant economic or operational impact. This could also be short term, e.g. for safety critical actions and to destroy physical parts of the car. The invention may for example detect long term and stealthy spoofing by applying an Intrusion Detection System (IDS) to bus traffic. In the case of short-term spoofing, however, an IDS may not help, as the relevant event could be triggered by a single message, and an IDS warning after the fact is often of little use.

The CANGuard entity comprises of one or more of: (1) an advanced IDS with sensor fusion; (2) a gateway (e.g. with at least two interfaces) separating high risk CAN bus devices from low risk devices, using two or more bus instances connected to the different interfaces of a CANGuard device. The CANGuard may for example analyze all messages on all the CAN bus segments and, additionally, uses own sensors like an Inertial Measurement Unit (IMU). By correlating the CAN buses messages with each other and, if appropriate, with the sensor data, CANGuard can detect anomalies, which could be caused by spoofed messages from an attack. The CANGuard may include an interface that is for example used to indicate anomalies to the driver.

Because not all parts of the CAN bus are equally risky, the CANGuard entity, in an example, isolates high-risk devices from the safety critical parts of the vehicle CAN bus, by putting them into their own CAN bus segments. Between the CAN segments resides a CANGuard entity as a Domain Boundary Controller (DBC). It only allows legitimate and required traffic between the CAN segments. A high-risk device on the CAN bus will not be able to spoof critical messages directly into the safety critical segment, for example to send, masked as another part of the power train, fake messages to brake, motor or gearbox. In addition, it is able to filter the messages into high risk segments, from where they could be disclosed back to an attacker.

The CANGuard entity may provide a practical and affordable approach that reduces cybersecurity risks in CAN bus-based vehicle networks.

Design objectives behind the CANGuard entity may for example include: take into account practical limitations and constraints (esp. the fact that CAN cannot practically be replaced); reduce the risks and improve the security of CAN bus vehicular networks; cost-effective; consider safety; provide useful output (esp. indication of risk level); consider relevant buses layers and variations; protect the CANGuard entity itself, do not introduce vulnerabilities into the CAN bus; flexibility; broad applicability; vehicle lifecycle integration (e.g. preconfigure CANGuard with a model of message exchanges).

In an example, the CANGuard may store information, for example: (1) the CANGuard entity may include structured information and information model(s) (e.g. metamodel, taxonomy, ontology etc.) that brings together all to-be-stored information into a consistent form (e.g. using model-based information modeling approaches); (2) the CANGuard may analyze CAN bus communication, in order to define a baseline of normal message exchanges (e.g. using model-based techniques and based on the standard format for field buses—FIBEX); (3) the CANGuard may integrate analysis of risks and communications into the systems life cycle, especially into system development and maintenance, which is for example based on Model Driven Development (MDD) and standards like AUTOSAR, thus reusing systems models already available as part of the vehicle development process, for CANGuard; (4) the CANGuard may reuse information describing messages exchanges from the system development phase.

In an example, the CANGuard entity analyzes vulnerabilities of the CAN bus (in an example assisted by human specialists), their impact on the overall vehicle, and of the related risks, though a detailed risk model, which is used to then reduce the risks to an acceptable level. It may use model-driven approaches for the definition models of different granularity, allowing to describe functional systems, their components and their interactions, security requirements, vulnerabilities, attackers, attack paths and surfaces and so on, in order to then generate detailed risk models. Model-driven approaches allow defining information precisely and semantically rich.

The technical consequences of access to the CAN bus, sniffing and spoofing, are well known. In the present invention, CANGuard may be based on model-driven risk analysis (MDRA) approaches, for example to analyze how an attacker can gain access to the unprotected bus, or, in many cases, to the buses, a high-speed CAN bus and a low speed CAN bus. For CANGuard, a user (e.g. an analyst skilled in the art) may do this by analyzing the devices connected to them, from simple ECU and sensors to complex subsystems like, in civilian vehicles, infotainment systems, or navigation, communications and C2 systems in military vehicles. CANGuard's MDRA entity can for example allow specialists (e.g. systems engineers, developers, security professionals etc.) to define metrics to assess the penetration risk for such devices, based on the device's characteristics. The more fine-grained the input (e.g. the functional models), the better in general the results of the risk analysis. For example, if an engine control unit (ECU) is deeply embedded into the power train of the vehicle, without any outside connections, then the risk can be considered low, as a remote attacker has little chance to penetrate such an ECU from the outside. On the other hand, an infotainment system with standard cellular and wireless interfaces and USB ports can be considered a high-risk device.

In an example, CANGuard's MDRA allows specialists to analyze the risks associated with the CAN bus access of the devices. What, concretely, can an attacker do with the gained access? For example, obtain relevant operational information like fuel status, position, speed or heading? Increase the long-term wear or fuel consumption? Or even destruct the vehicles somehow, for example by applying the parking brake during drive? Based on this analysis, specialists are able to identify ECU and devices with a high risk level, which require special attention. For example, they have to be put into a separate bus segment, so they are not able anymore to sniff critical information or to spoof dangerous messages.

In addition, in the CANGuard, the output of this model may be the input for a baseline model of legitimate communication on the bus.

Baseline models can for example be gathered using a CAN bus sniffer/analyzer. The CANGuard entity's CAN bus analyzer may not only correlate messages obtained from one or more instances of the CAN bus, but also from other sources, which are—in an example—as much as possible clock synchronized. This includes other system-wide bus systems like LIN or UART and especially the vehicle's diagnostic system, internal buses like I2C and SPI/TWI, but also CANGuard's own sensors like Inertial Measurement Units (IMU) and Software Defined Radios (SDR). The correlation feature is implemented using techniques known to those skilled in the art (e.g. visual analytics approaches, machine learning approaches etc.)—for example to detect spoofed messages. In the present invention, the correlation may be automated (e.g. machine learning), or may include manual involvement (e.g. visual analytics), for example, a signal on the CAN bus to open a car's locks is correlated with information from an SDR that a signal was received from a wireless key. If the wireless key signal is missing, there may be a risk that an unlock message was spoofed.

Note that CANGuard is not limited to the standard CAN bus, but can also be used for extended frame and remote CAN frames, ISO-TP, or ISO 14229, SAE J1939 etc. Moreover, the CANGuard entity is not limited to CAN but the present invention can be easily adapted for use for other bus systems.

The CANGuard entity can, in an example, be implemented as an embedded device and attached/integrated to a vehicle. The CANGuard may consist of an embedded device with several CAN interfaces and a user interface.

The CANGuard entity may, in an example, calculate a risk coefficient for the current CAN bus status, which is related to an Intrusion Detection System (IDS) for the detection on anomalies.

In an example, the CANGuard entity can correlate CAN messages with sensor data (esp. from sensors attached/comprised in the CANGuard entity)—because the CANGuard's own sensor data can be considered trustworthy, CANGuard can verify that message groups are legitimate as well, for example by correlating such messages with related messages from own sensors. The CANGuard can then, for example, further assesses, hop by hop, the trustworthiness of again other messages, determining a network of message trust relationships, supporting the establishment of trust in the correctness of an individual message. For example, an Inertial Measurement Unit (IMU) provides data regarding the vehicle dynamics, which CANGuard correlates with motor rpm and gear etc.

In an example, CANGuard taps into the vehicle's diagnostic system, which indicates error conditions detected by the ECU themselves, for example when they react to spoofed messages, when attackers quickly delete such errors (which can be detected and is a very strong indicator of an attack).

Attacks on the CAN bus can be categorized into: (1) slow attacks, which consist of multiple messages over a longer time span. They can for example be used to increase the wear or fuel consumption of the vehicle. Such attacks could be detected by an IDS and indicated to the driver or a maintenance technician. (2) fast attacks, which consist of only a single message or multiple messages in short time. Fast attacks could, for example be a message to unlock the doors or even a safety critical message leading to a crash, depending on the vehicle. Identifying such attacks is of little use, because they would already have achieved their purpose, for example stealing the vehicle or a (fatal) accident. The warning would only appear after the fact.

In an example, the CANGuard entity can therefore (to reduce risks of fast attacks) segment the CAN bus into a low number of segments and acts as a Domain Boundary Controller (DBC), as shown in the example in FIG. 15. The CANGuard entity device 1510, which includes sensors such as IMS 1515 gathers and analyzes information, and comprises several CAN bus segment interfaces 1520, 1523, 1526, which segment CAN buses 1530, 1533, 1536, respectively. The CANGuard entity device 1510 applies filtering between these buses based on numerous factors, incl. policies/rules, detected anomalies etc.

CANGuard filters messages between the different bus segments, which represent trust domains. For example, high risk devices are located in their own segments, and are, for example, not able to spoof a message that a wireless key system received a message to unlock the door, or to apply the parking brake while driving.

The CANGuard entity can be implemented for example in software, hardware, programmable hardware (e.g. FPGA), a combination of the three etc.

The CANGuard entity may be designed to detect slow attacks and reduces the risks of fast attacks. It can for example define the additional information sources which can be used for correlation and cross checking of the messages on the bus (e.g. IMU integrated in the CANGuard device or the integration of on-board diagnostic systems).

The CANGuard entity's IDS feature can for example be based on attack signatures commonly used in commercial IDS products and known to those skilled in the art of cybersecurity. Challenges with this approach may include that there are almost no known signatures of attacks against cars or embedded systems in general, that this cannot not cover zero-day attacks, and that signature-based IDS require frequent updates, which is not feasible for most vehicles.

The CANGuard entity's IDS feature can therefore, for example, determines a baseline of known good traffic, and the detection of anomalies as deviations from this baseline. The CANGuard's IDS feature may for example take message sequencing and content as a baseline. It can for example be implemented using API approaches (e.g. trained neural network or a fuzzy logic rule-based system etc.), or as simpler rules for correlating messages. As a baseline, CANGuard's baseline may start from a observing a clean car without intrusion.

The CANGuard entity may include message filtering capabilities such as access rules.

Importantly, the CANGuard entity can for example be easily adapted to support other bus systems. This includes for example buses running on top of CAN, such as CAN-Open, DeviceNet, EnergyBus, ISOBUS, MilCAN, NMEA 2000, or MIL-STD-1553.

The CANGuard entity may for example support vehicle diagnostics (because it is designed to collect and analyze data from buses and from its own sensors), such as fuel consumption or strength of pressure of the brake with the positive and negative acceleration of the vehicle, for the latter using the CAN messages or the CANGuard's own IMU. This allows CANGuard for example to make some early assumptions about the health of the motor or the wear of the brakes, before the car diagnostics would indicate a problem.

The following illustrates a CANGuard example deployment scenario: A (specialist) user connects the CANGuard device to the vehicle's CAN bus during the car's normal, daily operation, over a longer time span. CANGuard logs all messages and also detects anomalies and false positives (determined from the "clean" use of the vehicle). It also records CAN traffic. From that data, segmentation policies are determined, and anomaly detection systems are tuned. After that (or several iterations), the CANGuard is ready for operational use.

CANGuard may include its own maintenance and security architecture, which for example includes authentication, fine-grained access control, data protection, logging and monitoring/reporting, protection of the CANGuard itself (e.g. in order to prevent $3^{rd}$ parties from hacking the CAN- Guard), and the secure integration of CANGuard into diagnostic systems and a capability for software updates.

What is claimed is:

1. A computer-implemented method of automatically configuring at least one action determination model for an agent device of at least one agent connected to at least one simulated Information Technology (IT) environment via a computer network, the agent device of the at least one agent having the at least one action determination model indicating at least one action option to be simulated for execution by the agent device of the at least one agent to the at least one simulated IT environment, the method comprising:

generating and configuring, via a processor, the at least one simulated IT environment comprising a plurality of computer-virtualized and/or real networked IT systems interconnected via a defined network topology for performing IT-system operations, wherein the at least one simulated IT environment models hardware and software components of real-world IT systems;

storing the at least one action determination model in a storage device, each action determination model including a plurality of machine-learning (ML) based artificial intelligent (AI) neural net models each comprising an IT-system operation and defining at least one action to be simulated for execution by the agent device of the at least one agent to the at least one simulated IT environment in at least one given context of attributes, state and/or behaviors of the at least one simulated IT environment for performing the IT-system operation by the IT systems in the at least one simulated IT environment and having a different set of weighted parameters for a corresponding one of the at least one action, the IT-system operation modifying a state of at least one component within the simulated IT environment, including system configuration changes, resource allocation adjustments, log file manipulations, and network traffic modifications;

defining at least one objective of the at least one agent to be performed, to the at least one simulated IT environment, by the agent device of the at least one agent and the at least one action option to be simulated for execution by the agent device of the at least one agent to perform the at least one objective;

repeatedly simulating, using a simulation algorithm executed by the processor, execution of the at least one action by the agent device of the at least one agent to the at least one simulated IT environment, and obtaining at least one simulated result of the simulated execution of the at least one action;

after each simulation of the execution of at least one action, detecting a deviation between the at least one simulated result of the simulated execution of the at least one action to the at least one simulated IT environment and the at least one objective of the at least one agent, and dynamically reconfiguring, via the processor, in response to the detected deviation, the at least one action determination model by replacing a first one of the plurality of ML-based AI neural net models having a first set of weighted parameters and stored in the storage device with a second one of the plurality of ML-based AI neural net models being different and separately stored from the first one of the plurality of ML-based AI neural net models and having a second set of weighted parameters different from the first set of weighted parameters, until the simulated result satisfies the at least one objective based on at least one of system performance metrics, network and software outputs and responses, error rates, and execution logs, thereby reducing the deviation in subsequent simulations, wherein replacing the first one of the plurality of ML-based AI neural net models with the second one of the plurality of ML-based AI neural net models occurs as part of an interactive deviation-reduction loop.

2. The method according to claim 1, wherein dynamically reconfiguring, via the processor, the at least one action determination model involves optimizers, machine learning, or reinforcement learning.

3. The method according to claim 1, wherein the at least one action determination model defines at least one subsequent action option to be simulated for execution by the agent device of the at least one agent after the at least one action option currently simulated by the agent device of the at least one agent, to select in the at least one given context of attributes, state and/or behaviors of the at least one simulated IT environment.

4. The method according to claim 1, wherein the at least one action determination model determines at least one of an attacker action, an attack action, an exploit action, a defender action, a defending action, a detection action, a mitigation action, a prevention action, an alarm/alert action, a monitoring action, an evaluator action, a tester action, a penetration testing action, a vulnerability assessment action, a recommendation for human users, a configuration action for machines, a policy based action, a rule-based action, a user input action, a user output action, a data ingestion action, a repair action, assembly/disassembly action, a preparing action, a use action, a disposal action, a maintenance action, a directing action, an informational action, an entertaining action, a diagnosing action, transaction action, a purchasing action, a selling action, decision action, training action, education action, buying action, notification action, deception action, distraction action, timing action, delay action, support action, redirect action, or a transfer action.

5. The method according to claim 1, wherein the at least one simulated result includes at least one of an environment effect, an agent effect, console output, data returned by the action, data returned by the at least one simulated IT environment, context data, metadata, or data returned by the agent.

6. The method according to claim 1, wherein the at least one objective of the at least one agent includes at least one of successful attacking, defending, preventing, assessing, testing, evaluating, alarming, monitoring of the at least one simulated IT environment, providing a service, maintaining, updating, analyzing, deceiving, action execution, or action sequence execution.

7. The method according to claim 1, wherein the IT-system operation includes at least one of inputting, outputting, processing, transmitting, receiving and/or configuring data associated with or used for operation of the IT systems under the at least one simulated IT environment.

8. The method according to claim 1, wherein the IT-system operation is configured to perform network scanning, network configuration, policy enforcement, vulnerability assessment, and/or monitoring network status in the at least one simulated IT environment.

* * * * *